US006501848B1

(12) United States Patent
Carroll et al.

(10) Patent No.: US 6,501,848 B1
(45) Date of Patent: Dec. 31, 2002

(54) METHOD AND APPARATUS FOR THREE-DIMENSIONAL RECONSTRUCTION OF CORONARY VESSELS FROM ANGIOGRAPHIC IMAGES AND ANALYTICAL TECHNIQUES APPLIED THERETO

(75) Inventors: John Carroll, Littleton; Shiuh-Yung James Chen, Denver, both of CO (US)

(73) Assignee: University Technology Corporation, Boulder, CO (US)

( * ) Notice: Subject to any disclaimer, the term of this patent is extended or adjusted under 35 U.S.C. 154(b) by 0 days.

(21) Appl. No.: 09/444,138

(22) Filed: Nov. 20, 1999

Related U.S. Application Data

(63) Continuation-in-part of application No. 08/665,836, filed on Jun. 16, 1996, now Pat. No. 6,047,080.

(51) Int. Cl.⁷ .................................................. G06K 9/00
(52) U.S. Cl. ........................ 382/128; 382/285; 434/272
(58) Field of Search ......................... 382/100, 128–134, 382/262, 285; 378/4, 901, 9, 8; 128/623.1; 434/272; 600/483

(56) References Cited

U.S. PATENT DOCUMENTS

| | | | | |
|---|---|---|---|---|
| 4,839,822 A | * | 6/1989 | Dormond et al. | 706/45 |
| 4,875,165 A | * | 10/1989 | Fencil et al. | 345/424 |
| 5,709,206 A | * | 1/1998 | Teboul | 600/437 |
| 5,839,440 A | * | 11/1998 | Liou et al. | 600/431 |

OTHER PUBLICATIONS

Pfeifer et al., "Coronary Vascularture Visualization from Limited Angiographic Views", IEEE 1990, pp. 195–200.*

Kawata et al., "Measurement of Blood Vessel Characteristics for Disease Detection Based on Cone–Beam Images", IEEE, Dec. 1996, pp. 3348–3354.*

Kawata et al., "3–D Image Reconstruction with Veiling Glare Correction to Improve the Contrast of 3–D Reconstructed Vascular Images", IEEE Feb. 1996.*

Chen, Carroll, and Hoffmann, Three–Dimensional Reconstruction of Coronary Arterial Tree Based on Biplane Angiograms, Medical Imaging 1996—Image Processing, Proceedings SPIE—The International Society for Optical Engineering, Feb. 12–15, 1996, Newport Beach California, vol. 2710, 13 pages.

(List continued on next page.)

Primary Examiner—Jayanti K. Patel
(74) Attorney, Agent, or Firm—Daniel N. Fishman; Lathrop & Gage L.C.

(57) ABSTRACT

A method for in-room computer reconstruction of a three-dimensional (3-D) coronary vascular tree from routine biplane angiograms acquired at arbitrary angles and without using calibration objects. The method includes seven major steps: (1) acquisition of two standard angiogram sequences by use of a single-plane or biplane imaging system, (2) identification of 2-D coronary vascular trees and feature extractions including bifurcation points, directional vectors, vessel centerlines, and construction of vessel hierarchy in the two images, (3) determination of transformation in terms of a rotation matrix R and a translation vector $\vec{t}$ based on the extracted vessel bifurcation points and directional vectors, (4) establishment of vessel centerline correspondence, (5) calculation of the skeleton of 3-D coronary vascular trees, (6) rendering of 3-D coronary vascular tree with associated gantry angulation, and (7) calculation of optimal view(s) and 3-D QCA as quantitative measures associated with the selected vascular segment(s) of interest. The calculation of optimal views includes determination of 2-D projections of the reconstructed 3-D vascular tree so as to minimize foreshortening of a selected vascular segment, overlap of a selected vascular segment or both overlap and foreshortening of a selected arterial segment.

28 Claims, 62 Drawing Sheets

(5 of 62 Drawing Sheet(s) Filed in Color)

OTHER PUBLICATIONS

Carroll, Chen, Hellman, and Hoffmann, (Abstract) Improving Visualization Strategy for Coronary Interventions: The Utility and Need for 3–D Coronary Reconstruction, Oct. 15, 1996, vol. 94, No.8, p. I–376.

Chen and Metz, Improved Determination of Biplane Imaging Geometry from Two Projection Images and its Application to Three–dimensional Reconstruction of Coronary Arterial Trees, Medical Physics, May 1997, vol. 24, No. 5, pp. 633–654.

Chen, Hoffman, and Carroll, (Abstract) 3D Reconstruction of Coronary Artery Tree from Biplane Angiograms, Abstracts from the 68th Scientific Sessions, p. I–599.

Chen, Hoffman, and Carroll, (Abstract) A 3D Coronary Processing Tool to Optimize Visualization Strategy in the Cardiac Catheterization Laboratory, Abstracts from the 69th Scientific Sessions, p. I–437.

Chen and Carroll, Computer Assisted Coronary Intervention by Use of On–line 3D Reconstruction and Optimal View Strategy, Proceedings of the Medical Image Computing and Computer–Assisted Intervention, Cambridge, Mass., Oct. 11–13, 1998, pp. 377–384.

Wahle, Oswald, and Fleck, A New 3–D Attributed Data Model for Archiving and Interchanging of Coronary Vessel Systems, German Heart Institute, Berlin, Germany, May 1993, pp. 603–606.

Dalaere, Smets, Suetens, and Marchal, Knowledge–based System for the Three–Dimensional Reconstruction of Blood Vessels from Two Angiographic Projections, Medical and Biological Engineering Computing, Nov. 1991, pp. NS27–NS36.

Yanagihara, Hashimoto, Sugahara, and Sugimoto, A New Method for Automatic Identification of Coronary Arteries in Standard Biplane Angiograms, International Journal of Cardiac Imaging, 1994, pp. 253–261.

Liu and Sun, Fully Automated Reconstruction of Three–dimensional Vascular Tree Structures from Two Orthogonal Views Using Computational Algorithms and Production Rules, Optical Engineering, Oct. 1992, vol. 31, No. 10, pp. 2197–2207.

Pellot, Herment, Sigelle, Horain, Maitre, and Peronneau, A 3D Reconstruction of Vascular Structures from Two X–Ray Angiograms Using an Adapted Simulated Annealing Algorithm, IEEE Transactions on Medical Imaging, Mar. 1994, vol. 13, No. 1, pp. 48–60.

Nguyen and Sklansky, Reconstructing the 3–D Medical Axes of Coronary Arteries in Single–view Cineangiograms IEEE Transactions on Medical Imaging, Mar. 1994, vol. 1, pp. 61–73.

Whale, Wellnhofer, Magaragu, Sauer, Owsald, and Fleck, Assessment of Diffuse Coronary Artery Disease by Quantitative Analysis of Coronary Morphology Based upon 3–D Reconstruction from Biplane Angiograms, IEEE Transactions on Medical Imaging, Jun. 1995, vol. 14, No. 2, pp. 230–241.

Blais, G. et al., Registering Multiview Range Data to Create 3D Computer Objects, Aug. 1995, IEEE Transactions on Pattern Analysis and Machine Intelligence, vol. 17, No. 8, p. 820–4.

Chen, Metz, Hoffmann, and Carroll, Improved Determination of Biplane Imaging Geometry and 3D Coronary Arterial Tree from Two Views, IEEE Computer Society Press Reprint—Reprinted from Proceedings of Computers in Cardiology 1994, Bethesda, Maryland, Sep. 25–28, 1994, 5 pages.

\* cited by examiner

FIG. 32D          FIG. 32E

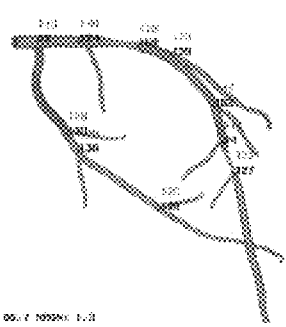 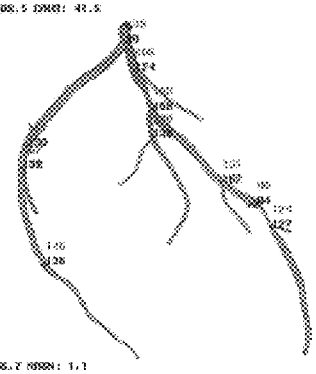
FIG. 40A	FIG. 40B
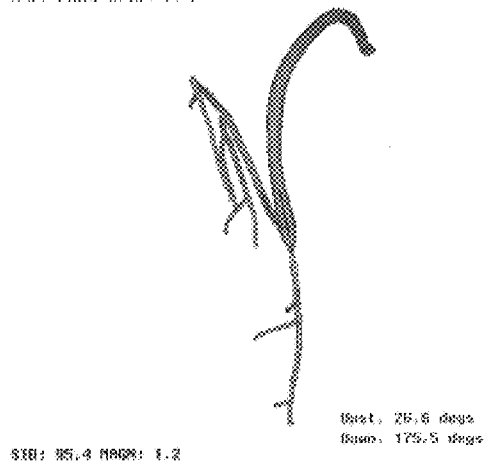
FIG. 40C

METHOD AND APPARATUS FOR THREE-DIMENSIONAL RECONSTRUCTION OF CORONARY VESSELS FROM ANGIOGRAPHIC IMAGES AND ANALYTICAL TECHNIQUES APPLIED THERETO

RELATED PATENT

This patent application is a continuation in part of U.S. Pat. No. 6,047,080 issued Apr. 4, 2000 and filed Jun. 16, 1996 as application Ser. No. 08/665,836.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The present invention relates generally to a method for reconstructing images of vascular structures and more specifically to an improved method for three-dimensional (3-D) reconstruction of vascular structures from two two-dimensional biplane projection images and methods and structures for quantitative analysis of such a reconstructed structure.

2. Discussion of Related Art

Several investigators have reported computer assisted methods for estimation of the 3-D coronary arteries from biplane projection data. These known methods are based on the known or standard X-ray geometry of the projections, placement of landmarks, known vessel shape, and on iterative identification of matching structures in two or more views. Such methods are described in a publication entitled "3-D digital subtraction angiography", *IEEE Trans. Med. Imag.*, vol. MI-1, pp. 152–158, 1982 by H. C. Kim, B. G. Min, T. S. Lee, et. al. and in a publication entitled "Methods for evaluating cardiac wall motion in 3-D using bifurcation points of the coronary arterial tree", *Invest. Radiology*, January–February pp. 47–56, 1983 by M. J. Potel, J. M. Rubin, and S. A. Mackay, et al. Because the computation was designed for predefined views only, it is not suitable to solve the reconstruction problem on the basis of two projection images acquired at arbitrary and unknown relative orientations.

Another known method is based on motion and multiple views acquired in a single-plane imaging system. Such a method is described in a publication entitled "Reconstructing the 3-d medial axes of coronary arteries in single-view cineangiograms", *IEEE Trans. MI, vol.* 13, no. 1, pp. 48–60, 1994 by T. V. Nguyen and J. Sklansky uses motion transformations of the heart model. However, the motion transformations of the heart model consist only of rotation and scaling. By incorporation of the center-referenced method, initial depth coordinates, and center coordinates, a 3-D skeleton of the coronary arteries was obtained. However, the real heart motion during the contraction involves five specific movements: translation, rotation, wringing, accordion-like motion, and movement toward the center of the ventricular chamber. Therefore, the model employed is not general enough to portray the true motion of the heart, especially toward the end-systole.

Knowledge-based or rule-based systems have been proposed for 3-D reconstruction of coronary arteries by use of a vascular network model. One such knowledge-based system is described in a publication entitled "An expert system for the labeling and 3-D reconstruction of the coronary arteries from two projections", *International Journal of Imaging*, Vol. 5, No. 2–3, pp. 145–154, 1990 by Smets, Vandewerf, Suctens, and Oosterlinck. Because the rules or knowledge base were organized for certain specific conditions, it does not generalize the 3-D reconstruction process to arbitrary projection data. In other knowledge-based systems, the 3-D coronary arteries were reconstructed from a set of X-ray perspective projections by use of an algorithm from computed tomography. Due to the motion of the heart and only a limited number of projections (four or six), accurate reconstruction and quantitative measurement are not easily achieved.

Closed-form solutions of the 3-D reconstruction problem using a linear approach was a significant development and is described in, for example, a publication entitled "Determining 3-d motion and structure of a rigid body using the spherical projection", *CVGIP,* vol. 21, pp. 21–32, 1983 by B. L. Yen and T. S. Huang. Unfortunately, actual data is always corrupted by noise or errors and the linear approach based techniques may not be sufficiently accurate when using noisy data. Hence, optimal estimation has been explicitly investigated. Additionally, U.S. Pat. No. 4,875,165 entitled Method for Determination of 3-D Structures in Biplane Angiography issued in the name of Fencil et al. also has significant drawbacks.

Use of a two-step method is known for producing an optimal estimation for a 3-D structure based on maximum-likelihood and minimum-variance estimation. In these techniques, for example, two publications entitled "Optimal motion and structure estimation", IEEE Trans. on PAMI, Vol. 15, no. 9, September 1993, pp. 864–884, and "Structure from motion using the reconstruction and projection technique", Proc. IEEE Workshop Computer Vision, November 1987, pp. 345–348, image error was employed in the objective function for a non-constricted minimization process. Preliminary estimates computed by a linear algorithm were used as initial estimates for the process of optimal estimation. However, if the initial solution from the linear approach is not sufficient, (e.g., with more than 2 pixels=0.6 mm error in the input 2-D image data), the iterative minimization process at the second step may become trapped in a local minimum due to a lack of prior information concerning the variables to be optimized.

Quantitative coronary analysis ("QCA") of a reconstruction of an arterial tree was known and developed in the 1970's to quantify vessel geometry and the effects of drugs on the regression and progression of coronary artery disease. In the mid-1980's, digital systems were introduced into the catheterization laboratory to support the angiographer during the interventional procedures. With the advent digital angiographic technology, on-line QCA has been widely used predominantly for the selection of the optimal sizes of the interventional devices, and for the assessment of the efficacy of the procedure. However, current QCA techniques are performed on the 2-D projection views in which the vessel overlap and foreshortening are subjectively minimized in a "trial-and-error" manner by the interventionist. FIGS. 56(*a*)–(*d*) demonstrate the problems resulting from use of such 2-D projections in QCA techniques. FIG. 56*c* is an RCA image as known in the art used for QCA and resulting in a 30% narrowing measurement as shown in FIG. 56*d*. With 2-D projection views there is no way to know or estimate how much error occurs in the QCA process due to foreshortening with respect to the stentotic segment. In FIGS. 56a and 56b, the same vessel segment between two bifurcation points as marked by two dots at its proximal and distal ends depicts 77% and 52% foreshortening, respectively.

It is evident from the above discussion that a need exists for improved reconstruction of 3-D images from 2-D image data and that a further need exists for improved QCA techniques utilizing such 3-D reconstruction to provide needed analysis in the intervention process.

SUMMARY OF THE INVENTION

The disadvantages of present methods known for visual reconstruction of vascular structures are substantially overcome with the present invention by providing a novel method for three-dimensional reconstruction of vessels using two-dimensional angiograms and further by providing improved QCA techniques utilizing such 3-D reconstructions of vascular structures.

This patent application teaches the methods and structures of the invention with reference to vascular structures (i.e., coronary arteries or coronary arterial trees). Those skilled in the art will readily recognize that the improved reconstruction methods and the quantitative analysis methods and structures are equally applicable to any vascular structure. References herein to "coronary" or "arterial" applications of the invention are intended merely as exemplary of common vascular structures where such reconstruction and analysis techniques are beneficially applied. Nothing in this patent application should be construed as limiting the reconstruction and analysis features to coronary applications. In particular, reference to "quantitative coronary analysis" (or "QCA") should be understood to refer broadly to quantitative analysis of any vascular structures. Likewise, reference to an "artery" or "arteries" should be broadly understood to refer to any vessel or vessels. "Artery tree", "arterial tree", "coronary arterial tree" or "coronary artery tree" should all be understood to broadly refer to any vascular tree structure. Coronary applications of the present invention are therefore merely one common exemplary application of the features, methods and structures of the present invention.

In the present inventive method, a novel optimization technique minimizes the image point errors and directional vector errors in both imaging systems subject to the constraints derived from the individual intrinsic imaging parameters of the employed imaging system. Given five or more corresponding object points in both views (projection image), a constrained nonlinear optimization algorithm is applied to obtain an optimal estimate (transformation) of the biplane imaging geometry in the form of R and $\vec{t}$ which characterize the position and orientation of one imaging system (imaging portion of the imaging system) relative to the other. The initial solution is estimated on the basis of the individual intrinsic imaging parameters.

Angiograms of eight hundred patients were analyzed in which two cases are selected for discussion hereinafter. The biplane imaging geometry was first determined without a calibration object, and the 3-D coronary arterial trees were reconstructed, including both left and right coronary artery systems. Various two-dimensional (2-D) projection images of the reconstructed 3-D coronary arterial tree were generated and compared to other viewing angles obtained in the actual patient study. Similarity between the real and reconstructed arterial structures was excellent. The accuracy of this method was evaluated by using a computer-simulated coronary arterial tree. Root-mean-square (RMS) errors in the 3-D position and the 3-D configuration of vessel centerlines and in the angles defining the R matrix and $\vec{t}$ vector were 0.9–5.5 mm, 0.7–1.0 mm, and less than 1.5 and 2.0 degrees, respectively, when using 2-D vessel centerlines with RMS normally distributed errors varying from 0.4–4.2 pixels (0.25–1.26 mm).

More specifically, the method for three-dimensional reconstruction of a target object from two-dimensional images involves a target object having a plurality of branch-like vessels. The method includes the steps of: a) placing the target object in a position to be scanned by an imaging system, the imaging system having a plurality of imaging portions; b) acquiring a plurality of projection images of the target object, each imaging portion providing a projection image of the target object, each imaging portion disposed at an unknown orientation relative to the other imaging portions; c) identifying two-dimensional vessel centerlines for a predetermined number of the vessels in each of the projection images; d) creating a vessel hierarchy data structure for each projection image, the data structure including the identified two-dimensional vessel centerlines defined by a plurality of data points in the vessel hierarchy data structure; e) calculating a predetermined number of bifurcation points for each projection image by traversing the corresponding vessel hierarchy data structure, the bifurcation points defined by intersections of the two-dimensional vessel centerlines; f) determining a transformation in the form of a rotation matrix and a translation vector utilizing the bifurcation points corresponding to each of the projections images, the rotation matrix, and the translation vector representing imaging parameters corresponding to the relative orientations of the imaging portions of the imaging system; g) utilizing the data points and the transformation to establish a correspondence between the two-dimensional vessel centerlines corresponding to each of the projection images such that each data point corresponding to one projection image is linked to a data point corresponding to the other projection images, the linked data points representing an identical location in the vessel of the target object after the projections; h) calculating three-dimensional vessel centerlines utilizing the two-dimensional vessel centerlines and the correspondence between the data points of the two-dimensional vessel centerlines; and i) reconstructing a three-dimensional visual representation of the target object based on the three-dimensional vessel centerlines and diameters of each vessel estimated along the three-dimensional centerline of each vessel; and j) determining the optimal view of the vessel segments with minimal vessel foreshortening.

Further features of the present invention utilize such 3-D reconstructions to provide improved QCA techniques for analysis of coronary artery images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 32a–f depict 3-D reconstruction of LCA images viewing at four different angles of sample acquired images.

FIGS. 40a–c depict 3-D and 2-D take-off angles of LCA and an example of insertion angle of a bypass graft.

DETAILED DESCRIPTION OF PREFERRED EMBODIMENTS

Figure 1:
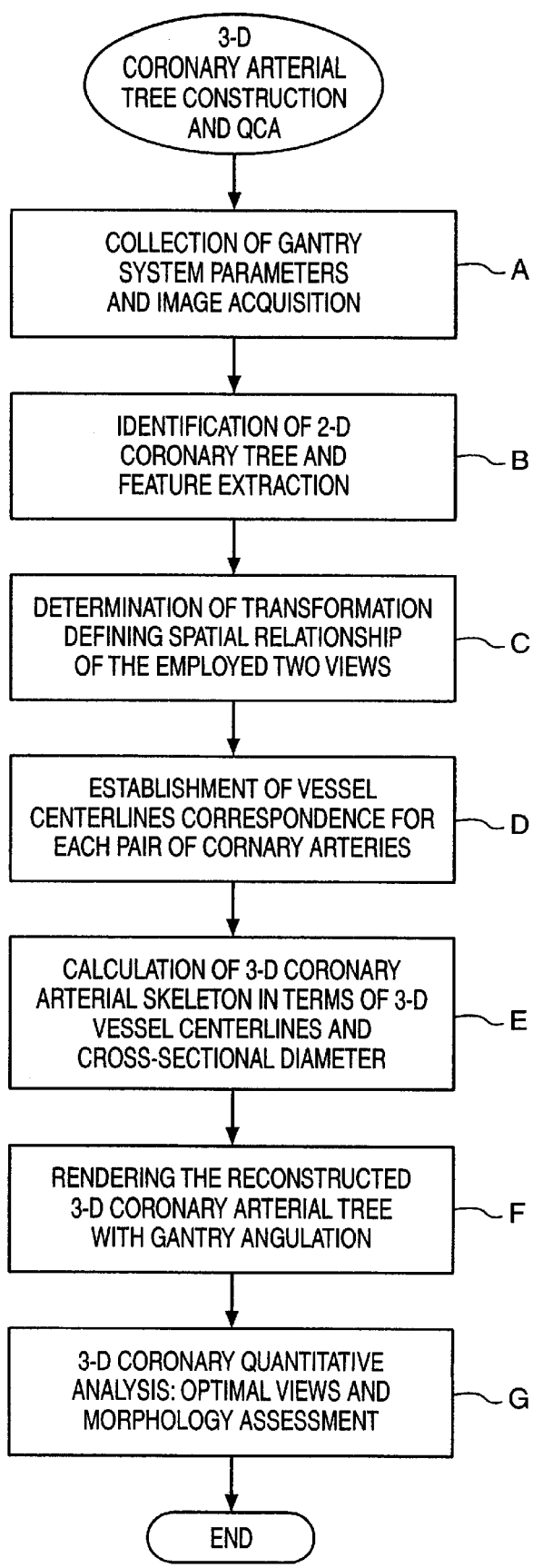
FIG. 1 is a flowchart of a high level view of the reconstruction and analysis procedures of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Overview

A mono-plane or bi-plane angiographic system can be employed for cardiac angiographic acquisition. The pair of angiograms are acquired based on any two selected gantry orientation in terms of left/right anterior oblique (RAO/LAO) angle, caudal/cranial (CAUD/CRAN) angle. The angulation is defined with respect to the iso-center to which the gantry arm rotates. The gantry system information including focal spot to image intensifier distance (SID), field of view (FOV, e.g., 5, 7, or 9 inch mode), and gantry orientation as in FIG. 1, and the acquired images are automatically recorded. The employed 3-D reconstruction protocol involves the following steps:

1. Routine cardiac catheterization is initiaeeed and a standard coronary artenogram is completed in two views; one injection in the biplane system, two injections in the single plane system.
2. A pair of image sequences, consisting of 8 images (including from end-diastole to end-systole frames) at each view, are chosen and transferred to a computer workstation.
3. The 2-D coronary arterial trees are identified in the selected pair of angiograms (e.g., images corresponding to end-diastole) and the vessel features are extracted including vessel centerlines, bifurcation points, and hierarchy.
4. The processing of 3-D reconstruction is completed by use of the information of identified vessel features yielding a 3-D patient-specific coronary arterial tree model.
5. The computer-simulated projection from reconstructed 3-D coronary model along with the corresponding gantry angles are displayed on a computer graphics workstation.
6. The process of 3-D quantitative coronary analysis (QCA) process including optimal-view strategy map (OSM) and assessment of coronary morphology relative to any selected arterial segment(s) is completed. The results are used as guidance for minimizing the vessel foreshortening and overlap, and for facilitating selection of other intra-coronary devices, i.e., stents.

The proposed method of reconstruction consists of seven major steps shown in the flowchart figures and descriptive text to follow. The major steps are:

(1) acquisition of two standard angiogram sequences by use of a single-plane or biplane imaging system,
(2) identification of 2-D coronary arterial trees and feature extractions including bifurcation points, vessel centerlines, and construction of vessel hierarchy in the two images,
(3) determination of transformation in terms of a rotation matrix R and a translation vector $\vec{t}$ based on the extracted vessel bifurcation points,
(4) establishment of vessel centerline correspondence,
(5) calculation of the skeleton of 3-D coronary arterial trees,
(6) rendering of 3-D coronary arterial tree with associated gantry angulation, and
(7) calculation of optimal view(s) and 3-D QCA associated with the selected arterial segment(s) of interest.

A. Image Acquisition

Figure 2:
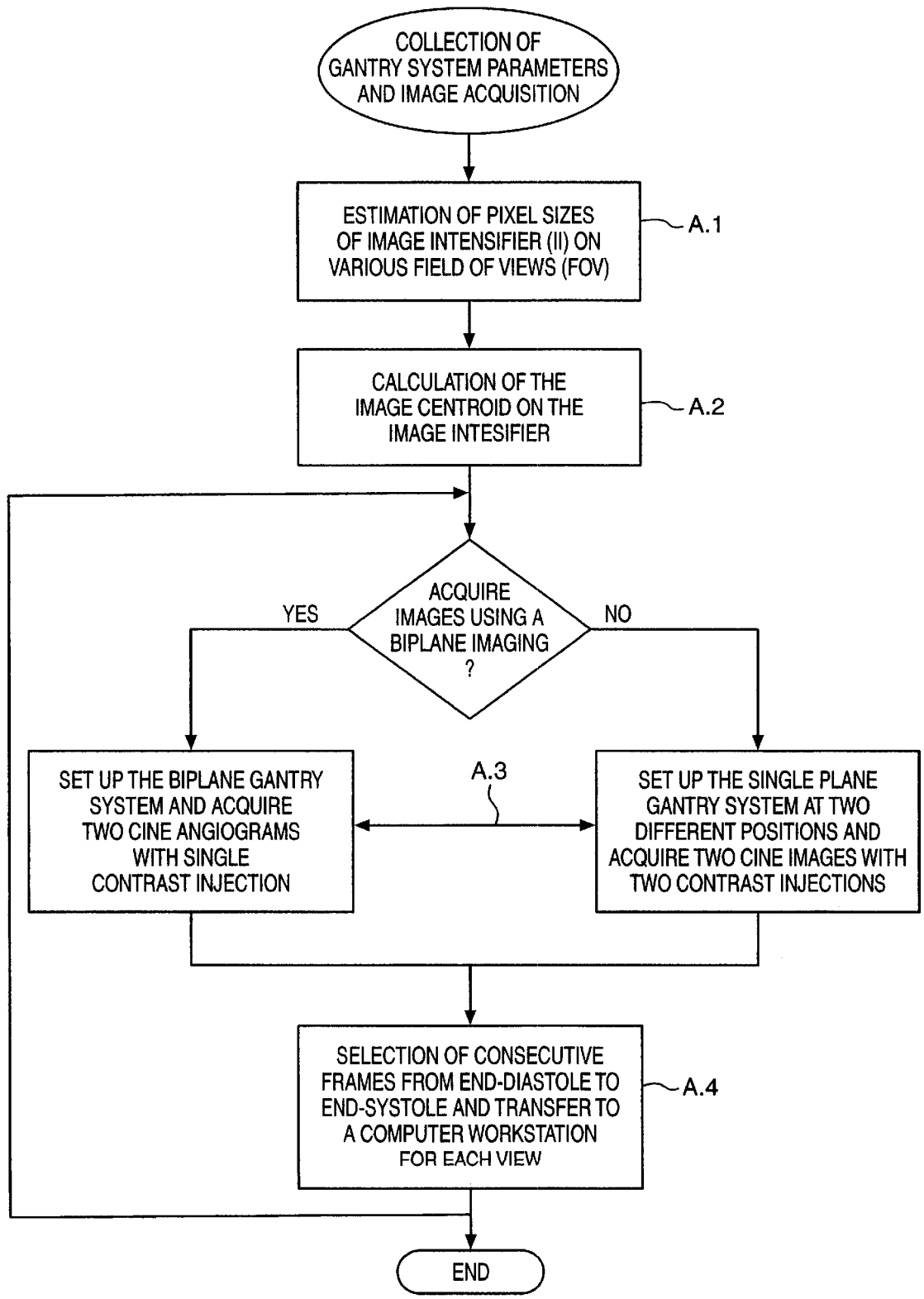
FIG. 2 is a flowchart providing additional details of the collection of gantry system parameters and image acquisition.

Details of the methods for acquiring images of the arterial tree are shown in the flowchart of FIG. 2.

Figure 3:
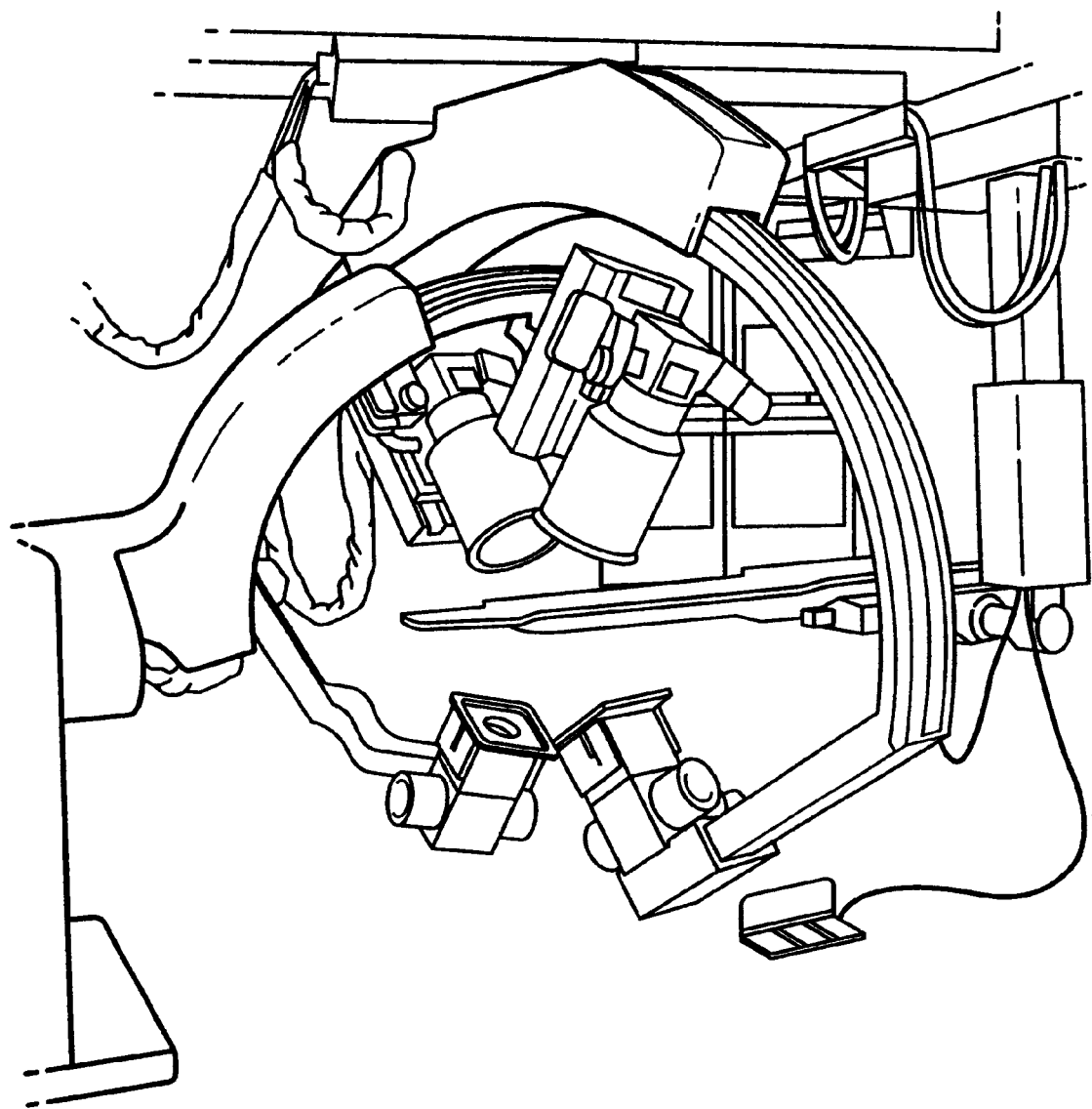
FIG. 3 is a diagram of a typical bi-plane imaging system.
Figure 4:
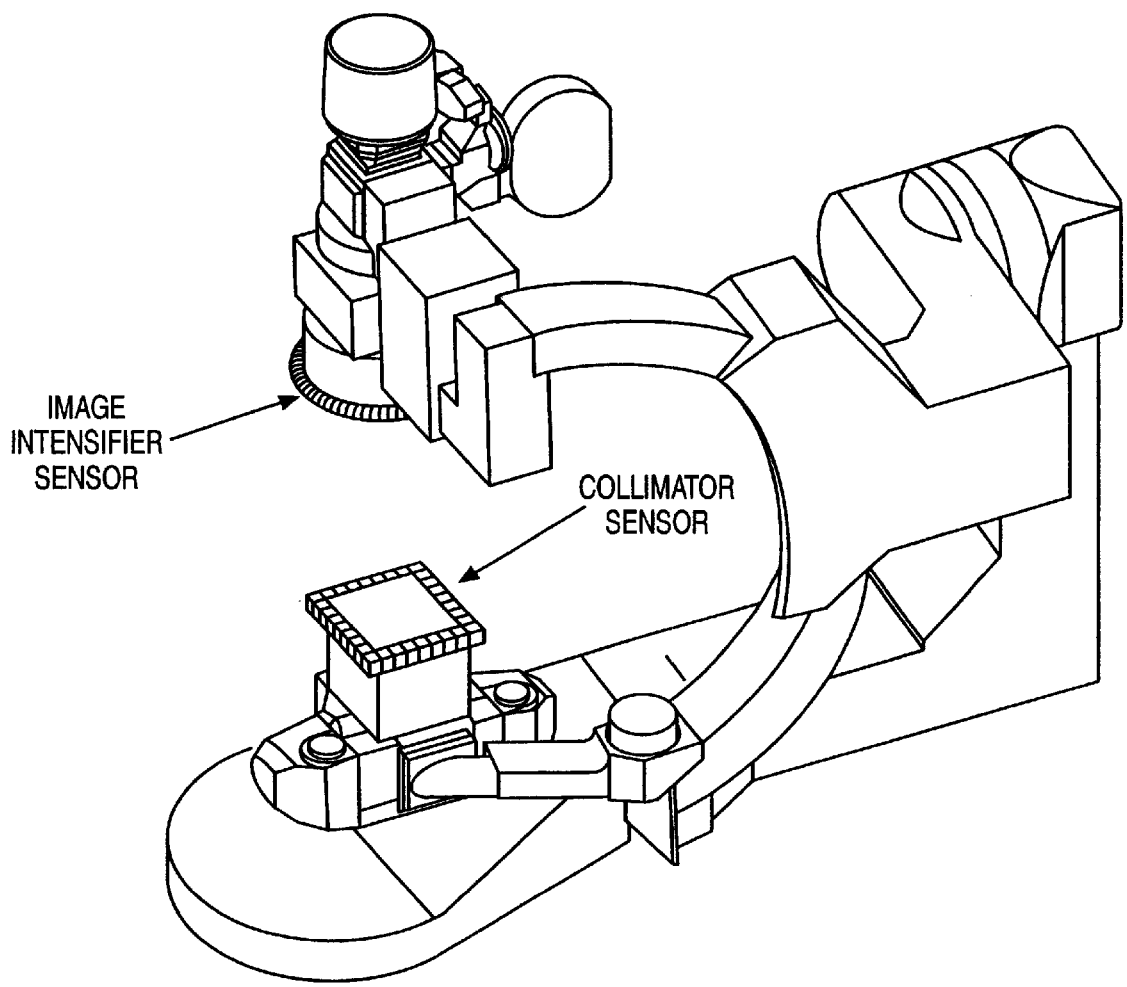
FIG. 4 is a diagram of a typical single plane imaging system.
Figure 5:
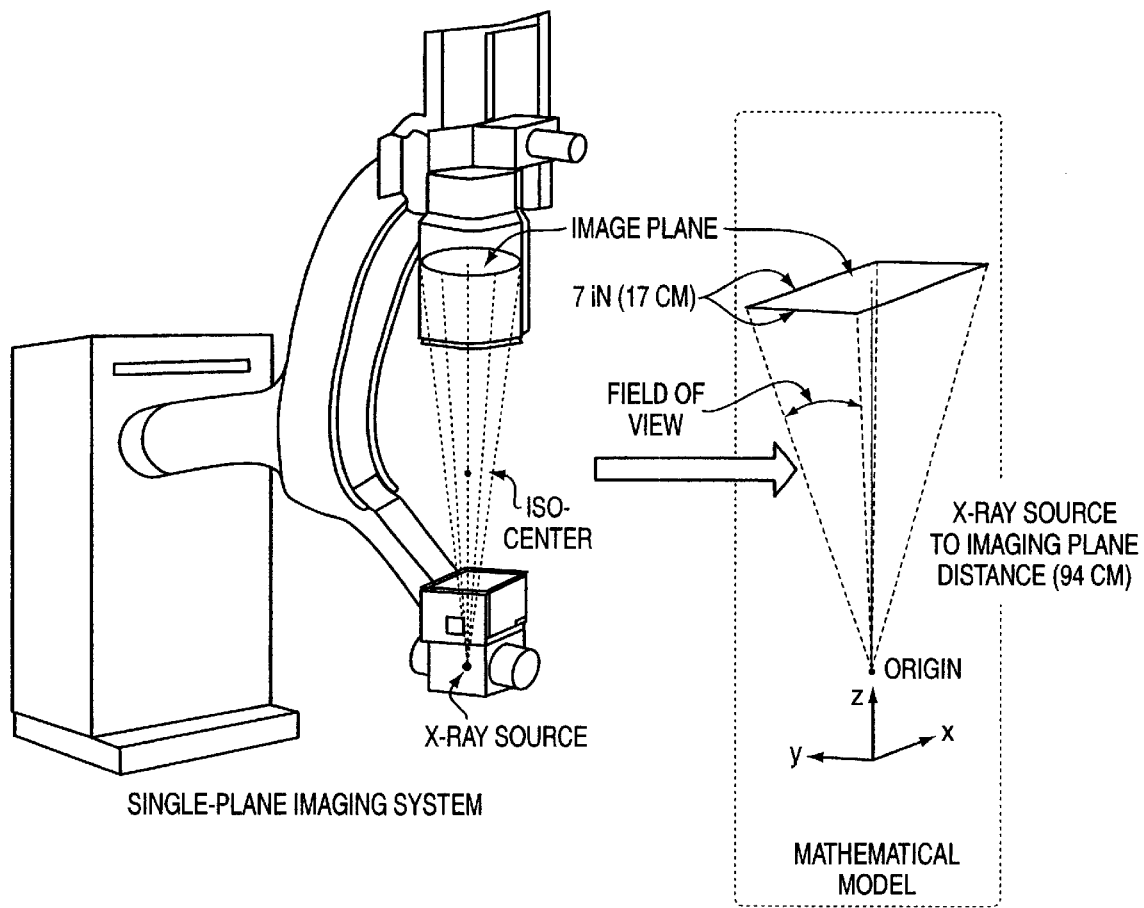
FIG. 5 is a diagram of intrinsic imaging parameters of a typical single plane imaging system with 7" by 7" field-of-view and 94 cm SID characterized by mathematical model.
Figure 6:
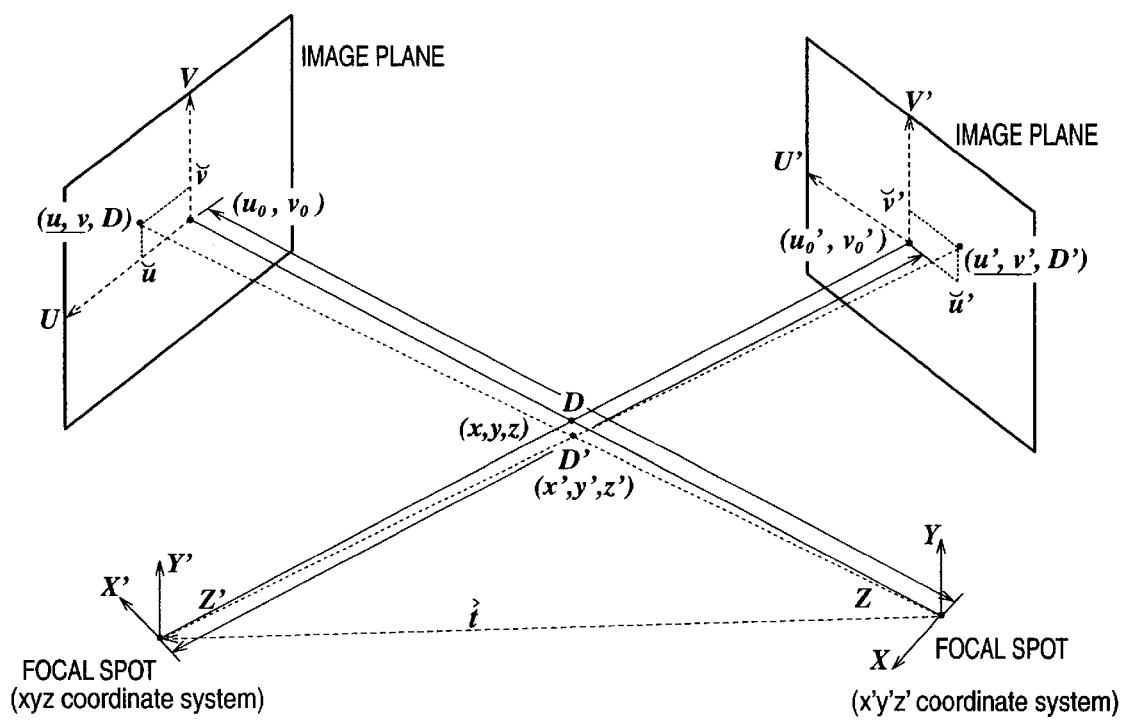
FIG. 6 depicts a mathematical model of two projections, showing a 3-D object point and its projection in two views.
Figure 7:
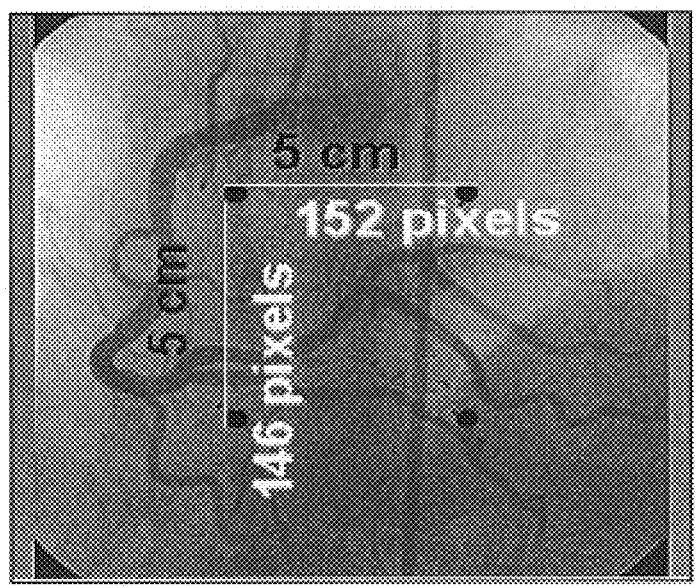
FIG. 7 is exemplary of estimated pixel size on 7" field-of-view.
Figure 8:
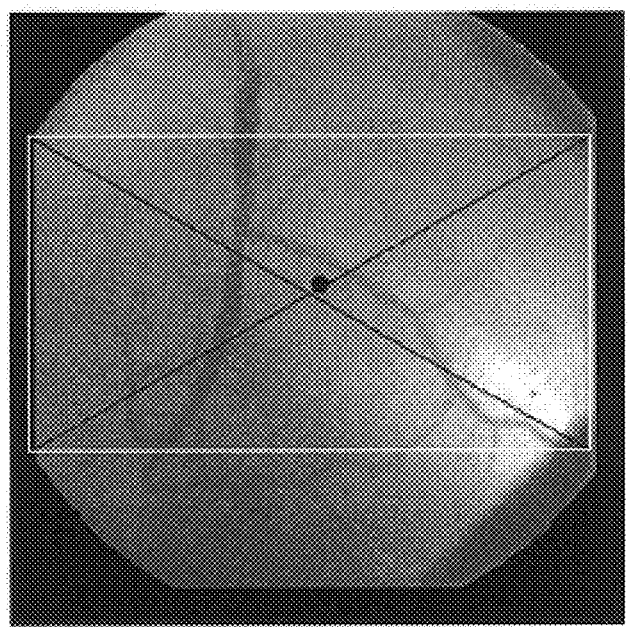
FIG. 8 is exemplary of the determination of the image centroid by calculation of the intersection of two lines.
Figure 9:
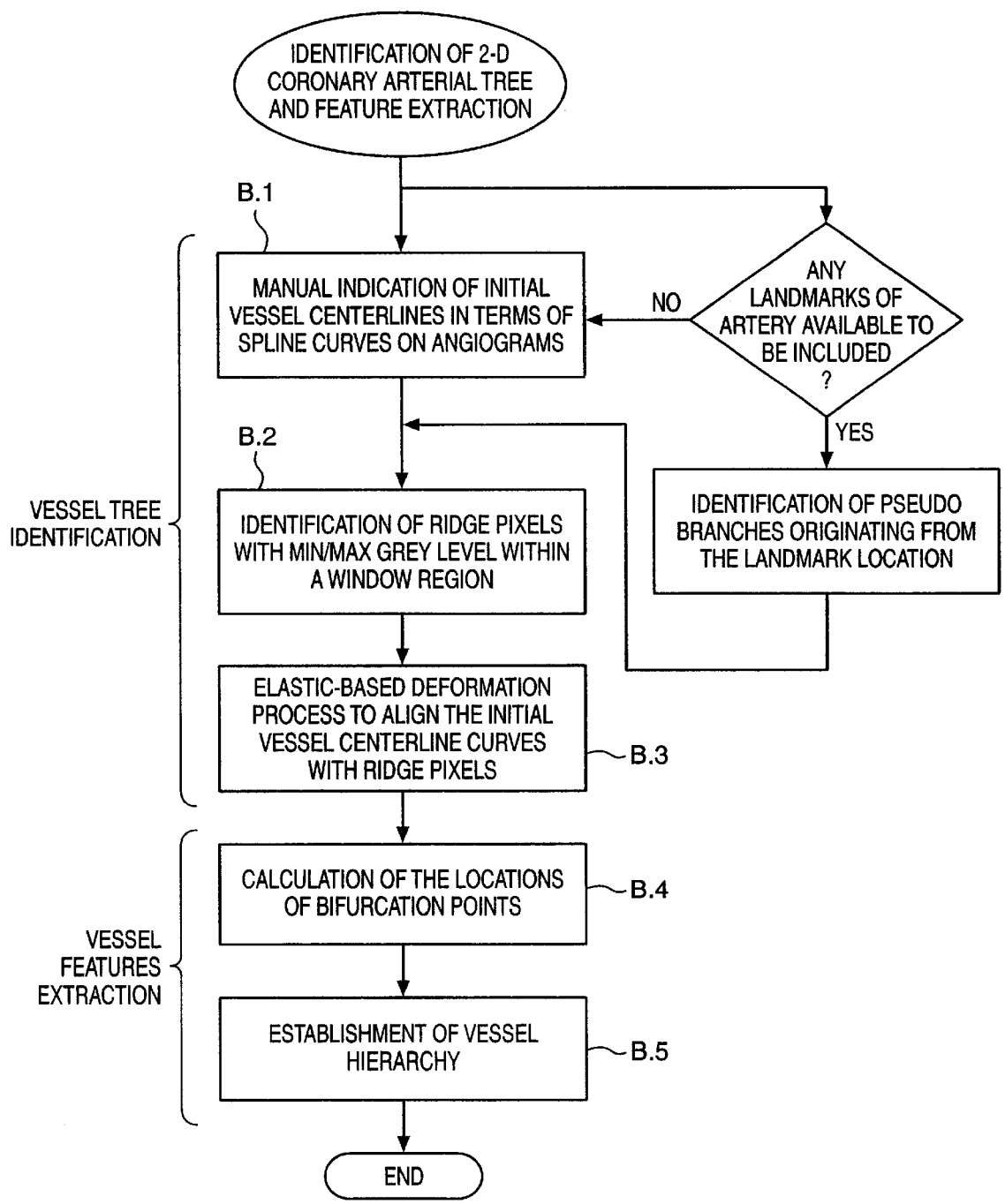
FIG. 9 is a flowchart providing additional details of the identification of 2-D coronary arterial tree and feature extraction.

A pair of angiographic views are acquired by a typical single-plane or biplane imaging system as shown in FIG. 3 and FIG. 4 with intrinsic imaging parameters as illustrated in FIG. 5. The spatial relationship of the acquired two views can be characterized by use of a mathematical model as shown in FIG. 6. The imaging system parameters including pixel size and the imaging center coordinates are calculated as shown in FIG. 7 and FIG. 8, respectively. Once the information are calculated, they will be utilized in al the subsequent 3-D reconstruction process. After routine cardiac catheterization is initiated, a standard coronary arteriogram is completed in two standard views based on one injections in a bi-plane imaging system. With the acquired two angiographic sequences, a pair of images were chosen corresponding to the same or close acquisition time instance (e.g., end-diastole) in the respective cardiac cycles. They were transferred to the computer workstation through the fiber optic link for analysis and reconstruction. The transfer rate is 2 seconds per image with the size of 512×512 pixels and one byte storage per pixel.

B. Segmentation and Feature Extraction

Figure 19:
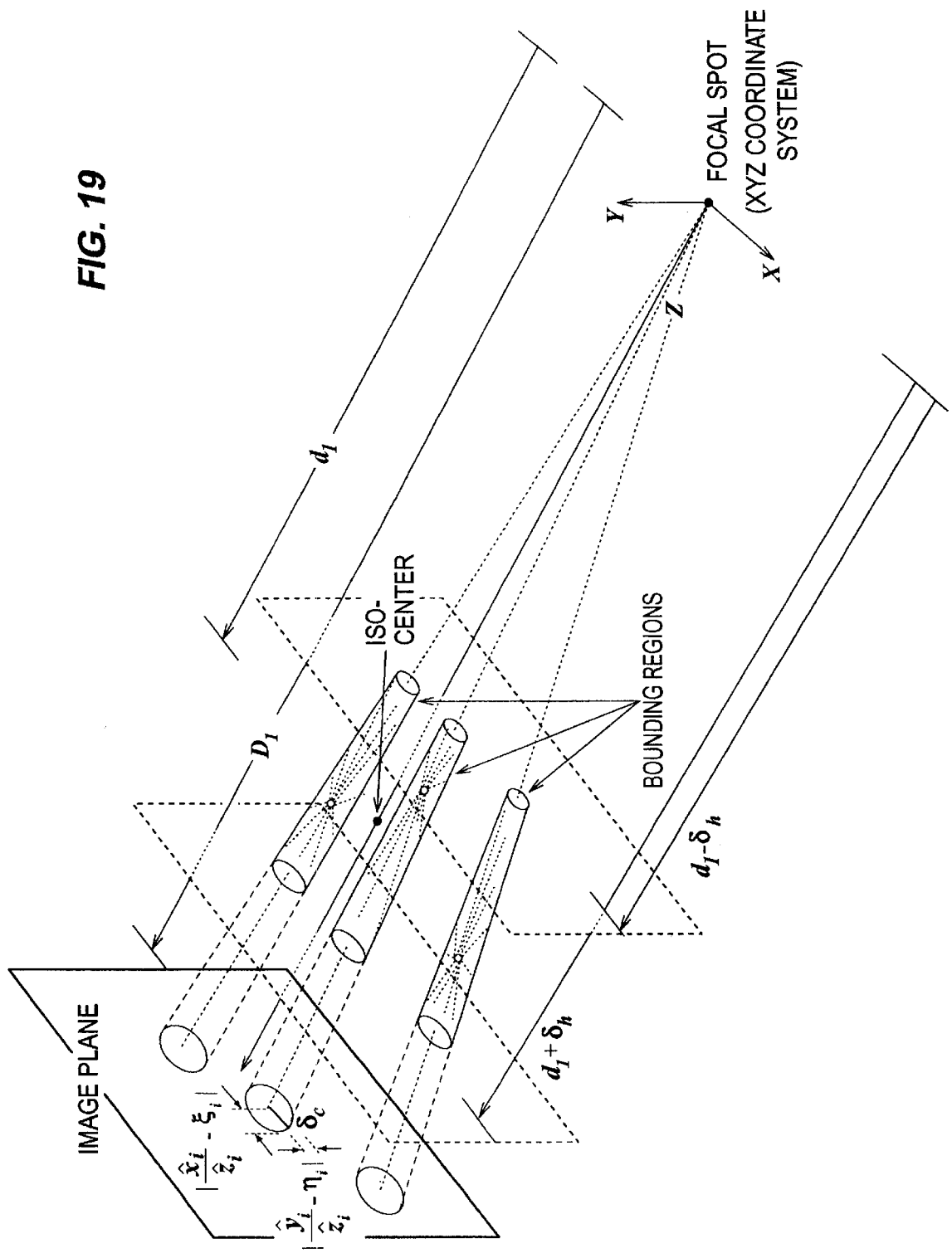
FIG. 19 depicts cone-shaped bounding regions used to constrain the calculated 3-D points.

Details of the methods for defining segments and extracting features from the arterial tree are shown in the flowchart of FIG. 19.

Figure 10:
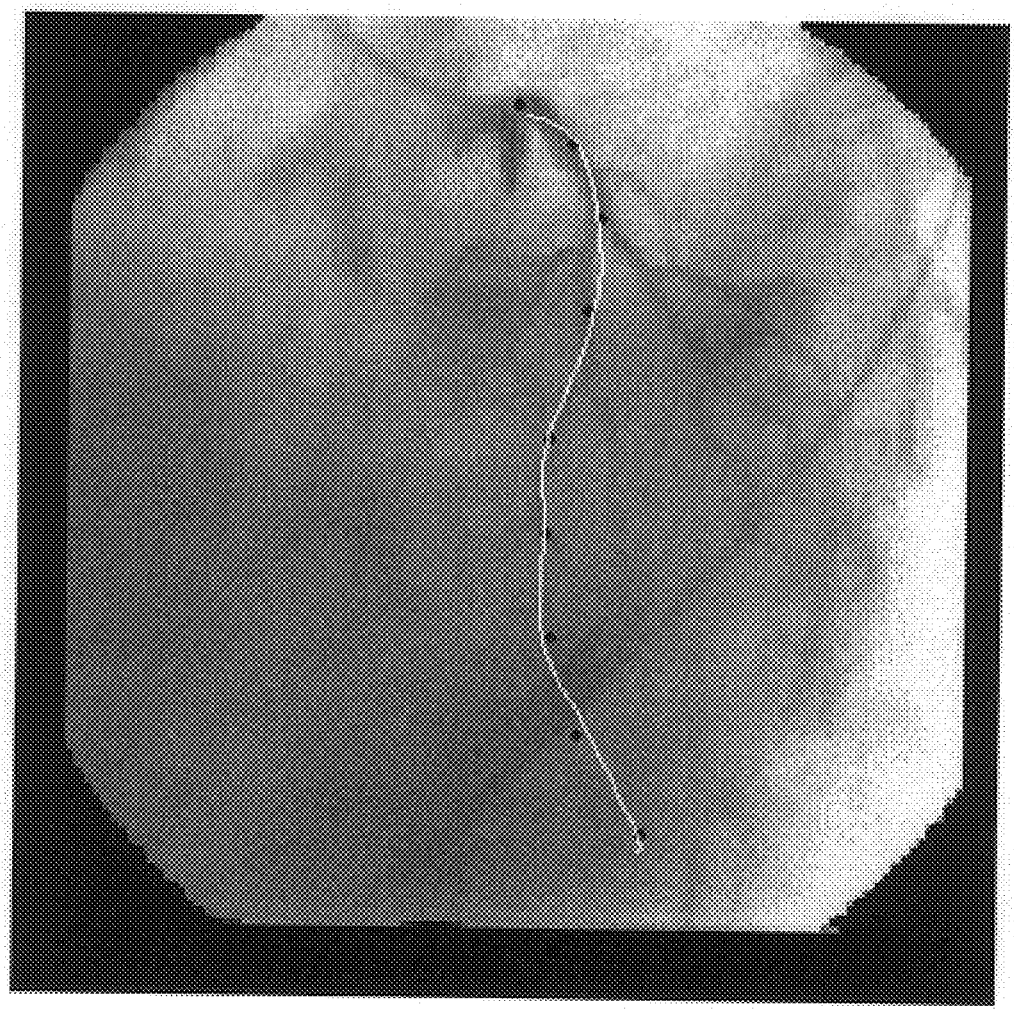
FIG. 10 depicts a manual indication of initial vessel centerline by selection of a sequence of points.
Figure 11:
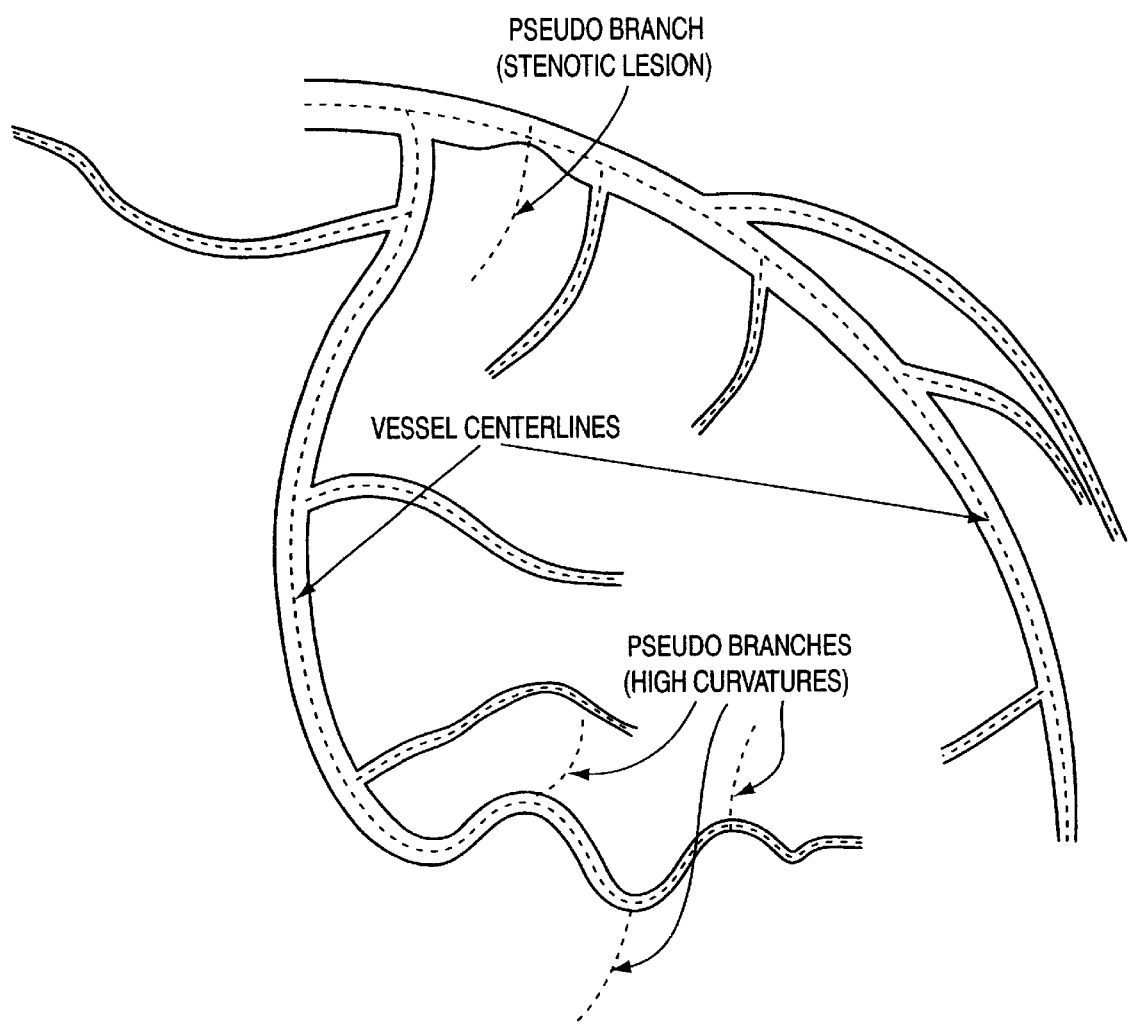
FIG. 11 depicts a manual indication of pseudo-branches by selection of a sequence of points originating from a desired landmark.
Figure 12:
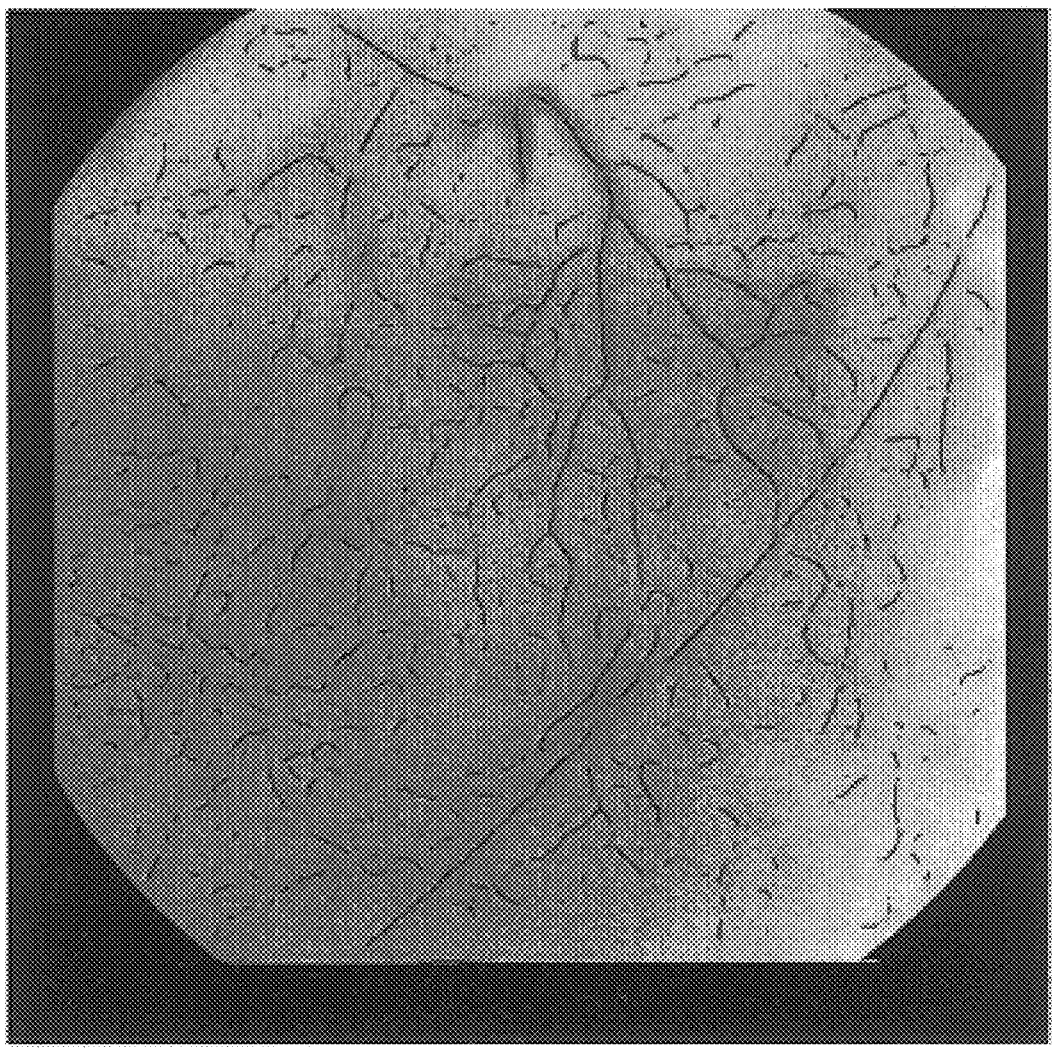
FIG. 12 depicts resultant ridge-point map where each dot corresponds to a local minima grey level.
Figure 13:
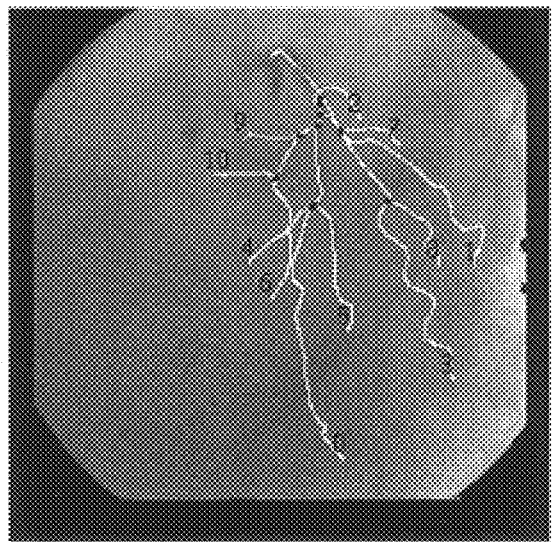
FIG. 13 depicts final results of deformation process after an initial curve is aligned with the actual vessel centerlines.

A semi-automatic system based on the technique of deformation model and segmentation technique was employed for identification of the 2-D coronary arterial tree in the given angiograms. The required user interaction in the identification process involves only the indication of several points inside the lumen of each artery, near the projection of vessel centerline in the angiogram as shown in FIG. 10. The artery with stenotic lesion or tortuous shape can be selected as landmarks to improve the reconstruction results as shown in FIG. 11. Afterwards, a spline-curve is formed based on the selected points, which serves as the initial centerline of the vessel. Meanwhile, an operator was automatically applied to the image to identify those pixels which are local minimum on intensity (i.e., the intensity of coronary arterial structures is darker than that of background). These identified pixels indicate the location of vessel centerline as shown in FIG. 12. By use of the deformation process, the identified pixels serve as the external forces to act on the initial model curve such that it will be gradually deformed and finally resides on the actual centerline of vessel as shown in FIG. 13.

Figure 14:
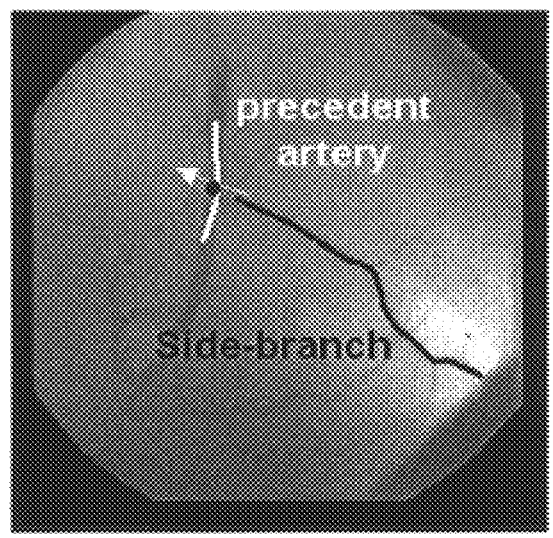
FIG. 14 depicts a bifurcation point calculated by finding the intersection between a side branch and the precedent vessel.

The identified centerlines and the branching relationships are used for construction of the vessel hierarchy in each angiogram by a labeling process according to the anatomy and connectivity among the primary and secondary coronary arteries as shown in FIG. 14. The labeling process on the coronary tree is performed automatically by application of the algorithm of the breadth-first search to traverse identified vessel centerlines and associated bifurcations. From each vessel of the coronary tree that is currently visited, this approach tries to search as broadly as possible by next visiting all of the vessel centerlines that are adjacent to it, and finally results in a vessel hierarchically directed graph (digraph) containing a set of nodes with corresponding depth levels and two types of arcs (descendant and sibling arcs) defining the coronary anatomy. In the hierarchical digraph, each node represents a vessel in the coronary arterial tree, and the descendent arc connects the nodes between the vessel and its branch. If a vessel has multiple branches, the nodes associated with these branches are connected as a linked list by sibling arcs according to the branching locations relative to the proceeding vessel.

Figure 15A:
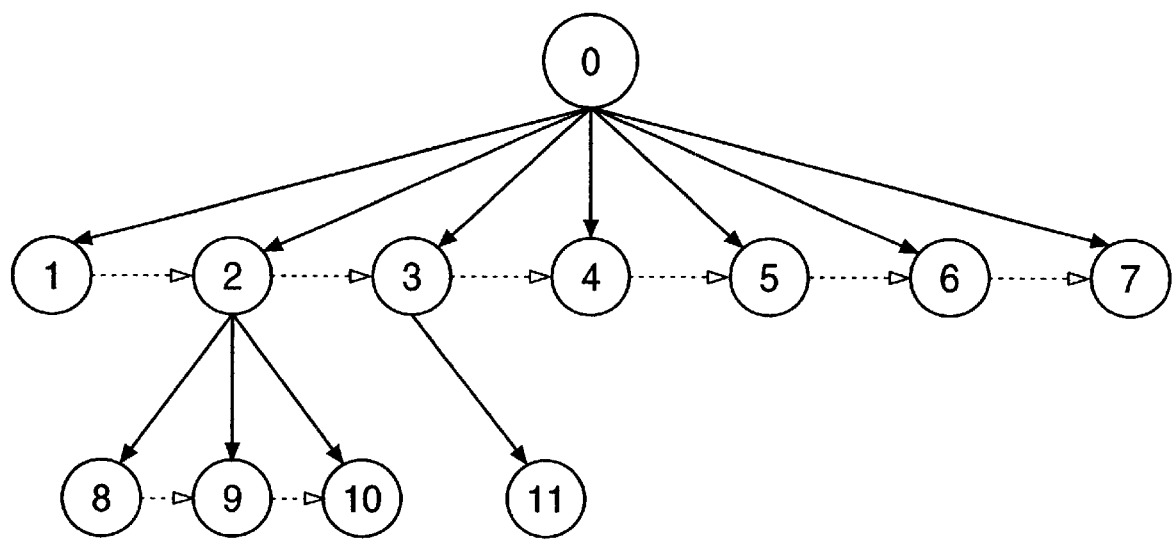
FIGS. 15a–c depict a vessel hierarchical digraph constructed from 2-D coronary tree identified in two images.
Figure 15B:
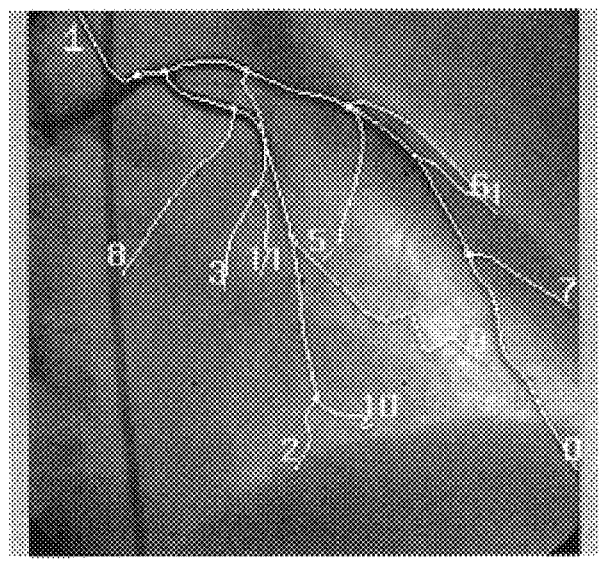
Figure 15C:
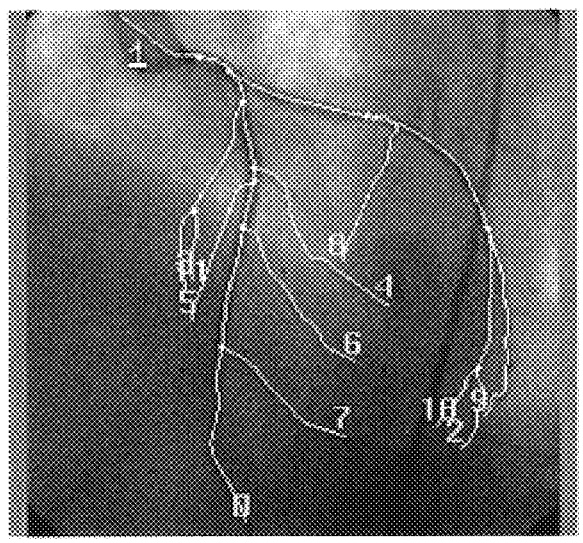

With the constructed hierarchical digraph, the remaining vessel features including bifurcation points and diameters as shown in FIGS. 15a–c are then calculated for all of the coronary arterial segments, and the results are saved into the nodes associated with the branching vessels in the hierarchical digraph.

The deformation model is controlled under the influence or energy $E_{def}$ of the internal forces characterized by smoothness constraint and external forces derived from image features.

$$E_{def} = \sum_{i=1}^{n} \left\{ \sum_{j=1}^{m_1} E_{int}(l_i(v(s_j))) + E_{ext}(l_i(v(s_j))) \right\}$$

where n denotes the number of coronary arteries in the coronary arterial tree, and $m_i$, i=1, . . . ,n denotes the number of centerline points $v(s_j)=(x(s_j), y(s_j))$ on each artery $l_i(v)$, The internal curve energy can be written as $$E_{int}(l_i(v(s_j)))=(\alpha(s_j)|v_s(s_j)|^2+\beta(s_j)|v_{ss}(s_j)|^2)/2,$$

where $\alpha(s)$ and the first order term $v_s(s)$ make the model curve like a membrane and $\beta(s)$ and the second order term $v_{ss}(s)$ make the it act like a thin plate. The external energy is derived from the ridge points of image I denoting the minimal (or maximal) gray level in a local window (e.g., k pixels by k pixels) region as $$E_{ext}(l_i(v(s_j)))=\nabla_k*(G_k(v(s_j))\oplus I))$$

where $\oplus$ denotes the convolution operator, $G_k(v(s))$ is a Gaussian based filter centered at $v(s)$ with k by k pixels of window, $\nabla_k$ denotes the ridge point filter defined within a k by k pixels of window.

C. Calculation of Transformation Characterizing the Two Views

Figure 16A:
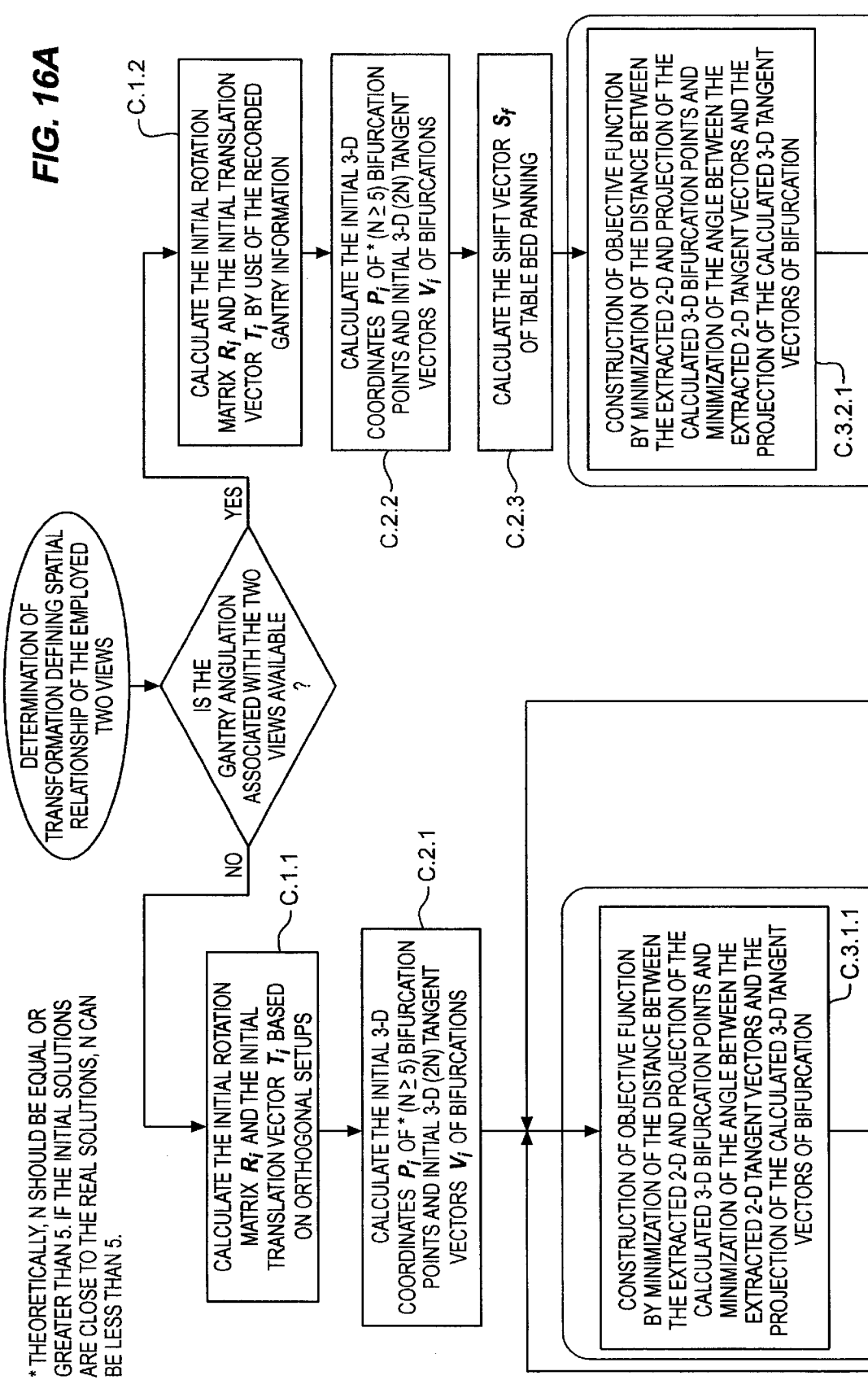
FIG. 16 is a flowchart providing additional details of the determination of the transformation defining spatial relationship of the employed two views.
Figure 16B:
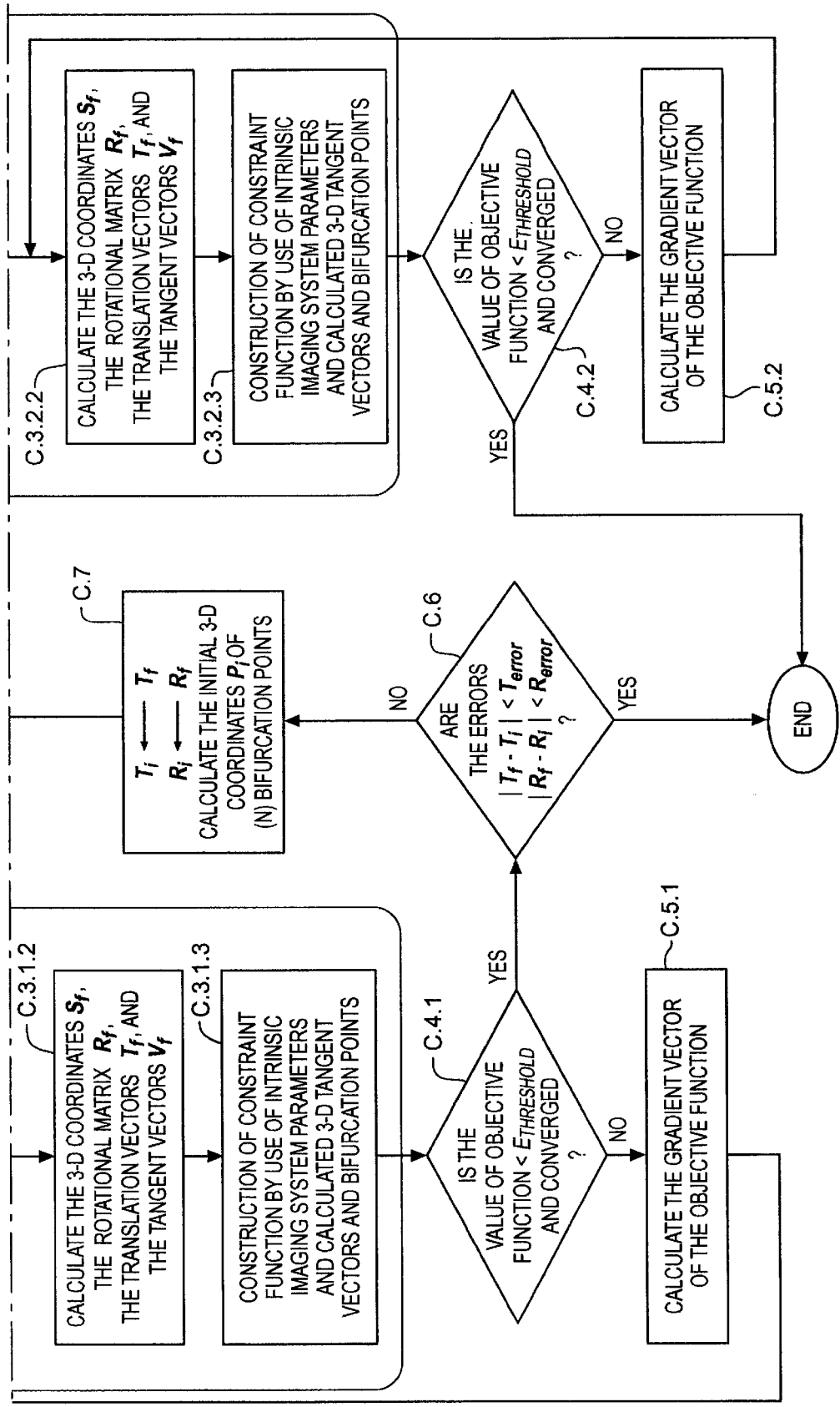

Details of the methods for transforming the views of the arterial tree are shown in the flowchart of FIG. 16.

By use of a mono-plane or biplane imaging system for image acquisitions, the locations and dimensions of imaging plane and x-ray source can be defined by use of a mathematical model as shown in FIG. 16. The spatial relationship between the employed two views can be characterized by a transformation in the forms of a rotation matrix R and a translation vector $\vec{t}$ on the basis of the respective locations of x-ray source (or focal spot) served as the origin in 3-D coordinate space.

In the first view, let $(u_i, v_i)$ denote the image coordinates of the ith object point, located at position $(x_i, y_i, z_i)$. We have $u_i=Dx_i/z_i$, $v_i=Dy_i/z_i$, where D is the perpendicular distance between the x-ray focal spot and the image plane when the view was acquired. Let $(\xi_i, \eta_i)$ denote the scaled image coordinates, defined as $\xi_i=u_i/D=x_i/z_i$, $\eta_i=v_i/D=y_i/z_i$. The second projection view of the employed bi-plane imaging system can be described in terms of a second pair of image and object coordinate systems u'v' and x'y'z' defined in an analogous manner. Scaled image coordinates $(\xi_i', \eta_i')$ in the second view for the ith object point at position $(x_i', y_i', z_i')$ are given by $\xi_i'=u_i'/D'=x_i'/z_i'$, $\eta_i'=v_i'/D'=y_i'/z_i'$. The spatial relationship between the two views can be characterized by $$\begin{bmatrix} x_i' \\ y_i' \\ z_i' \end{bmatrix} = R \cdot \left( \begin{bmatrix} x_i \\ y_i \\ z_i \end{bmatrix} - \vec{t} \right) = \begin{bmatrix} r_{11} & r_{12} & r_{13} \\ r_{21} & r_{22} & r_{23} \\ r_{31} & r_{32} & r_{33} \end{bmatrix} \cdot \begin{bmatrix} x_i - t_x \\ y_i - t_y \\ z_i - t_z \end{bmatrix}.$$

In our previously proposed technique, the transformation was calculated based on the identified bifurcation points of the 2-D coronary arterial trees in the two views and can be only effective to the images acquired from the biplane systems or a single-plane imaging system without table panning or movement during the acquisition.

In this invention, a new 3-D reconstruction technique is developed by incorporation of the corresponding bifurcation points and the vessel directional vectors of bifurcations. The proposed method can also be employed to obtain accurate results of 3-D reconstruction without the need of ECG-triggered acquisition even when there is table panning or moving during the injection. The required prior information (i.e., the intrinsic parameters of single-plane imaging system) for 3-D reconstruction include: (1) the distance between each focal spot and its image plane, SID (focal-spot to imaging-plane distance), (2) the field of view in terms of the pixel size, $p_{size}$(e.g., 0.3 mm/pixel), (3) the distance ff between the two focal spots or the known 3-D distance between two points in the projection images, and (4) iso-center distance (with respect to which the rotary motion of the gantry arm rotates) relative to the focal spot. Items (1) and (2) are prerequisite and (3) and (4) are optional.

Figure 17:
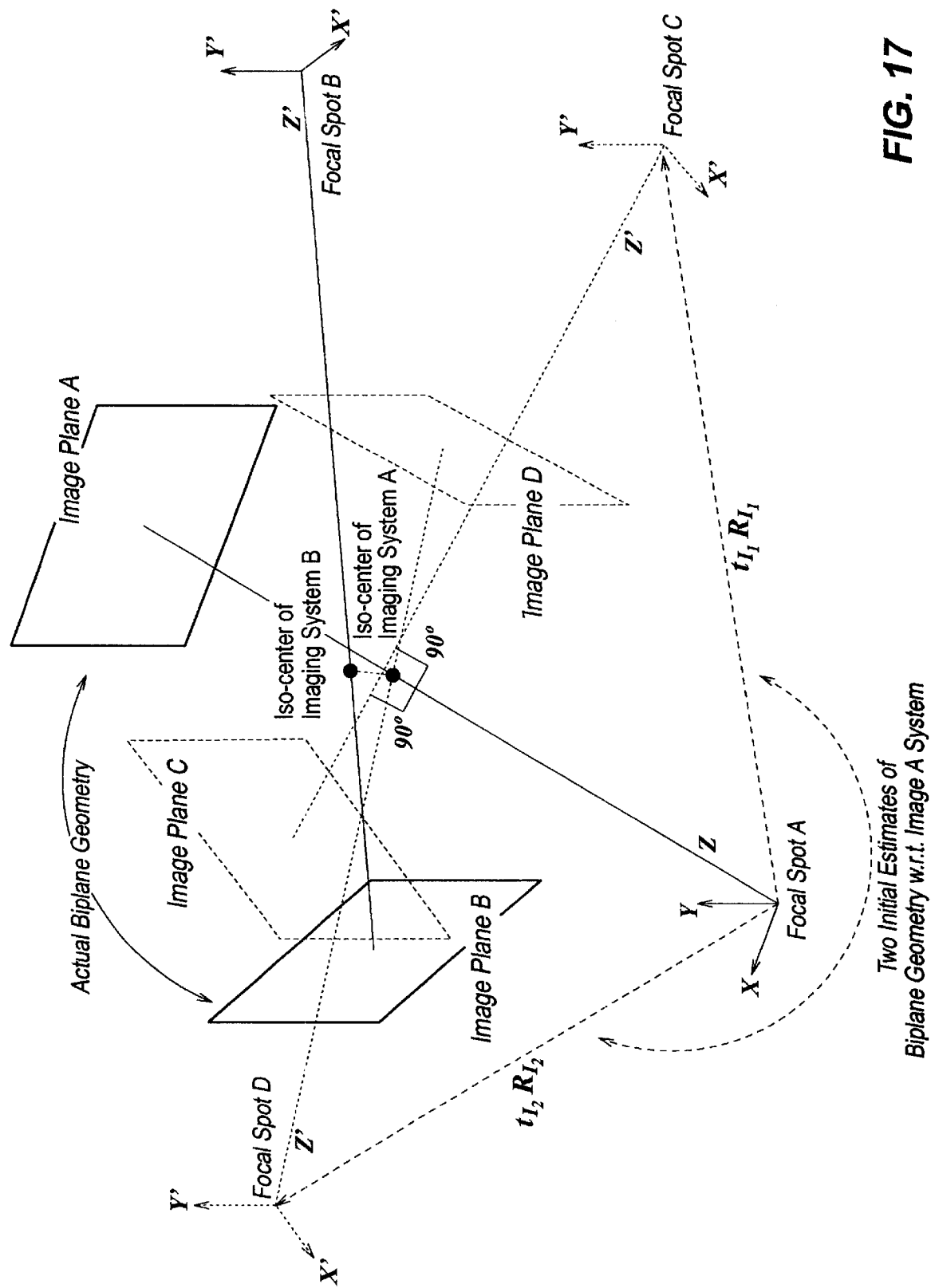
FIG. 17 depicts the actual and initially calculated bi-plane geometry.

In the single-plane imaging system utilized, the gantry angulation associated with different view is always recorded and accompany with the acquired image file. However, the transformation directly calculated from the recorded gantry angles may not accurately define the spatial relationship between the two views due to (i) images non-simultaneously acquired from two different cardiac cycles and (ii) table panning or movement during the acquisitions. Although such a directly calculated transformation can not truly characterize the two views, the resultant estimate is generally good enough to serve as an initial guess to the non-linear minimization process for obtaining an optimal solution. In the biplane imaging system utilized, the gantry angulations associated with different views may or may not be recorded with the acquired image file. If the gantry angulations of the employed two views are unknown, orthogonal angles will be used as the initial solutions of transformation as shown in FIG. 17 by use of the equations herein below.

If the gantry angulations are known in advance, however, the transformation directly calculated from the recorded gantry angles may not accurately define the spatial relationship between the two views due to (i) patient's respiration, (ii) non-synchronous x-ray source firing on the x-ray tubes, and (iii) mis-alignment of the respective iso-centers corresponding to the individual x-ray gantry instruments of the bi-plane system. Although such a directly calculated transformation can not truly characterize the two views, the resultant estimate is generally good enough to serve as an initial guess to the non-linear minimization process for obtaining an optimal solution. With the initial solution calculated from the pre-defined orthogonal angles or recorded gantry angles, the global minimum resulting from the non-linear optimization can be guaranteed since the initial estimate is close to the actual solution.

Figure 18:
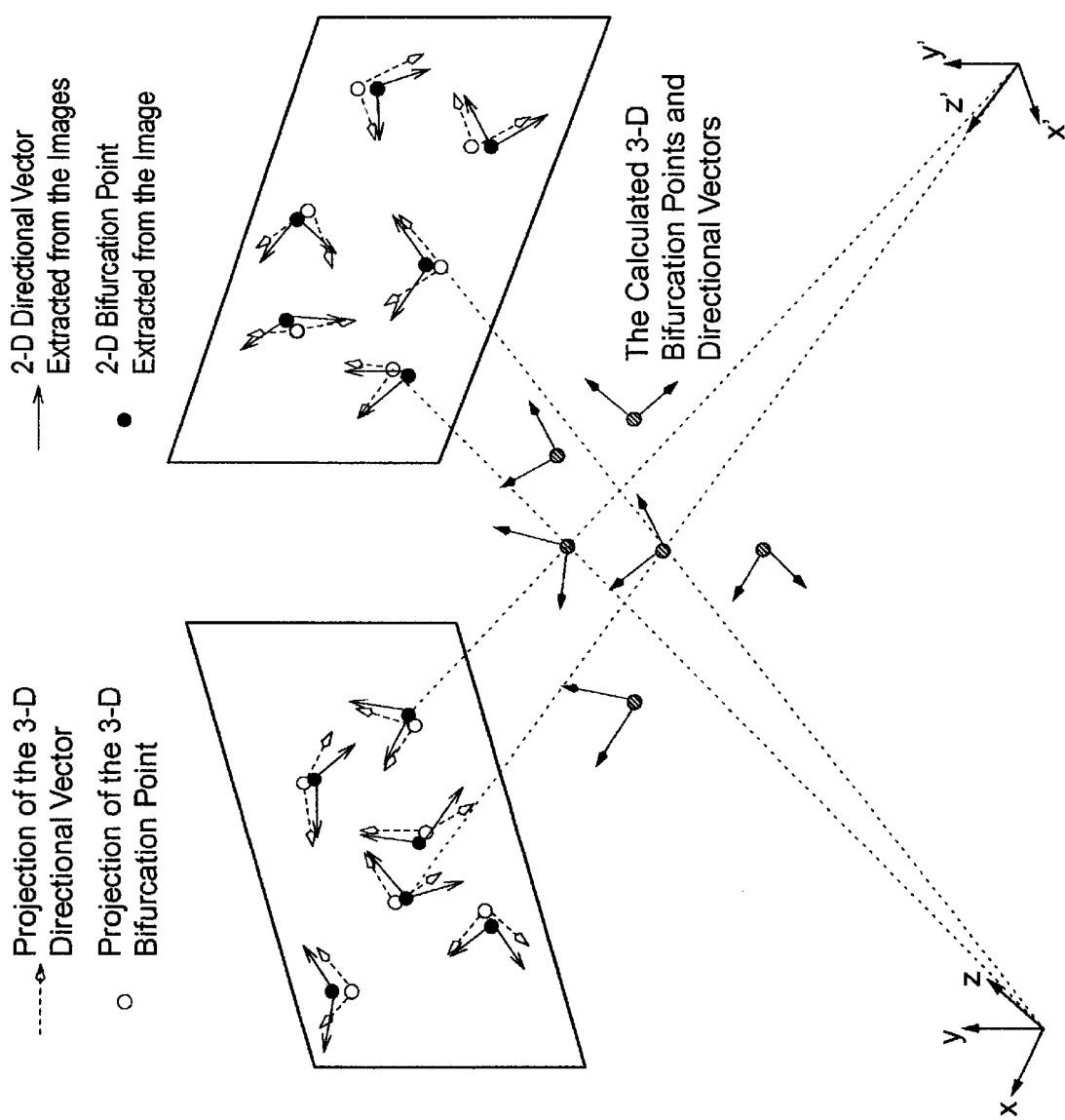
FIG. 18 depicts the calculation of bi-plane transformation based on bifurcation points and directional vectors.

On the basis of the initial solution, the final accurate transformation is calculated from an objective function by minimization of (1) image point errors in term of the square of Euclidean distance between the 2-D input data and the projection of calculated 3-D data points and (2) directional vector errors between the 2-D vessel directional vectors and the projection of calculated 3-D vessel directional vectors based on equations below and as shown in FIG. 18 subject the constraints shown below and in FIG. 19.

The initial estimates of the z and z' axes of the two imaging systems are taken to be orthogonal in this situation, and the unit translation vector are assumed to lie on the x-z plane. Two different initial solutions ($\overline{R_1}$, $\vec{t}_{\overline{u1}}$) and ($\overline{R_2}$, $\vec{t}_{\overline{u2}}$) are employed as follows:

$$\overline{R}_1 = \begin{bmatrix} 0 & 0 & -1 \\ 0 & 1 & 0 \\ 1 & 0 & 0 \end{bmatrix}, \quad \vec{t}_{\overline{n}_1} = \begin{bmatrix} \frac{-D'}{\alpha' \cdot t_d} \\ 0 \\ \frac{D}{\alpha \cdot t_d} \end{bmatrix}, \quad \text{and}$$

$$\overline{R}_2 = \begin{bmatrix} 0 & 0 & 1 \\ 0 & 1 & 0 \\ -1 & 0 & 0 \end{bmatrix}, \quad \vec{t}_{\overline{n}_2} = \begin{bmatrix} \frac{D'}{\alpha' \cdot t_d} \\ 0 \\ \frac{D}{\alpha \cdot t_d} \end{bmatrix},$$

where D and D' denote the SID distances, α and α' are the MF factors, and $t_d$ represents the magnitude of $\vec{t}$. If the magnitude of $\vec{t}$ is not available, an approximate measure is taken as:

$$t_d = \sqrt{\left(\frac{D}{\alpha}\right)^2 + \left(\frac{D'}{\alpha'}\right)^2}.$$

Let $\alpha_1,\beta_1$) and ($\alpha_2,\beta_2$) denote the gantry orientations of the 1st and 2nd views, where $\alpha_x$ and $\beta_x$ are the LAO/RAO, and CRAN/CAUD angles, respectively. Let ($x_1$, $y_1$, $z_1$) and ($x_2$, $Y_2$, $z_2$) denote the respective position vectors defined in the 1st and 2nd views. The spatial relationship between the two views can be characterized based on the recorded gantry information as $$\begin{bmatrix} x_2 \\ y_2 \\ z_2 \end{bmatrix} = R \cdot \left( \begin{bmatrix} x_1 \\ y_1 \\ z_1 \end{bmatrix} - \vec{t} \right) = \begin{bmatrix} r_{11} & r_{12} & r_{13} \\ r_{21} & r_{22} & r_{23} \\ r_{31} & r_{32} & r_{33} \end{bmatrix} \cdot \begin{bmatrix} x_1 - t_x \\ y_1 - t_y \\ z_1 - t_z \end{bmatrix}.$$

where $$R = R_x(-\alpha_1) \cdot R_y(\beta_1) \cdot R_y(-\beta_2) \cdot R_x(\alpha_1),$$

and $$\begin{bmatrix} t_x \\ t_y \\ t_z \end{bmatrix} = \left( R_x(-\alpha_1) \cdot R_y(\beta_1) \cdot R_y(-\beta_2) \cdot R_x(\alpha_2) \cdot \begin{bmatrix} 0 \\ 0 \\ -Iso_2 \end{bmatrix} \right) - \begin{bmatrix} 0 \\ 0 \\ -Iso_1 \end{bmatrix}.$$

The matrices $R_x(\theta)$ and $R_y(\phi)$ denote the rotation with respect to x-axis and y-axis with $\theta$ and $\phi$ angles, respectively, and $Iso_1$ and $Iso_2$ denote the two iso-center distances associated with the 1st and 2nd views.

The scaled 3-D points ($\overline{x}'_i$, $\overline{y}'_i$, $\overline{z}'_i$) defined in the x'y'z' coordinate system are initialized as $$\overline{x}'_i = \frac{u'_i}{\alpha' \cdot t_d}, \quad \overline{y}'_i = \frac{v'_i}{\alpha' \cdot t_d}, \quad \overline{z}'_i = \frac{D'}{\alpha' \cdot t_d}, \quad i = 1, \ldots, n,$$

where ($u'_i$, $v'_i$) denotes the 2-D input coordinates of the input points. In other words, the initial scaled 3D points are taken to lie in a plane that is parallel to the image plane in the x'y'z' system and passes through the iso-center.

Let $\vec{\mu}_i = \{\mu_{i_x}, \mu_{i_y}\}$ and $\vec{\mu}'_i = \{\mu'_{i_x}, \mu'_{i_y}\}$ denote the respective identified 2-D vessel directional unit vectors of bifurcations in each views. Let $v = \{\vec{v}_1, \vec{v}_2, \ldots, \text{and } \vec{v}_n\}$ and $v' = \{\vec{v}'_1,$ $\vec{v}'_2, \ldots, \vec{v}'_n\}$ denote the calculated 3-D vessel directional unit vectors of bifurcations in two views. The initial estimate of the 3-D directional vectors defined in the two views are characterized as $$\vec{\mu}_i = [\mu_{i_x}, \mu_{i_y}, 0]^t, \vec{\mu}'_i = [\mu'_{i_x}, \mu'_{i_y}, 0]^t$$

With the known estimates of the scaled image coordinates ($\xi_i$, $\eta_i$) and ($\xi_i'$, $\eta_i'$), transformation in terms of R and $\vec{t}$, the object coordinates ($x_i, y_i, z_i$) can be calculated as follows:

$$\begin{bmatrix} r_{11} - r_{31}\xi_i' & r_{12} - r_{32}\xi_i' & r_{13} - r_{33}\xi_i' \\ r_{21} - r_{31}\eta_i' & r_{22} - r_{32}\eta_i' & r_{23} - r_{33}\eta_i' \\ 1 & 0 & -\xi_i \\ 0 & 1 & -\eta_i \end{bmatrix} \begin{bmatrix} x_i \\ y_i \\ z_i \end{bmatrix} = \begin{bmatrix} \vec{a} \cdot \vec{t} \\ \vec{b} \cdot \vec{t} \\ 0 \\ 0 \end{bmatrix},$$

where $$\vec{a} = \begin{bmatrix} r_{11} - r_{31}\xi_i' \\ r_{12} - r_{32}\xi_i' \\ r_{13} - r_{33}\xi_i' \end{bmatrix}, \quad \vec{b} = \begin{bmatrix} r_{21} - r_{31}\eta_i' \\ r_{22} - r_{32}\eta_i' \\ r_{23} - r_{33}\eta_i' \end{bmatrix}.$$

The scaled coordinates of the initial 3D points ($\overline{x}_i, \overline{y}_i, \overline{z}_i$) defined in the x'y'z! coordinate system are calculated by ⊛

$$([x_i, y_i, z_i]^t - \vec{t})/|\vec{t}|.$$

Let $\vec{\mu}_i = \{\mu_{i_x}, \mu_{i_y}\}$ and $\vec{\mu}'_i = \{\mu'_{i_x}, \mu'_{i_y}\}$ denote the respective identified 2-D vessel directional unit vectors of bifurcations in each view. Let $v = \{\vec{v}_1, \vec{v}_2, \ldots, \vec{v}_n\}$ and $v' = \{\vec{v}'_1, \vec{v}'_2, \ldots, \vec{v}'_n\}$ denote the calculated 3-D vessel directional unit vectors of bifurcations in two views. The initial estimate of the 3-D directional vectors defined in the two views are characterized as $$\vec{\mu}_i = [\mu_{i_x}, \mu_{i_y}, 0]^t, \vec{\mu}'_i = [\mu'_{i_x}, \mu'_{i_y}, 0]^t$$

When there occurs a table panning or movement during the image acquisitions, a translation vector $\vec{r} = [r_x, r_y, r_z]^t$ that defines the initial solution of such a movement can be estimated if the transformation in terms of a rotation matrix and a translation vector is known as $$\min_{\vec{r}} \mathcal{F}(\vec{r}) = \sum_{i=1}^{n} \left( \xi_i' - \frac{x_i'}{z_i'} \right)^2 + \left( \eta_i' - \frac{y_i'}{z_i'} \right)^2 + \left( \xi_i - \frac{\vec{c}_1 \cdot \vec{p}_i' + t_x + r_x}{\vec{c}_3 \cdot \vec{p}_i' + t_z + r_z} \right)^2 + \left( \eta_i - \frac{\vec{c}_2 \cdot \vec{p}_i' + t_y + r_y}{\vec{c}_3 \cdot \vec{p}_i' + t_z + r_z} \right)^2,$$

where $\vec{c}_k$ denotes the respective kth column vectors of matrix R. The initial estimates of the 3-D bifurcation points $\vec{p}'_i$, i=1, ..., n can be calculated based on the formula as shown in the above equations.

Given the set of 2-D bifurcation points and directional vectors extracted from the pair of images, "optimal" estimates of the transformation and 3-D bifurcation points are obtained by finding the minimum of the following equation:

$$\min_{p,p',v,v'} \mathcal{F}_1(P, P', v, v') = \sum_{i=1}^{n}\left(\xi_i - \frac{x_i}{z_i}\right)^2 + \left(\eta_i - \frac{y_i}{z_i}\right)^2 +$$
$$\left(\xi'_i - \frac{x'_i}{z'_i}\right)^2 + \left(\eta'_i - \frac{y'_i}{z'_i}\right)^2 + \|\vec{\mu}_i - [\vec{v}_i]_{xy}\|^2 + \|\vec{\mu}'_i - [\vec{v}'_i]_{x'y'}\|^2,$$

where n denotes the number of pairs of corresponding points extracted from the two images and P and P' denote the sets of 3-D object position vectors (i.e., bifurcation points), $\vec{p}_i=(x_i,y_i,z_i)$ and $\vec{p}'_i=(x'_i,y'_i,z'_i)$, respectively, $\vec{\mu}_i$ and $\vec{\mu}'_i$, denote the respective 2-D vessel directional vectors of bifurcations in each views, and $v=\{\vec{v}_1, \vec{v}_2, \ldots, \vec{v}_n\}$ and $v'=\{\vec{v}'_1, \vec{v}'_2, \ldots, \vec{v}'_n\}$ denote the calculated 3-D vessel directional vectors of bifurcations in two views, and $[\vec{v}_i]_{xy}$ and $[\vec{v}'_i]_{x'y'}$, $i=1,\ldots,n$, denote the calculated 2-D projection vectors from $\vec{v}_i$ and $\vec{v}'_i$ onto the image planes, respectively.

Since the relationship between the two views can be characterized by a rotation matrix R and a translation vector $\vec{t}=[t_x, t_y, t_z]^t$, the above equation can be expressed as $$\min_{R,\vec{t},p',v'} \mathcal{F}_2(R, \vec{t}, p', v') =$$
$$\sum_{i=1}^{n}\left(\xi'_i - \frac{x'_i}{z'_i}\right)^2 + \left(\eta'_i - \frac{y'_i}{z'_i}\right)^2 + \left(\xi_i - \frac{\vec{c}_1 \cdot \vec{p}'_i + t_x}{\vec{c}_3 \cdot \vec{p}'_i + t_z}\right)^2 +$$
$$\left(\eta_i - \frac{\vec{c}_2 \cdot \vec{p}'_i + t_y}{\vec{c}_3 \cdot \vec{p}'_i + t_z}\right)^2 + \|\vec{\mu}_i - [R^{-1} \cdot \vec{v}'_i]_{xy}\|^2 + \|\vec{\mu}'_i - [\vec{v}'_i]_{x'y'}\|^2,$$

where $\vec{c}_k$ denotes the respective kth column vectors of matrix R and $R^1$ is the inverse matrix of R. When there occurs a table panning or movement during the image acquisitions, however, the above equation can not truly characterize the spatial relationship of the two views. Instead, a translation vector $\vec{r}=[r_x, r_y, r_z]^t$ needs to be incorporated to characterize such a situation, and the above equation can be rewritten as $$\min_{R,\vec{t},p',v',\vec{r}} \mathcal{F}_3(R, \vec{t}, p', v'\vec{r}) =$$
$$\sum_{i=1}^{n}\left(\xi'_i - \frac{x'_i}{z'_i}\right)^2 + \left(\eta'_i - \frac{y'_i}{z'_i}\right)^2 + \left(\xi_i - \frac{\vec{c}_1 \cdot \vec{p}'_i + t_x + r_x}{\vec{c}_3 \cdot \vec{p}'_i + t_z + r_z}\right)^2 +$$
$$\left(\eta_i - \frac{\vec{c}_2 \cdot \vec{p}'_i + t_y + r_y}{\vec{c}_3 \cdot \vec{p}'_i + t_z + r_z}\right)^2 + \|\vec{\mu}_i - [R^{-1} \cdot \vec{v}'_i]_{xy}\|^2 + \|\vec{\mu}'_i - [\vec{v}'_i]_{x'y'}\|^2,$$

It is well known that any 3D rigid motion can be decomposed uniquely into a translation and a rotation by an angle θ around a unit vector $\vec{v}_u$ passing through the origin of the coordinate system. In the proposed method, a quaternion denoted by $\tilde{q}=(s,\vec{w})=(s, w_1, w_2, w_3)$ of norm equal to 1 is employed to represent the rotation transformation as $$\vec{w}=\sin(\theta/2)\vec{v}_u, \quad s=\cos(\theta/2).$$

For any quaternion $\tilde{q}=(s,\vec{w})=(s, w_1, w_2, W_3)$ of norm 1, there exists a rotation matrix defined as:

$$R \equiv 2\begin{vmatrix} s^2 + (w_1)^2 - \frac{1}{2} & w_1w_2 - sw_3 & sw_2 + w_1w_3 \\ w_1w_2 + sw_3 & s^2 + (w_2)^2 - \frac{1}{2} & w_2w_3 - sw_1 \\ w_1w_3 - sw_2 & sw_1 + w_2w_3 & s^2 + (w_3)^2 - \frac{1}{2} \end{vmatrix}$$

With this quaternion representation, the above equations can be rewritten as $$\min_{\tilde{q},\vec{t},p'} \mathcal{F}_4(\tilde{q}, \vec{t}_u \hat{p}') = \sum_{i=1}^{n}\left(\xi'_i - \frac{\hat{x}'_i}{\hat{z}'_i}\right)^2 + \left(\eta'_i - \frac{\hat{y}'_i}{\hat{z}'_i}\right)^2 +$$

$$\left\{\xi_i - \frac{2(s^2 + w_1^2 - 1/2)\hat{x}'_i + 2(w_1w_2 + sw_3)\hat{y}'_i +}{2(w_1w_3 - sw_2)\hat{z}'_i + t_{u_x} + \vec{r}_x}\right\}^2 +$$
$$\left\{\eta_i - \frac{2(w_1w_2 - sw_3)\hat{x}'_i + 2(s^2 + w_2^2 - 1/2)\hat{y}'_i +}{2(sw_1 + w_2w_3)\hat{z}'_i + t_{u_y} + \vec{r}_y}\right\}^2 +$$

$$\|\vec{\mu}_i - [R^{-1} \cdot \vec{v}'_i]_{xy}\|^2 + \|\vec{\mu}'_i - [\vec{v}'_i]_{x'y'}\|^2,$$

where $(\hat{x}'_i, \hat{y}'_i, \hat{z}'_i)$ denotes the scaled 3D coordinates, within a scale factor of the magnitude of the translation vector $|\vec{t}|$ and where $[tu_x, tu_y, tu_z]^t$ denotes the unit translation vector that corresponds to $\vec{t}$, and $\vec{r}/|\vec{t}|=[\vec{r}_x, \vec{r}_y, \vec{r}_z]$.

$C_1$: $\quad s^2 + w_1^2 + w_2^2 + w_3^2 = 1$ $C_2$: $\quad t_{u_x}^2 + t_{u_y}^2 + t_{u_z}^2 = 1$ $C_3$: $\quad 0 < \hat{z}'_i, \quad i=1,\ldots,n$ $C_4$: $\quad 0 < 2(sw_2 + w_1w_3)\hat{x}'_i + 2(w_2w_3 - sw_1)\hat{y}'_i + 2\left(s^2 + w_3^2 - \frac{1}{2}\right)\hat{z}'_i + t_{u_z} + \vec{r}_z,$
$\quad i=1,\ldots,n.$ The constraint $C_1$ characterizes the quaternion norm; the constraint $C_2$ ensures a unit translation vector; and the constraints $C_3$ and $C_4$ force the scaled coordinates $\hat{z}'_i$ and $\hat{z}_i$ to be in front of the respective focal spots.

If the iso-center distances of the biplane imaging systems or the MF factors are available, the constraints $C_3$ and $C_4$ above can be modified as:

$$\frac{D'/\alpha' - \delta_h}{|\vec{t}|} < \hat{z}'_i < \frac{D'/\alpha' + \delta_h}{|\vec{t}|}, \ldots, n$$

$$\frac{D/\alpha - \delta_h}{|\vec{t}|} < \hat{z}_i =$$

$$2\left[(sw_2 + w_1w_3)\hat{x}'_i + (w_2w_3 - sw_1)\hat{y}'_i + \left(s^2 + w_3^2 - \frac{1}{2}\right)\hat{z}'_i\right] + t_{u_z} + \vec{r}_z \ldots, n,$$

where α and α' denote the MF factors and $\delta_h$ ($\approx 12.5\pm 2.0$ cm at end-diastole) denotes the maximal length of the heart in a long-axis view. For each 3D object point, the ray connecting that point and the focal spot intersects the image plane near the associated 2D image point even when the input data are corrupted by noise. In addition to the constraints imposed on the z and z' coordinates, two other constraints are incorporated to confine the x, x', y, and y' coordinates of each calculated 3D point as follows:

$$C_5: \left(\frac{\hat{x}_i}{\hat{z}_i} - \xi_i\right)^2 + \left(\frac{\hat{y}_i}{\hat{z}_i} - \eta_i\right)^2 \le \left(\frac{\delta_c}{p_{size}}\right)^2, \quad i=1,\ldots,n,$$

$$C_6: \left(\frac{\hat{x}'_i}{\hat{z}'_i} - \xi'_i\right)^2 + \left(\frac{\hat{y}'_i}{\hat{z}'_i} - \eta'_i\right)^2 \le \left(\frac{\delta_c}{p_{size}}\right)^2, \quad i=1,\ldots,n,$$

where $\delta_c$ defines the radius of a circular disk (e.g., 20 pixels) centered at $(\xi_i, \eta_i)$ or $(\xi'_i, \eta'_i)$. The constraints $C_3$ to $C_6$ form a cone-shape bounding region for each 3D point with the focal spot as its apex and the a circular disk (of radius $\delta_c$) centered at $(\xi_i, \eta_i)$ as its base to confine the searching space of the calculated 3D object point which is shown in FIG. 19.

D. Establishment of Vessel Centerline Correspondence

Figure 20:
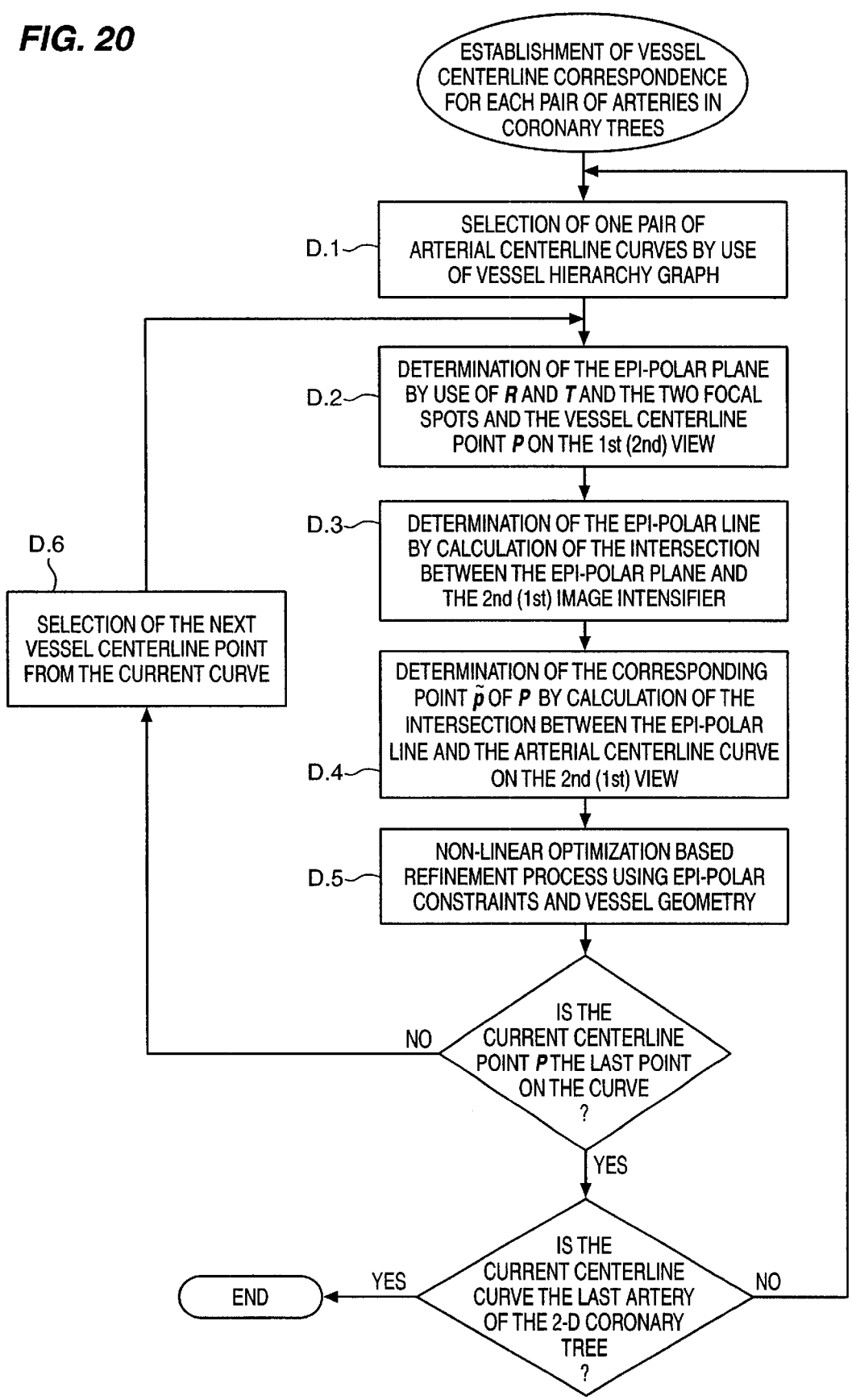
FIG. 20 is a flowchart providing additional details of the establishment of vessel centerline correspondence for each pair of arteries in the coronary trees.

Details of the methods for establishing the vessel centerline correspondence of the arterial tree are shown in the flowchart of FIG. 20.

Figure 21:
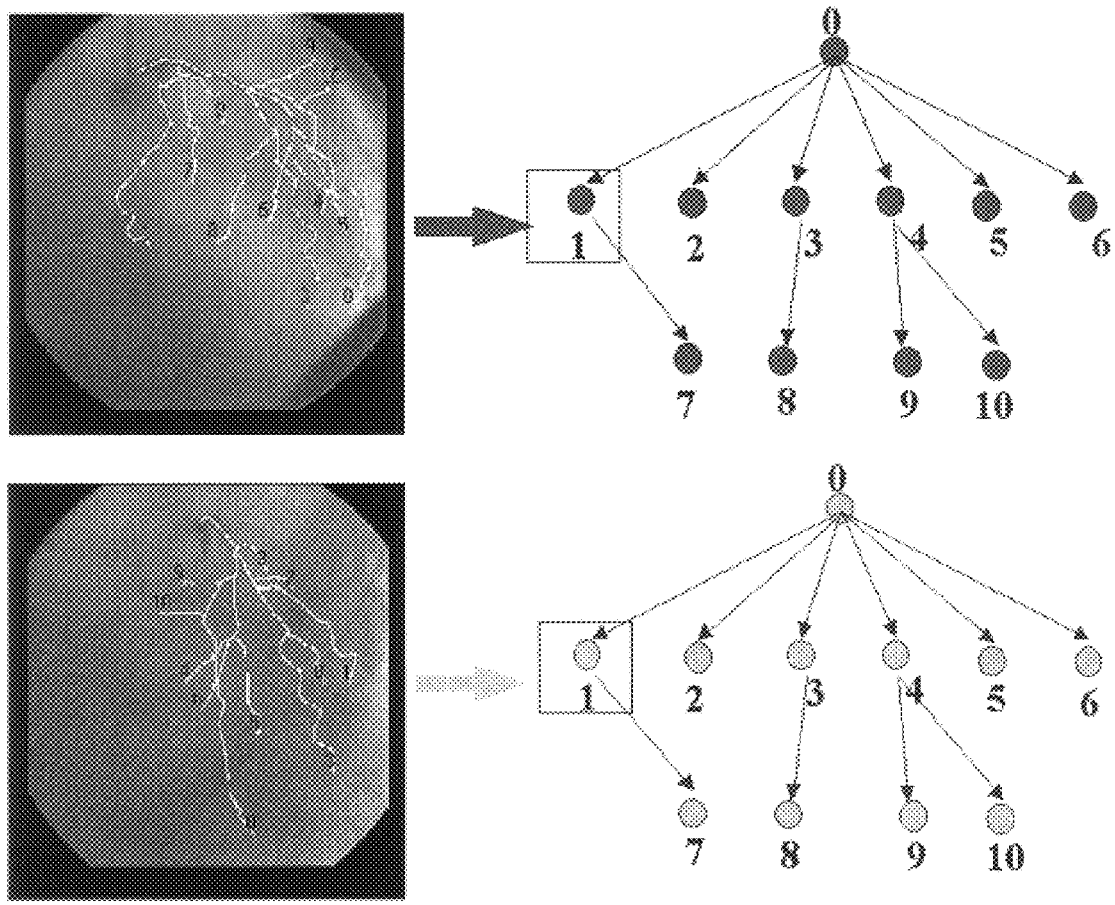
FIG. 21 depicts the selection of corresponding pairs of arteries using vessel hierarchical digraphs.

After the transformation $(R, \vec{t})$ that defines the two views is obtained, this information will be used for establishing the point correspondences on 2-D vessel centerlines in the pair of images and calculating 3-D morphologic structures of coronary arterial tree. The calculated transformation in conjunction with the epi-polar constraints were employed as the framework for establishing the point correspondences on the vessel centerlines based on the two identified 2-D coronary arterial trees and the vessel hierarchy as shown in FIG. 21.

Figure 22:
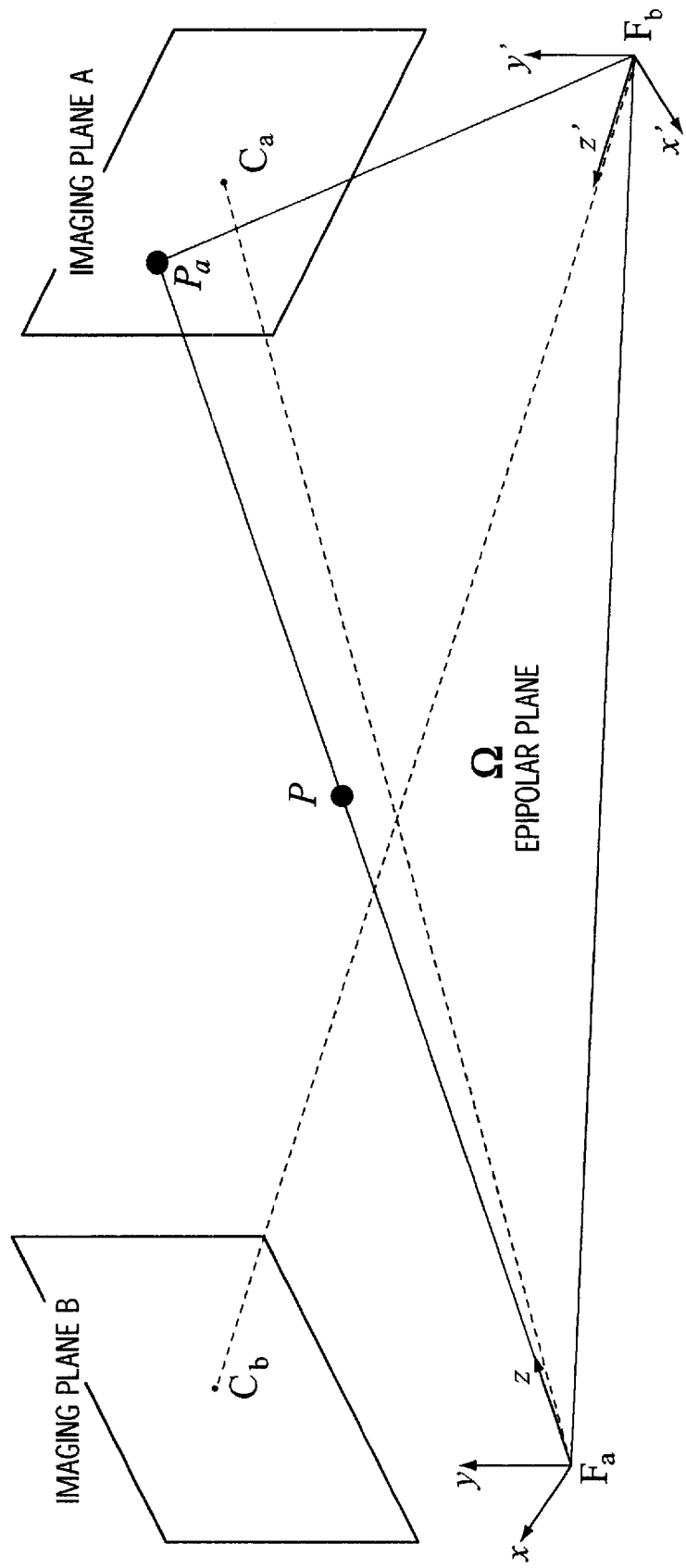
FIG. 22 depicts epipolar plane geometry constraints.
Figure 23:
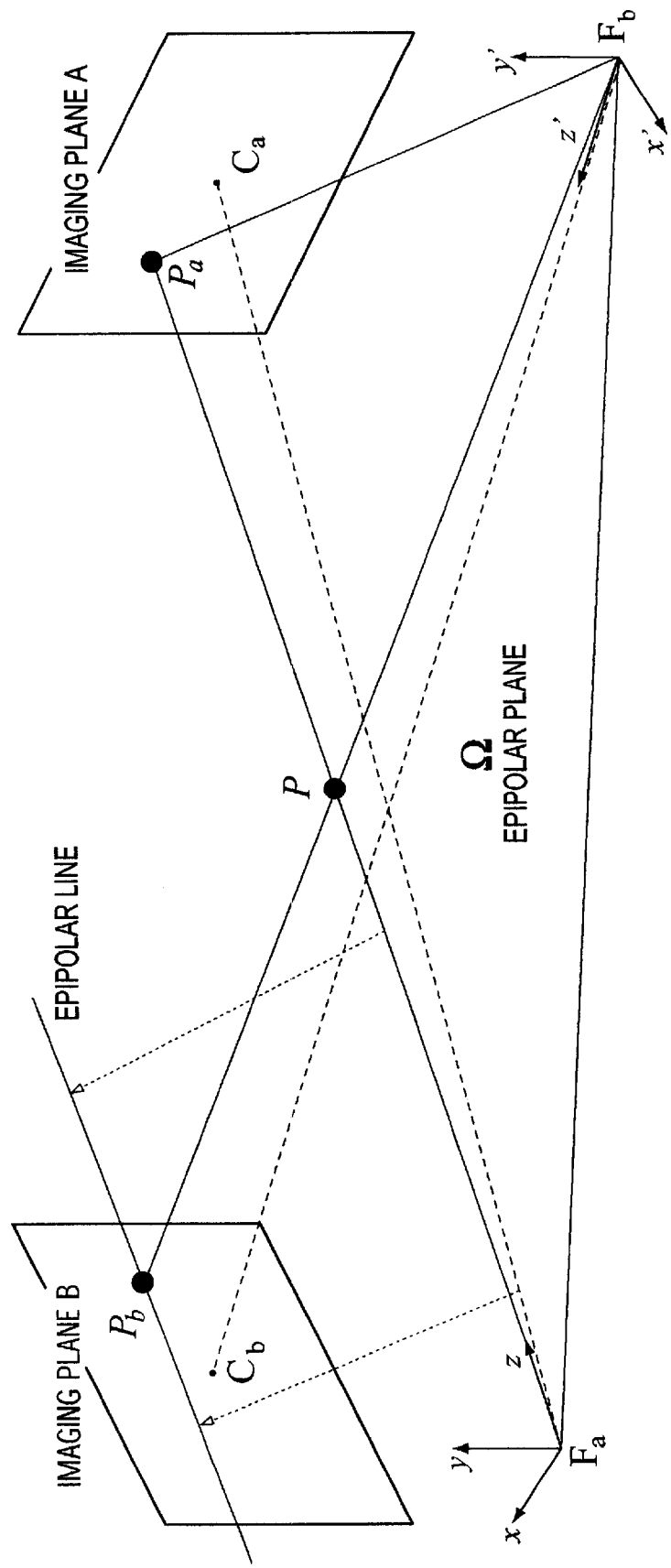
FIG. 23 depicts epipolar line geometry corresponding to FIG. 22.
Figure 24A:
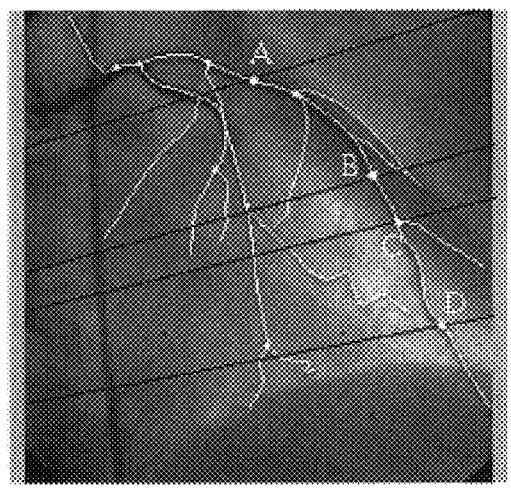
FIGS. 24a–b depict typical examples of finding corresponding points using epipolar lines.
Figure 24B:
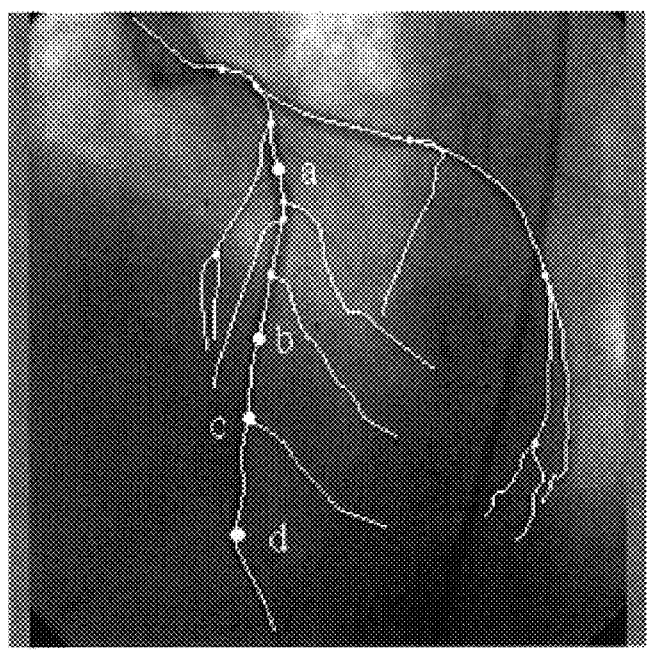

If the information on relative positions of two cameras is known (i.e., the known locations and orientations of two focal spots $F_a$ and $F_b$), the correspondences of image points can be solved by use of "epi-polar constraints." Let P denote a 3-D point, and let $P_a$ and $P_b$, the projections of P, denote the pair of corresponding points in two images. Such constraints state that these points, $F_a$, $F_b$, $P_a$, $P_b$, and P, are all on one plane called the epi-polar plane as shown in FIG. 22. The epi-polar plane and each image plane intersect along a straight line called the epi-polar line (see FIG. 23). Therefore, the location of point $P_b$ in the second image must lie on the epi-polar line resulting from the intersection between the second image plane and the plane defined by point $P_a$ and the two focal spots. A typical example of local correspondence establishment by use of epi-polar constraints where points A, B, C, and D at the first view are defined by finding the intersections between the 2-D curve associated with left anterior descending artery (LAD) artery and respective epi-polar lines defined by a, b, c, and d at the second view as shown in FIG. 24.

Figure 25:
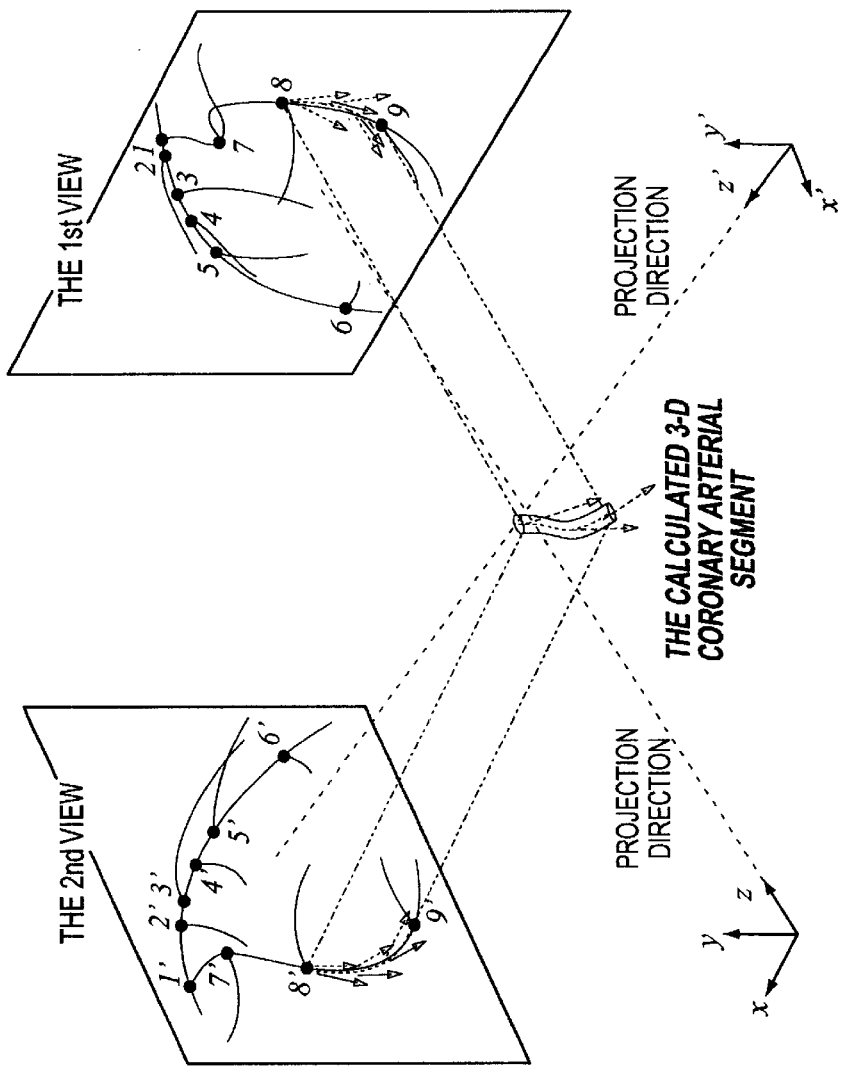
FIG. 25 depicts a refinement process for establishment of vessel centerline correspondences.

If the epi-polar line is "tangential" relative to the 2-D vessel centerline curve, the accuracy of calculated intersection point becomes sensitive to any small errors in epi-polar line derived based on the calculated transformation in terms of R and $\vec{t}$. To overcome the problem, a refinement process as shown in FIG. 25 will be employed to calculate the global correspondences using optimal parametric arguments $t_1$, $t_2, \ldots t_{n-1}, t_n$ based on the equations below.

$$\min_{\hat{t}, P', v'} \mathcal{F}_{epi}(\hat{t}, P', v') =$$

$$\sum_{i=1}^{n} \left(\xi'_i - \frac{x'_i}{z'_i}\right)^2 + \left(\eta'_i - \frac{y'_i}{z'_i}\right)^2 + \left(f_x(t_i) - \frac{\vec{c}_1 \cdot \vec{p}'_i + t_x}{\vec{c}_3 \cdot \vec{p}'_i + t_z}\right)^2 +$$

Figure 26A:
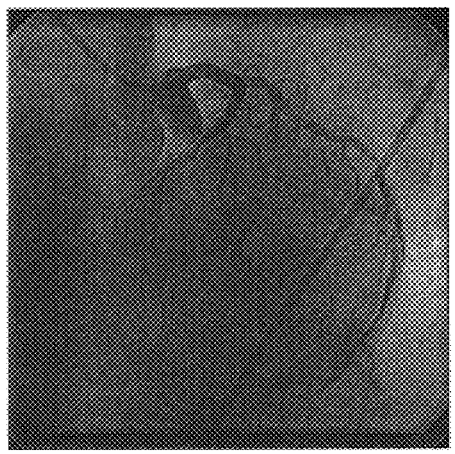
FIGS. 26a–d depict comparison of previous methods for establishing correspondence with the methods of the present invention.
Figure 26B:
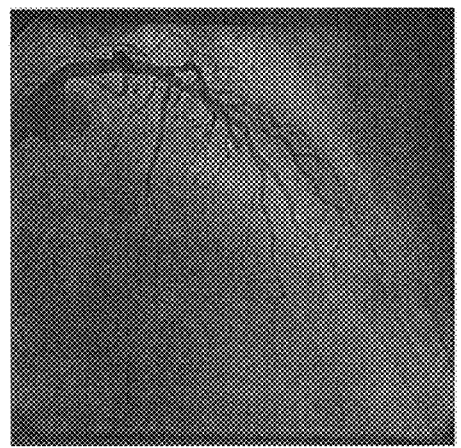
Figure 26C:
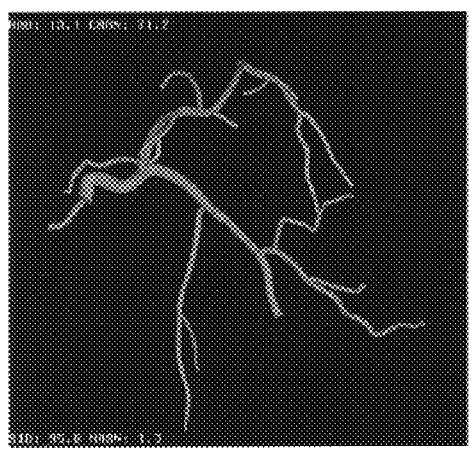
Figure 26D:
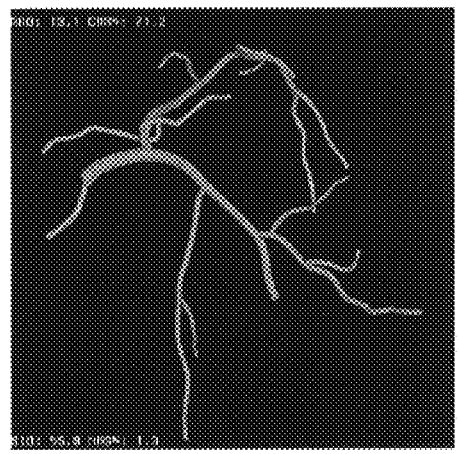

-continued $$\left(f_y(t_i) - \frac{\vec{c}_2 \cdot \vec{p}'_i + t_y}{\vec{c}_3 \cdot \vec{p}'_i + t_z}\right)^2 + \|f'(t_i) - [R^{-1} \cdot \vec{v}'_i]_{xy}\|^2 + \|\vec{\mu}'_i - [\vec{v}'_i]_{x'y'}\|^2,$$

where $\hat{t}=\{t_1, t_2, \ldots, t_n\}$, $P'=\{\vec{p}'_i=(x'_i,y'_i,z'_i) \mid i=1,\ldots,n\}$, and $v'=\{\vec{v}_1, \vec{v}_2, \ldots, \vec{v}_n\}$ denote the set of parametric variables, the set of 3-D object position vectors, and the set of 3-D vessel directional vectors to be optimized, respectively. n denotes the number of points on the 2-D vessel centerline, $(f_x(t_i), f_y(t_i))$ and $(\xi_i, \eta'_i)$ are the respective spline-curve modeled and extracted 2-D vessel centerline points in two views, $f'(t_i)=(f'_x(t_i), f'_y(t_i))$ and $\vec{\mu}'_i$ denote the respective spline-curve modeled and extracted 2-D directional vectors of vessel centerlines in each view, $[R^{-1}\vec{v}_i]_{xy}$ and $[\vec{v}_i]_{x'y'}$ denote the projection of the calculated 3-D directional vector on the respective image planes, $\vec{c}_k$, k=1,2,3, denotes the respective kth column vectors of matrix R, and $R^{-1}$ is the inverse matrix of R. The 3-D position vectors $P'=\{\vec{p}'_i=(x'_i,y'_i,z'_i) \mid i=1, \ldots, n\}$ on vessel centerline are computed by use of equations described above where the 2-D pair correspondence $(\xi,\eta_i)$ are substituted by the 2-D spline-curve modeling function $f(t_i)=(f_x(t_i),f_y(t_i))$. Based on the equations, the vessel centerline correspondences are globally established by incorporating the entire vessel shape in terms of directions and locations that will yield more accurate results than those obtained by only use of epi-polar constraints with local vessel segment points; especially when epi-polar line and vessel segment are tangential. FIGS. 26(c) and (d) show the results of 3-D LCA coronary reconstructed from a pair of angiograms as shown in FIGS. 26(a) and (b) based on the simple epi-polar technique and the refinement process, respectively. The reconstruction of left main artery apparently illustrates inaccurate results based on the simple epi-polar process which were corrected after employing the refinement process.

E. Calculation of 3-D Skeleton of Coronary Arterial Tree

Figure 27:
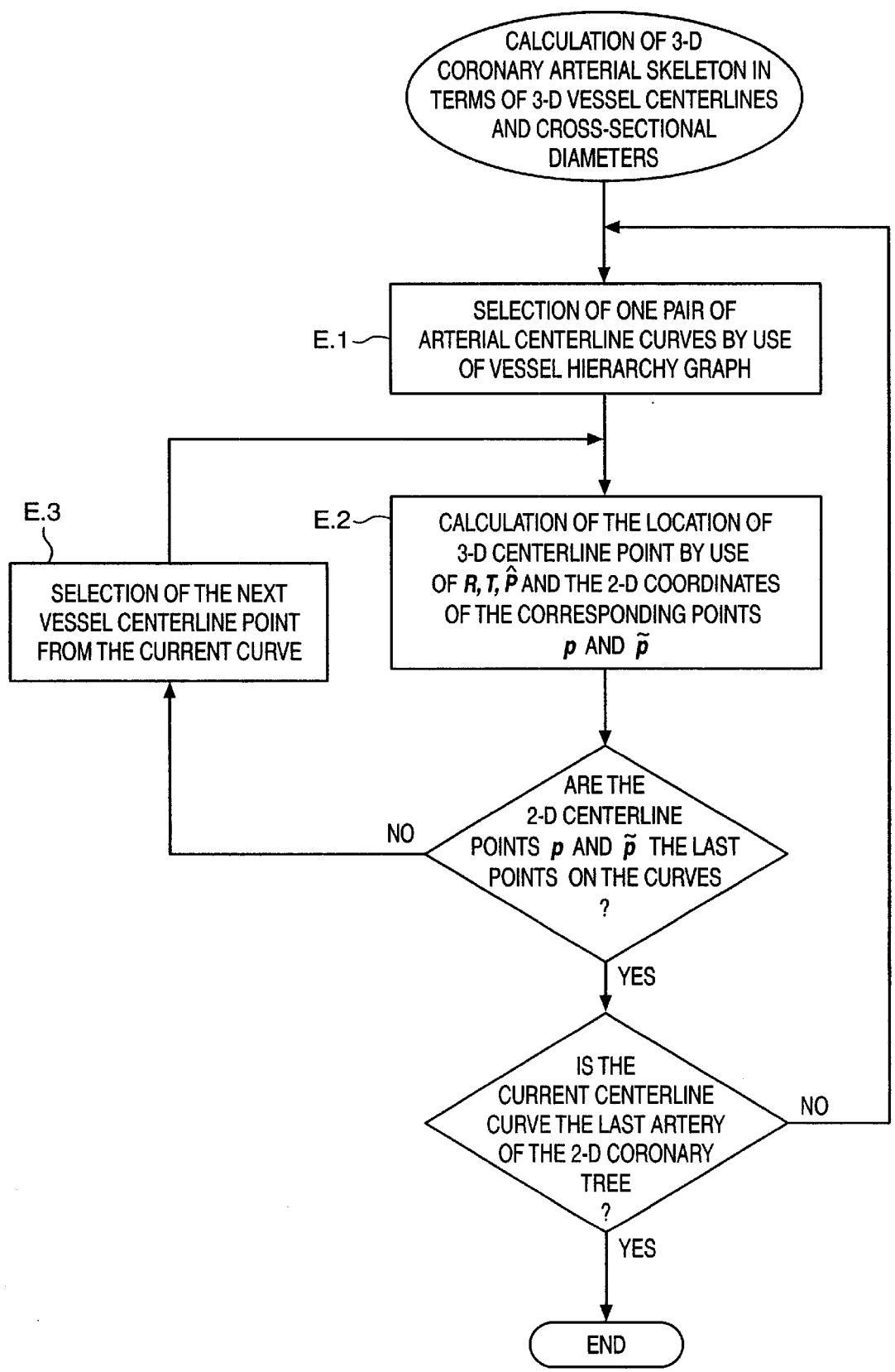
FIG. 27 is a flowchart providing additional details of calculation of 3-D coronary arterial skeleton in terms of 3-D vessel centerlines and cross-sectional diameters.

Details of the methods for calculation of the 3-D skeleton of the arterial tree are shown in the flowchart of FIG. 27.

Figure 29:
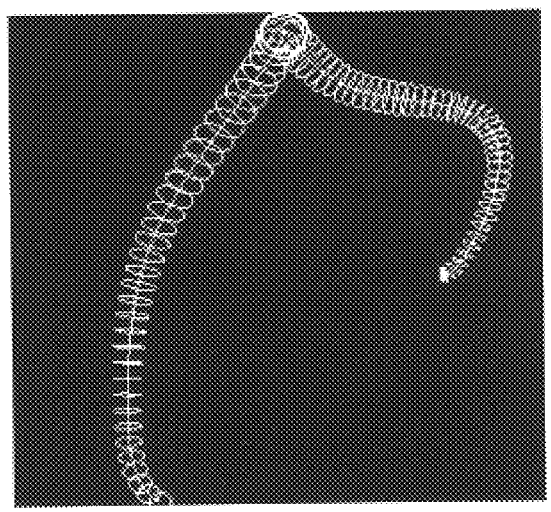
FIG. 29 is an exemplary skeleton image of 3-D coronary arteries.

With the point correspondences on 2-D vessel centerlines $(\xi_j, \eta_j)$ and $(\xi'_j, \eta'_j)$ and the transformation $(R, \vec{t})$, the 3-D vessel centerline points of coronary arteries $(x_j, y_j, z_j)$ can then be calculated as shown in equations below. For each artery, the cross-sectional diameters at the two end-points can be calculated as $$d_i = \bar{d}_i \cdot \left(\sqrt{x_i^2 + y_i^2 + z_i^2} \bigg/ \sqrt{\xi_i^2 + \eta_i^2 + D^2}\right),$$

where $\vec{d}$ is the extracted 2-D vessel diameter centered at $(\xi_i, \eta_i)$, and D is the distance between the focal spot and the image intensifier. The remaining cross-sectional diameters on a artery are linearly interpolated based on the calculated diameters at two end-points as shown in FIG. 29.

In the first view, let $(u_i, v_i)$ denote the image coordinates of the ith object point, located at position $\vec{p}_i=(x_i, y_i, z_i)$ relative to the focal spot of the first view. Then $$u_i = \frac{Dx_i}{z_i}, \quad v_i = \frac{Dy_i}{z_i},$$

where D is the SID (focal-spot to imaging-plane distance) in the first imaging system. Let $(\xi_i, \eta_i)$ denote the scaled image coordinates, defined as $$\xi_i = \frac{u_i}{D} = \frac{x_i}{z_i}, \qquad \eta_i = \frac{v_i}{D} = \frac{y_i}{z_i}.$$

The second projection view of the biplane imaging system can be described in terms of the SID D', and a second pair of image and object coordinate systems u'v' and x'y'z' can be defined in an analogous manner. Scaled image coordinates $(\xi'_i, \eta'_i)$ in the second view for the ith object point at position $\vec{p}_i = (x'_i, y'_i, z'_i)$ are then given by $$\xi'_i = \frac{u'_i}{D'} = \frac{x'_i}{z'_i}, \qquad \eta'_i = \frac{v'_i}{D'} = \frac{y'_i}{z'_i}.$$

With the known estimates of the scaled image coordinates $(\xi_i, \eta_i)$ and $(\xi'_i, \eta'_i)$, transformation in terms of R and $\vec{t}$, the object coordinates $(x_i, y_i, z_i)$ can be calculated as follows:

$$\begin{bmatrix} r_{11} - r_{31}\xi'_i & r_{12} - r_{32}\xi'_i & r_{13} - r_{33}\xi'_i \\ r_{21} - r_{31}\eta'_i & r_{22} - r_{32}\eta'_i & r_{23} - r_{33}\eta'_i \\ 1 & 0 & -\xi_i \\ 0 & 1 & -\eta_i \end{bmatrix} \begin{bmatrix} x_i \\ y_i \\ z_i \end{bmatrix} = \begin{bmatrix} \vec{a} \cdot \vec{t} \\ \vec{b} \cdot \vec{t} \\ 0 \\ 0 \end{bmatrix},$$

where $$\vec{a} = \begin{vmatrix} r_{11} - r_{31}\xi'_i \\ r_{12} - r_{32}\xi'_i \\ r_{13} - r_{33}\xi'_i \end{vmatrix}, \vec{b} = \begin{vmatrix} r_{21} - r_{31}\eta'_i \\ r_{22} - r_{32}\eta'_i \\ r_{23} - r_{33}\eta'_i \end{vmatrix}.$$

F. Rendering of 3-D Coronary Arterial Tree with Associated Gantry Angulation

Figure 28:
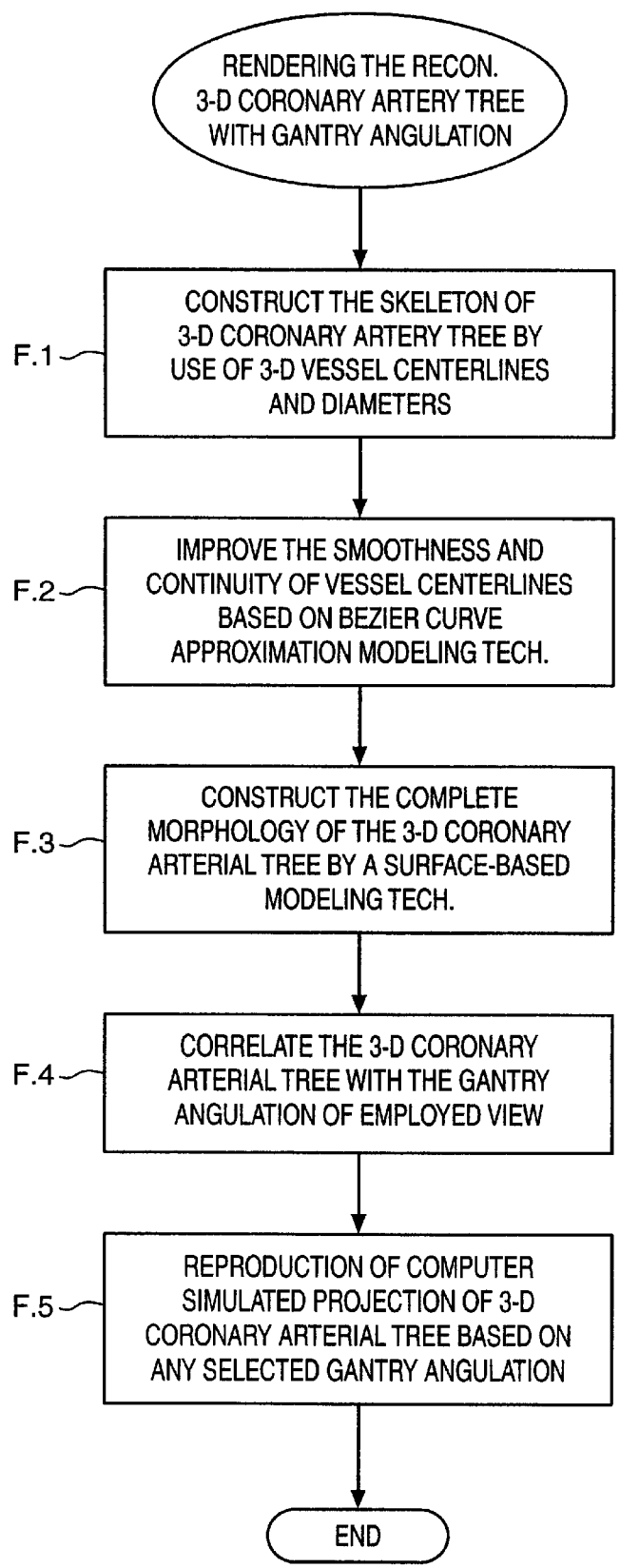
FIG. 28 is a flowchart providing additional details of rendering the reconstructed 3-D coronary arterial tree with gantry angulation.

Details of the methods for rendering the 3-D arterial tree with associated gantry angulation are shown in the flowchart of FIG. 28.

Figure 30:
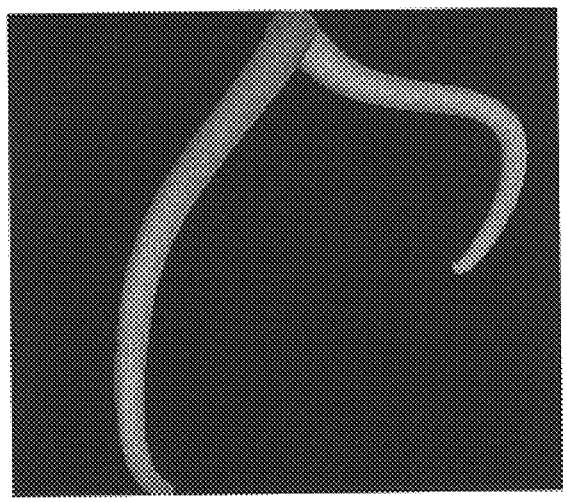
FIG. 30 is an exemplary surface based modeling image of coronary arteries.
Figure 31A:
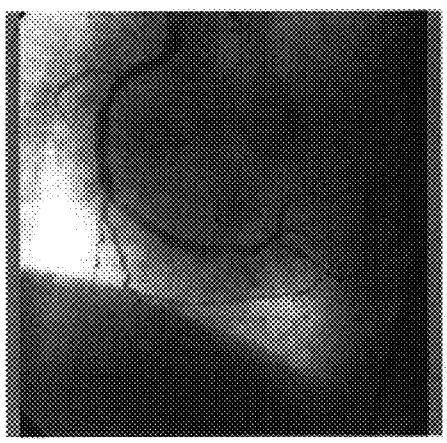
FIGS. 31a–f depict 3-D reconstruction of RCA images viewing at four different angles of sample acquired images.
Figure 31B:
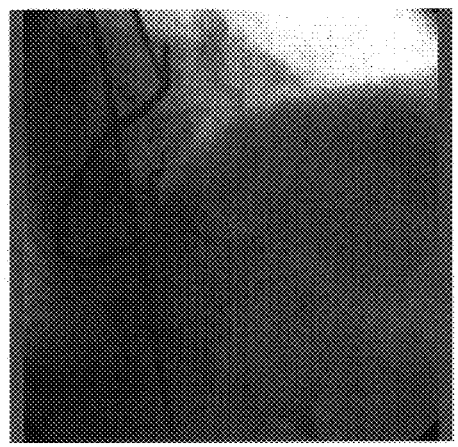
Figure 31C:
Figure 31D:
Figure 31E:
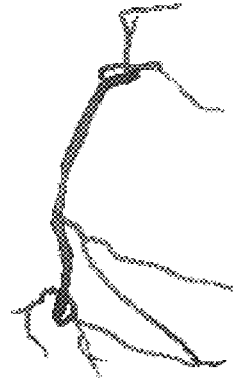
Figure 31F:
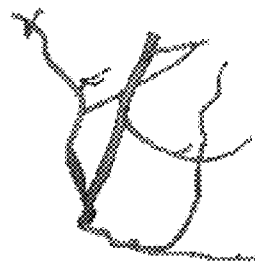
Figure 32A:
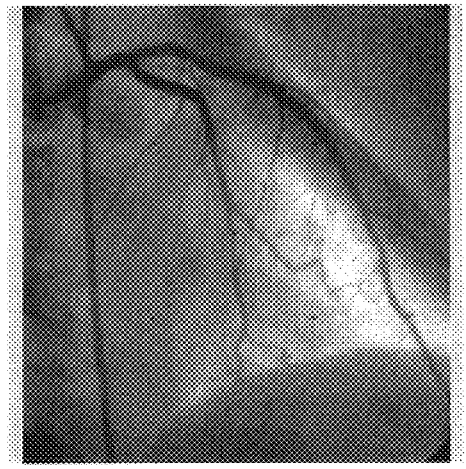
Figure 32B:
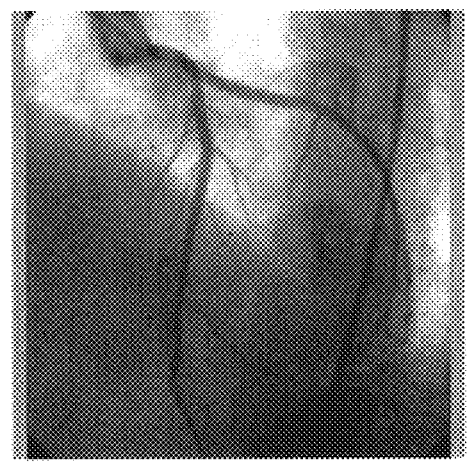
Figure 32C:
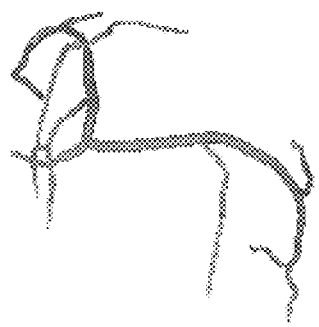
Figure 32F:
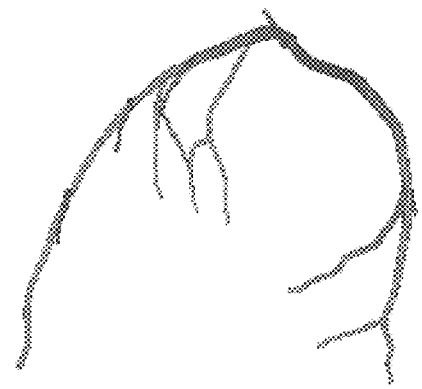
Figure 32F:
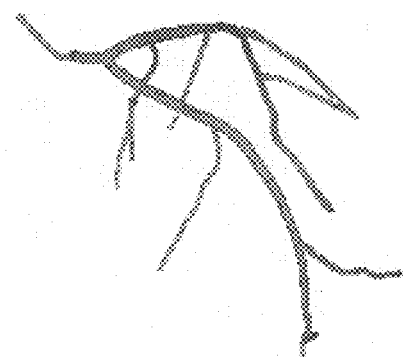
Figure 32F:

To obtain the geometrical continuity of the vessel centerline, a spline-based smoothing process is applied to the originally calculated data sets in accord with the equations below. The surface-based modeling technique is employed to recover the complete morphology of the 3-D arterial lumen. For every two consecutive cross sections centered at $(x_i, y_i, z_i)$ and $(x_{i+1}, y_{i+1}, z_{i+1})$, a sequence of polygonal patches are formed with the corresponding cross sectional diameters as shown in FIG. 30.

When an arbitrary computer-generated image is produced, the gantry information defining the current projection is calculated in the form of left anterior oblique/right anterior oblique (LAO/RAO) and caudal/cranial (CAUD/CRAN). These gantry angles are defined in a spatial coordinate system with the iso-center as the origin. The LAO/RAO angulation is defined on the y-z plane, while the CAUD/CRAN angulation is defined on the x-z plane. With the spatial coordinates, the position of focal spot $(x_f, y_f, z_f)$ can be formulated by use of two rotations $R_x(\alpha)$ and $R_y(-\beta)$ as presented in equations to follow.

The reconstructed 3-D coronary arterial tree can be rotated to any selected viewing angle yielding multiple computer-generated projections to improve the quality and utility of the images subsequently acquired as shown in FIGS. 31a–f and 32a–f.

Due to the poor imaging resolution in the depth or z-axis, the 3-D shape of coronary vessel tree become joggling. To overcome the drawbacks, the technique of Bezier curve for data smoothing is adopted. The Bezier curve can be defined as a parametric function as follows:

$$P(u) = \sum_{k=0}^{n} p_k B_{k,n}(u), \ p_k = (x_k, y_k, z_k).$$

where $p_k$ denote the n+1 input control points. Each $B_{k,n}(u)$ is a polynomial function of degree one less than the number of control points used and is defined as $$B_{k,n}(u) = C(n, k) u^k (1-u)^{n-k}$$

and the C(n,k) represent the binomial coefficients $$C(n, k) = \frac{n!}{k!(n-k)!}$$

By applying the Bezier equation, a new representation of 3-D coronary vessels can be obtained.

When an arbitrary computer-generated image is produced, the gantry information defining the current projection is calculated in the form of left anterior oblique/right anterior oblique (LAO/RAO) and caudal/cranial (CAUD/CRAN). These gantry angles are defined in a spatial coordinate system with the iso-center as the origin. The LAO/RAO angulation is defined on the y-z plane, while the CAUD/CRAN angulation is defined on the x-z plane. With the spatial coordinates, the position of focal spot $(x_f, y_f, z_f)$ can be formulated by use of two rotations $R_x(\alpha)$ and $R_y(-\beta)$ as, $$\begin{bmatrix} x_f \\ y_f \\ z_f \end{bmatrix} = R_y(-\beta) R_x(\alpha) \cdot \begin{bmatrix} x_n \\ y_n \\ z_n \end{bmatrix} = \begin{bmatrix} \cos(-\beta) & \sin(\alpha)\sin(-\beta) & \cos(\alpha)\sin(-\beta) \\ 0 & \cos(\alpha) & -\sin(\alpha) \\ -\sin(-\beta) & \sin(\alpha)\cos(-\beta) & \cos(\alpha)\cos(-\beta) \end{bmatrix} \cdot \begin{bmatrix} x_n \\ y_n \\ z_n \end{bmatrix},$$

where $(x_n, Y_n, z_n) = (0, 0, D_{fc})$ denotes the neutral position of focal spot (or anterior-posterior (AP) view with 0° LAO and 0° CAUD, $D_{fc}$ is the distance between iso-center and focal spot which is provided by the manufacture), $R_x$ and $R_y$ denotes the rigid rotations with respect to x-axis and y-axis, and $\alpha(-\alpha)$ and $\beta(-\beta)$ denote the LAO (RAO) and CAUD (CRAN) angles, respectively.

G. 3-D Coronary Quantitative Analysis: Optimal Views and Morphology Assessment

Figure 37:
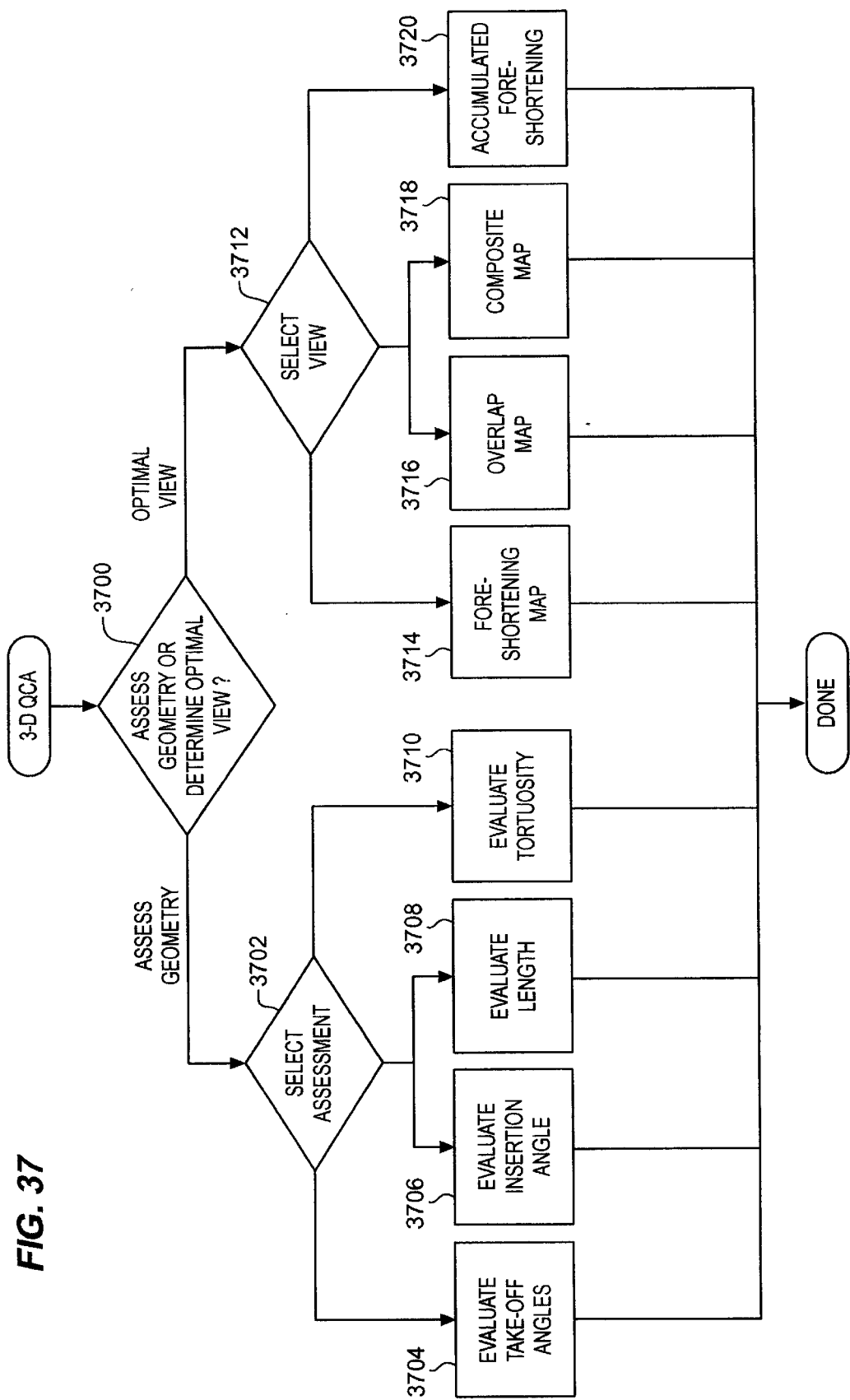
FIG. 37 is a flowchart providing additional details of QCA processing.

FIG. 37 provides a flowchart describing the high level operations included in the improved QCA of the present invention. Specifically, the method of FIG. 37 presumes the availability of 3-D reconstruction image data of a coronary arterial tree. The methods presented above are useful for generation of such 3-D reconstructed data from 2-D coronary images. Those skilled in the art will recognize a variety of other sources for such 3-D image data as well as alternate techniques for reconstructing such data from 2-D images.

Element 3700 is first operable to determine whether the user of the QCA method desire to assess the geometry of the coronary artery reconstruction or whether the user wishes to determine optimal view of the 3-D image for particular parameters. If the user is assessing the geometry, element 3702 is operable to determine what aspect of the arterial image geometry is to be assessed. Element 3702 is operable to evaluate take-off angles of each arterial branch in the arterial tree image presently under study. Element 3706 is operable to evaluate the insertion angle a bypass graft selected in the arterial tree image presently under study. Element 3708 is operable to evaluate the length of a selected arterial segment from the arterial tree image presently under study. And element 3710 is operable to evaluate the tortuosity of a selected arterial pathway from the arterial tree image presently under study. Following completion of the selected evaluative task processing is completed or may continue by looping back to element 3700 to await a next selection from the arteriographer.

If the user wishes to determine optimal view for particular parameters as determined by element 3700, element 3712 is next operable to determine which view the user desires for purposes of optimizing. Element 3714 is operable to present the user with a graphical map useful for viewing and optimizing foreshortening of the coronary arterial tree image presently under study. Element 3716 is operable to present the user with a graphical map useful for viewing and optimizing overlap of the arterial tree image presently under study. Element 3718 is operable to present the user with a graphical map useful for optimizing the combination offoreshortening and overlap in the arterial tree image presently under study. Element 3720 is operable to present to the user information indicative of the accumulated percent foreshortening of each arterial segment divided by bifurcation points in the arterial tree image presently under study. Following completion of the selected view optimization, processing is completed or may continue by looping back to element 3700 to await a next selection from the arteriographer.

Each of the above QCA tasks is further described in detail herein below with reference to additional figures as required for a clear understanding.

G.1. Assessment of the Coronary Geometry

Figure 33:
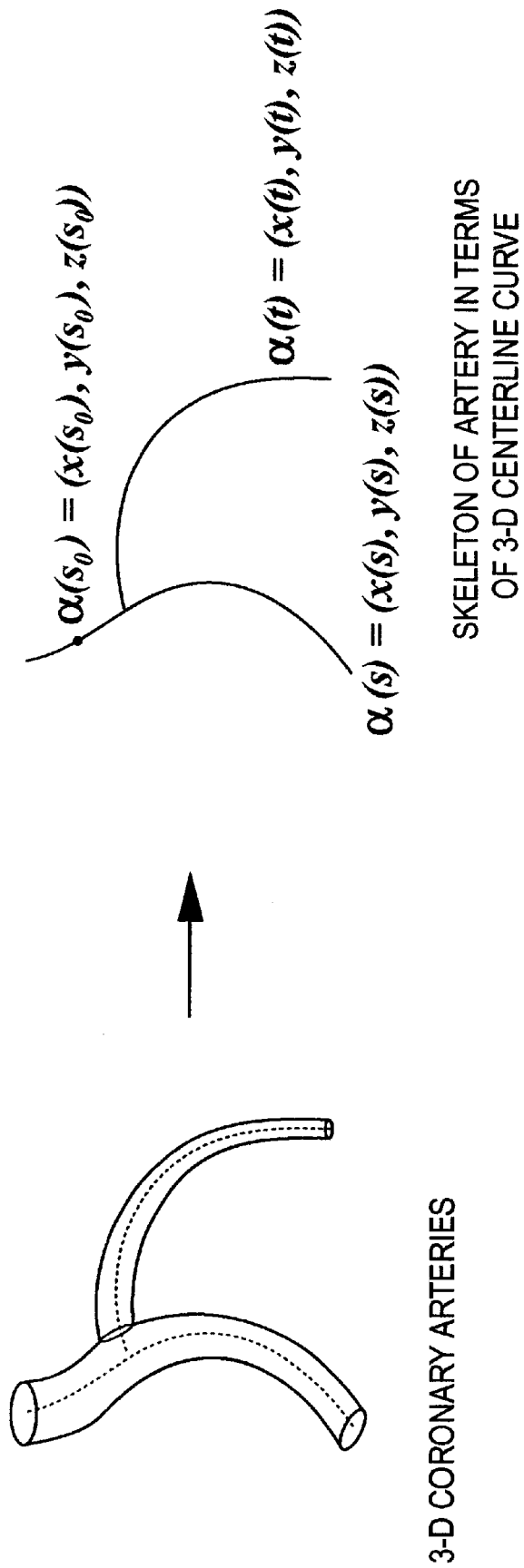
FIG. 33 is a typical example of the vessel skeleton structure in terms of 3-D curves.

The curvilinear nature of vessels is important in the pathophysiology of coronary artery disease and the performance of interventions. Therefore such a geometric property can not be quantified from 2-D projection data. The skeleton of a 3-D vessel can be mathematically defined as a curve function $p(s)=(x(s), y(s), z(s))$ connecting all the 3-D centerline points as shown in FIG. 33, where $0 \leq s \leq 1$ is the parametric variable.

G.1.1. Evaluation of Length of Arterial Segment

Figure 47:
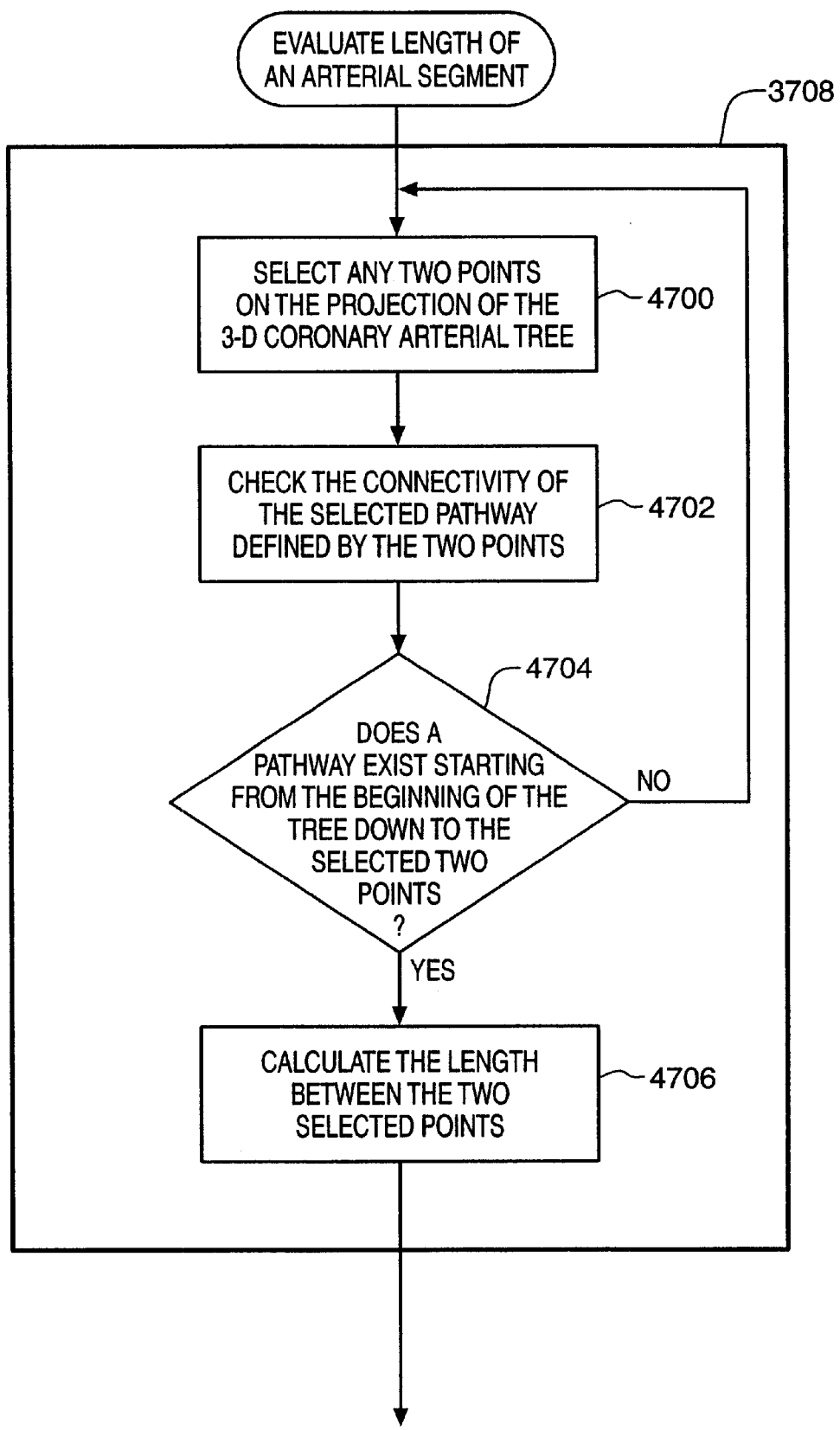
FIG. 47 is a flowchart providing additional detail of the processing to assess length of a selected arterial segment.

As noted above, element 3708 is operable to evaluate the length of a selected artery segment of the arterial tree image presently under study. FIG. 47 is a flowchart describing additional details of the operation of element 3708 to evaluate the length of a selected artery segment in the arterial tree image presently under study. In general, the 3-D vessel centerline is characterized by a parametric curve function in terms of an ordered sequence of 3-D data points as described previously. The length of any selected artery segment on the vessel centerline can be calculated by the summation of the inter-distance of every pair of consecutive vessel centerline points.

More specifically, element 4700 is operable to accept user input defining two points on the displayed arterial tree. The user provides the two points by clicking a pointer device at each of the desired points. The two selected points define a segment of the displayed arterial tree for which the user wishes to evaluate the length. Element 4702 then determines whether a path exists in the arterial tree from the start of the displayed tree through bot selected points. Calculation of the segment length from the 3 -D data requires a path exists from the start of the image tree through both selected points. Details of this element are provided further herein below. Element 4704 then tests whether the required path is found. If not, processing loops back to element 4700 to permit the user to select different points for a desired segment. If the required path through the elected segment exists, processing continues with element 4706 to calculate the length between the two identified points along the path identified by element 4702.

Figure 51:
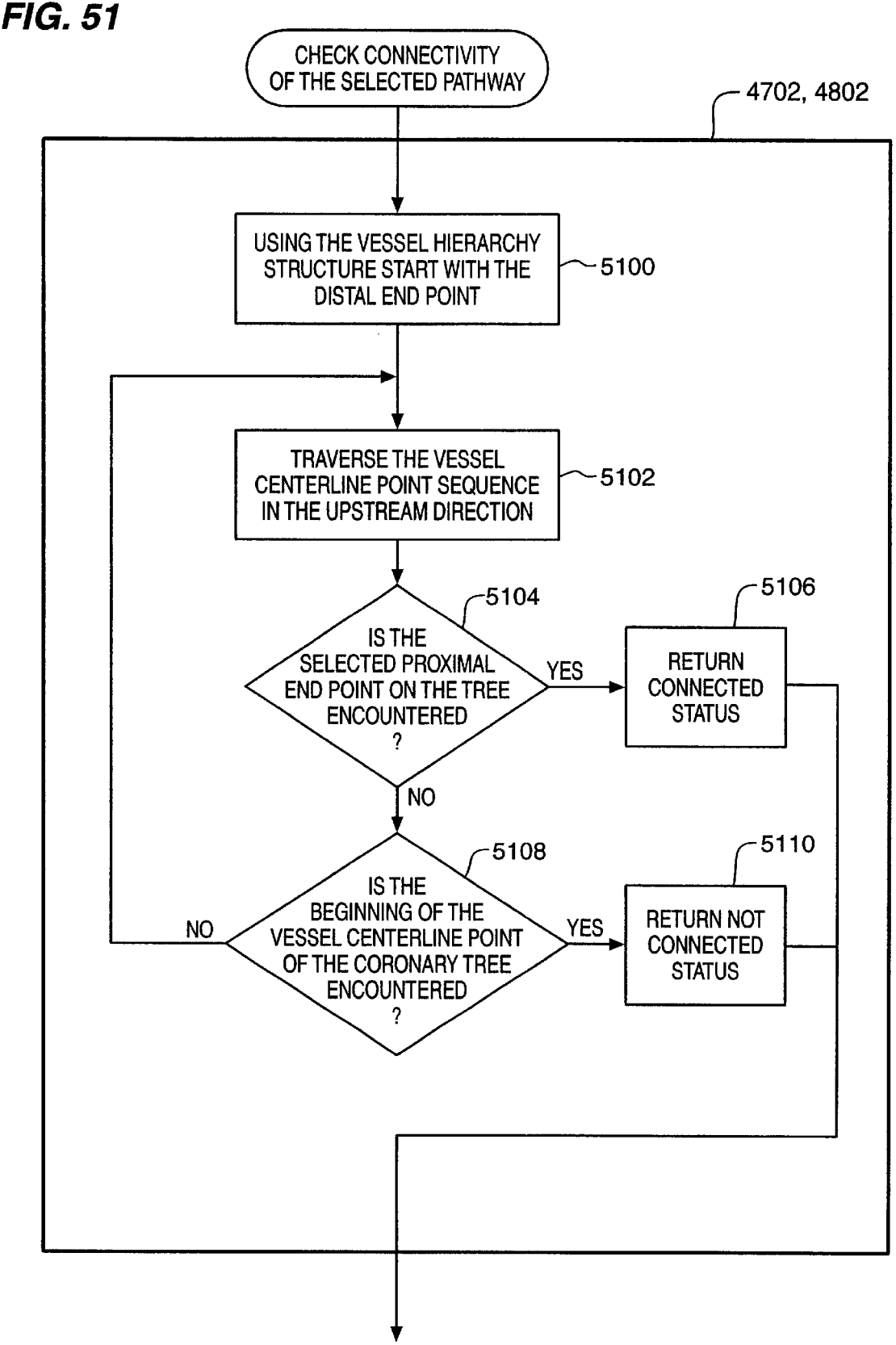
FIG. 51 is a flowchart providing additional detail of the processing to verify connectivity of a selected arterial segment.

FIG. 51 is a flowchart providing additional details of the processing of element 4702 (and 4802 discussed below) to determine the connectivity of a selected arterial pathway defined by two selected end points. In particular, element 5100 uses the vessel hierarchy data structure to start at the distal end point of the selected pathway. Element 5102 then traverses the vessel centerline point sequence from the present point in the upstream direction. Element 5104 then determines whether the selected proximal end point of the selected pathway is encountered in the next point traversed by element 5102. If the proximal end point is encountered, then the selected pathway is connected and element 5106 is operable to return a "CONNECTED" status to the invoking procedure. If the proximal end point is not yet encountered, element 5108 is operable to determine whether the beginning of the coronary tree is encountered in this next point traversed by element 5102. If so, element 5110 is operable to return a "NOT CONNECTED" status to the invoking procedure because the beginning of the tree is encountered without traversing through the proximal end point. If the beginning of the tree is not yet encountered, processing loops back to element 5102 to traverse a next point along the selected path and repeat the tests of elements 5104 and 5108.

G. 1.2. Evaluation of the tortuosity of artery

Figure 48:
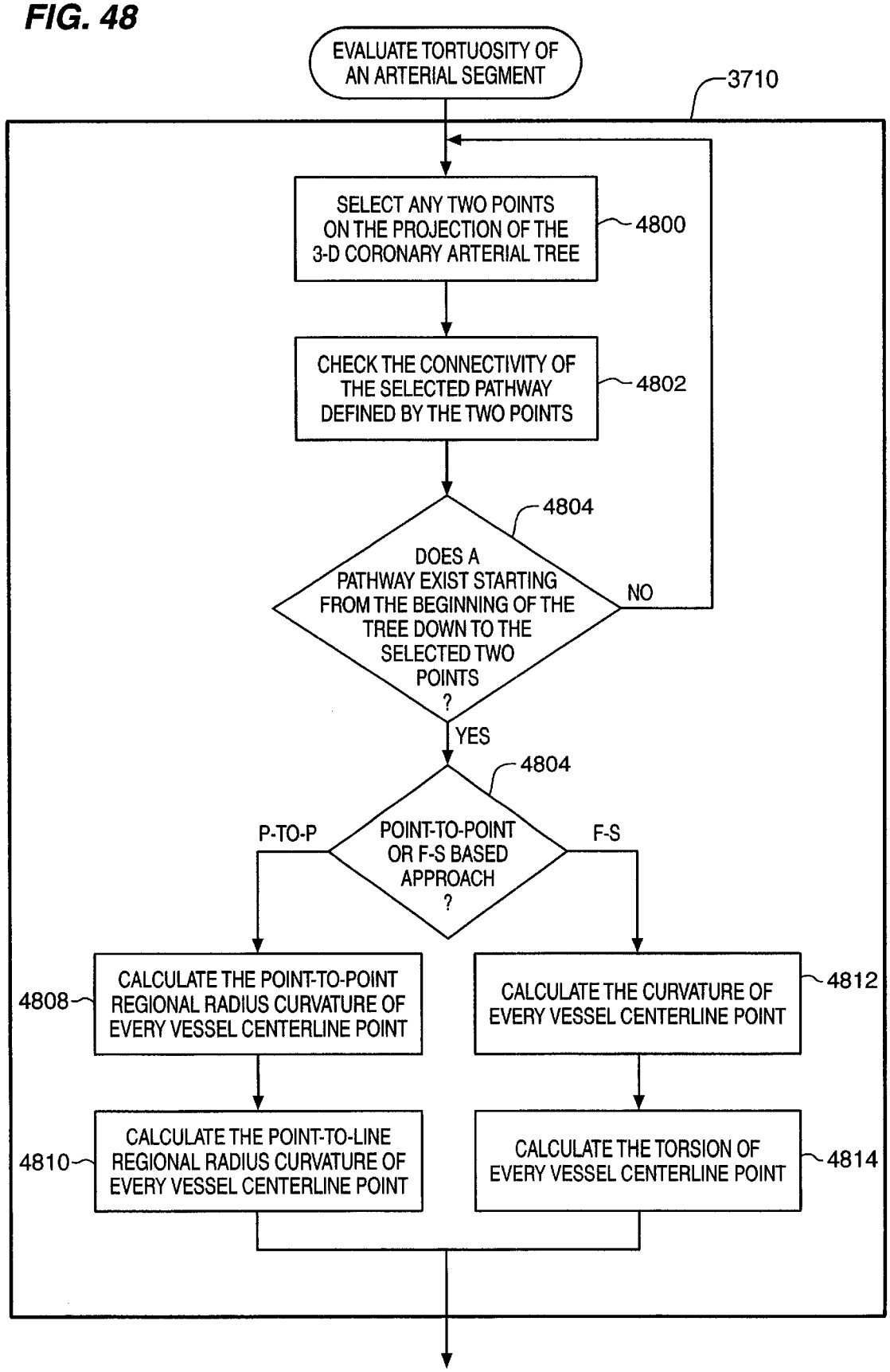
FIG. 48 is a flowchart providing additional detail of the processing to assess tortuosity of a selected arterial segment.

Element 3710 is operable to evaluate the tortuosity of a selected arterial segment pathway. FIG. 48 is a flowchart providing additional details of the processing to evaluate tortuosity of a selected arterial segment.

G. 1.2.1. Evaluation of the tortuosity of an artery by the F-S theory

Figure 34D:
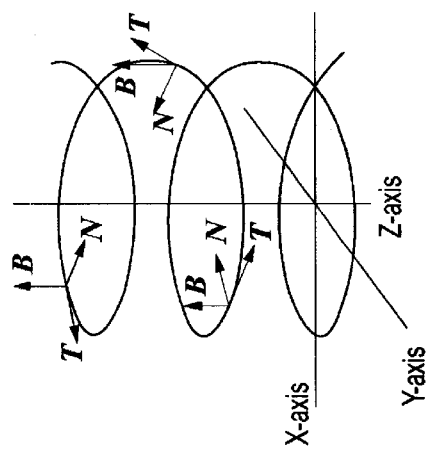
FIGS. 34a–d depict schematic diagrams of curvature and torsion.

Generally, by use of such spline-based curve modeling technique, we are able to apply the theory of differential geometry such as Frenet-Serret apparatus (or F-S theory) or its variation to study the geometrical nature of the 3-D coronary artery shape at any time point in the cardiac cycle. A technique based on the Frenet-Serret (F-S) theory of differential geometry has been developed to study the geometrical nature or tortuosity of the 3-D coronary artery shape at any time point in the cardiac cycle. The F-S theory consists of five components: three vector fields along the given curve (the tangent $T(s)$, the normal $N(s)$, and the bi-normal $B(s)$ vectors) and two scalar valued functions (the curvature $\kappa(s)$ and the torsion $\tau(s)$ where s denotes the parametric variable defining the location of point on the curve function $\alpha(s)$. The curvature $\kappa(s_0)$ measures the rate of change of the angle defined by the two neighboring tangents $T(s_0)$ and $T(s_0+\delta_s)$ associated with the two respective points $\alpha(s_0)$ and $\alpha(s_0+\delta_s)$. In other word, it characterizes the degree of bending pertinent to a local curve segment in the neighborhood between $s_0$ and $s_0+\delta_s$ (i.e., how rapidly the curve pulls away from the plane $\Omega_n$ perpendicular to the tangent vector at $T(s_0)$) as shown in FIG. 34a. Similarly, the torsion at $\tau(s_0)$ measures a rate of change (or a twisting) at a point $\alpha(s_0)$ how its trajectory twists out of the plane $\Omega_n$ perpendicular to the normal vector $B(s_0)$) as shown in FIG. 34b.

Figure 34C:
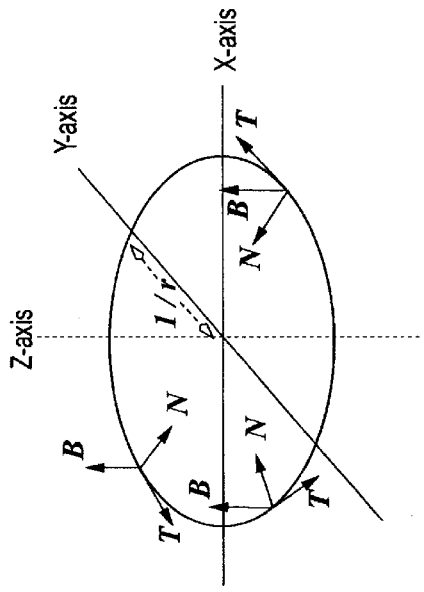
Figure 34B:
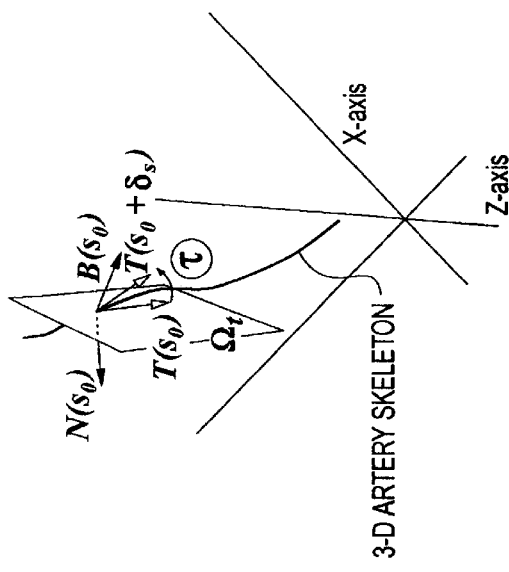
Figure 34A:
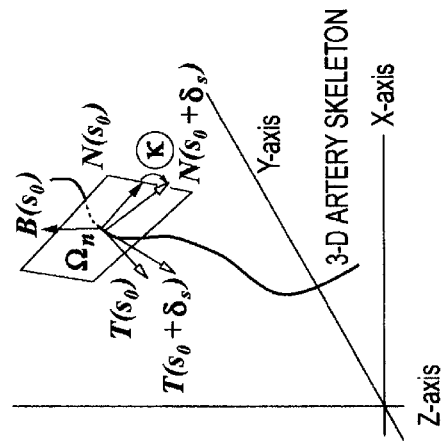

In FIG. 34c, a circle defining on the x-y plane of radius r>0 is illustrated, where the vector fields T(s) and N(s) vary along the curve and the binormal field B(s) is constant. Note that the curvature κ(s) (for all s) of a circle is equal to the reciprocal of its radius (i.e., 1/r). Since the binormal field B is a constant, the torsion at every point is equal to 0. The example illustrated in FIG. 34d shows a circular helix in which has constant curvature and torsion at every point in the curve. Given the curvature and torsion functions κ(s) and τ(s), they completely describe the curve α(s) geometrically.

Figure 38A:
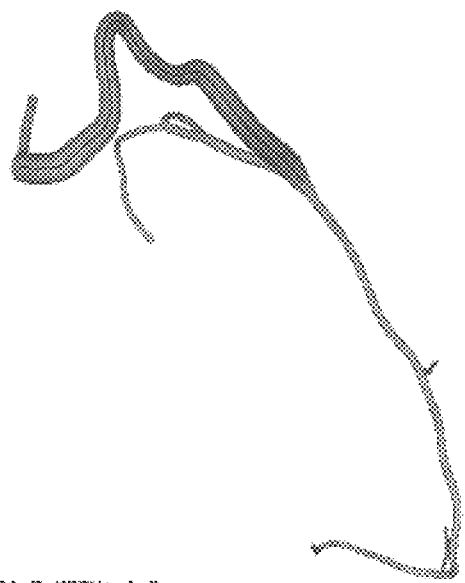
FIGS. 38a–b depict a selected region of interest on a bypass graft and its QCA result.
Figure 38B:
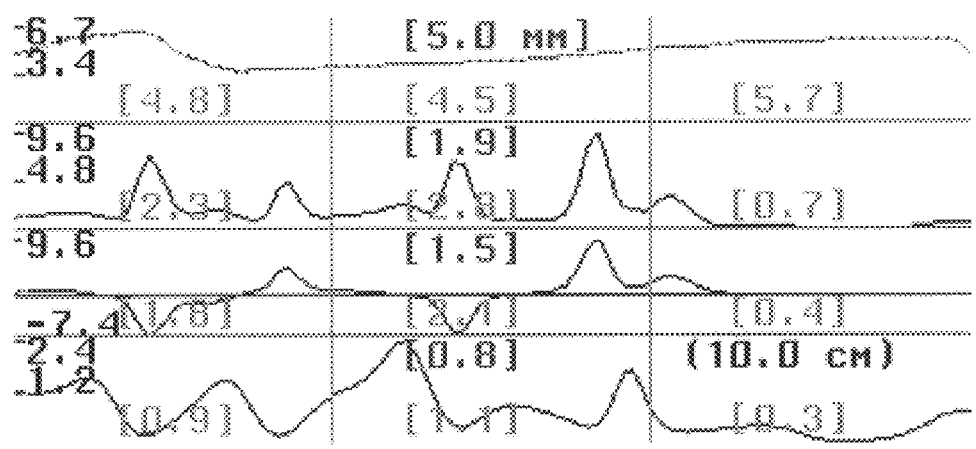

The calculation of curvature and torsion at every vessel centerline point $s_0$ is characterized by the following equations:

$$T(s_0) = \alpha^{(1)}(s_0)/|\alpha^{(1)}(s_0)|$$

$$B(s_0) = \alpha^{(1)}(s_0) \times \alpha^{(2)}(s_0)/|\alpha^{(1)}(s_0) \times \alpha^{(2)}(s_0)|$$

$$N(s_0) = B(s_0) \times T(s_0)$$

$$\kappa(s_0) = |\alpha^{(1)}(s_0) \times \alpha^{(2)}(s_0)|/|\alpha^{(1)}(s_0)|^3$$

$$\tau(s_0) = [\alpha^{(1)}(s_0) \times \alpha^{(2)}(s_0)] \cdot \alpha^{(3)}(s_0)/|\alpha^{(1)}(s_0) \times \alpha^{(2)}(s_0)|^2,$$

where $\alpha^{(1)}(s)$ denotes the ith derivative with respect to s. In FIG. 38a, the length of the selected pathway is 10.0 cm. The narrowest diameter of the diseased arterial segment is 3.4 mm. The measurement of tortuosity associated with this pathway was illustrated in FIG. 38b.

1.2.2. Evaluation of the Tortuosity of Artery by Point-to-Point Method

A new method, which is a variation of F-S theory, is employed to characterize the vessel tortuosity in order to facilitate the study of vessel straightening due to various intra-coronary devices. Three types of vessel tortuosity are defined: (1) point-to-point (or local) tortuosity, (2) point-to-line (or relative) tortuosity, and (3) tortuosity spectrum. Given an arterial segment, the point-to-point (P-to-P) tortuosity at each vessel centerline point is estimated by calculation of the differential of tangent vectors (i.e., the angle in degree between the two tangent vectors) associated with two consecutive arterial points on the 3-D centerline curve. The point-to-line (P-to-L) tortuosity at each vessel centerline point is defined by the differential of the tangent vector and the directional vector of the line connecting the two end points of the given arterial segment (i.e., the angle in degree between the tangent vector of a vessel centerline point and the directional vector of line). Afterwards, the mean values of the P-to-P tortuosity and P-to-L tortuosity are calculated. To evaluate the "global variation" of vessel geometry, the tortuosity spectrum is derived by calculation of the normalized integration of P-to-L tortuosity along the arterial segment.

Figure 39A:
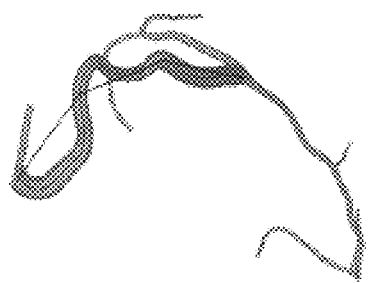
FIGS. 39a–b depict a selected region of interest on a bypass graft and its regional QCA result.
Figure 39B:
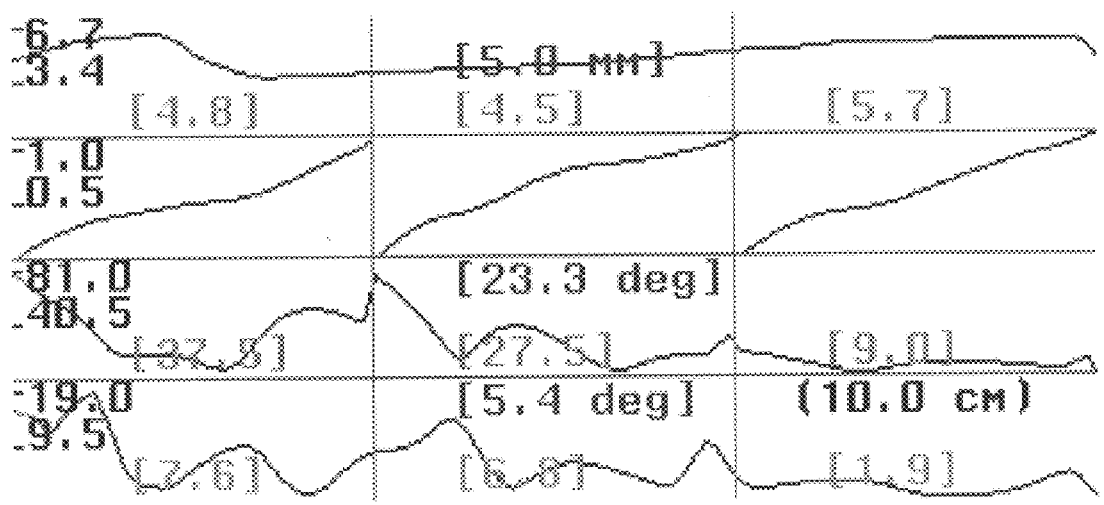

FIG. 39a shows the reconstructed 3-D bypass graft. In FIG. 39b the P-to-P (bottom) and P-to-L (the 2nd graph from the bottom) tortuosity measurements associated with the selected 3 arterial segments defined between the proximal and distal locations in FIG. 39a are illustrated, respectively. The mean values of regional P-to-P and P-to-Line are (7.6,6.8, 1.9) and (37.5,27.5,9.0) degrees, respectively. The total mean values of P-to-P and P-to-Line are 5.4 and 23.3 degrees, respectively. The tortuosity spectrum in terms of the normalized integration of P-to-L measurements and the diameters along the arterial segments are shown at the 2nd graph from the top and the top graphs in FIG. 39b.

Referring again to FIG. 48, elements 4800 . . . 4804 are operable in a manner analogous to elements 4700 . . . 4704 of FIG. 47. Specifically, the user is prompted to enter two points on the arterial tree image presented to define a segment of interest. When a valid segment is so selected, element 4806 is then operable to determine whether the user wishes to evaluate the tortuosity in accordance with the point-to-point method or the F-S method both described above. If the user selects the point-to-point (p-to-p) method, elements 4808 and 4810 are operable to calculate the point-to-point regional curvature and point-to-line regional curvature, respectively, of each point on the vessel centerline as described above. If the F-S method is selected by the user, elements 4812 and 4814 are operable to calculate the curvature and torsion, respectively, of each vessel centerline point along the selected segment pathway as described above.

G. 1.3. Evaluation of the Take-off Angle

Figure 35B:
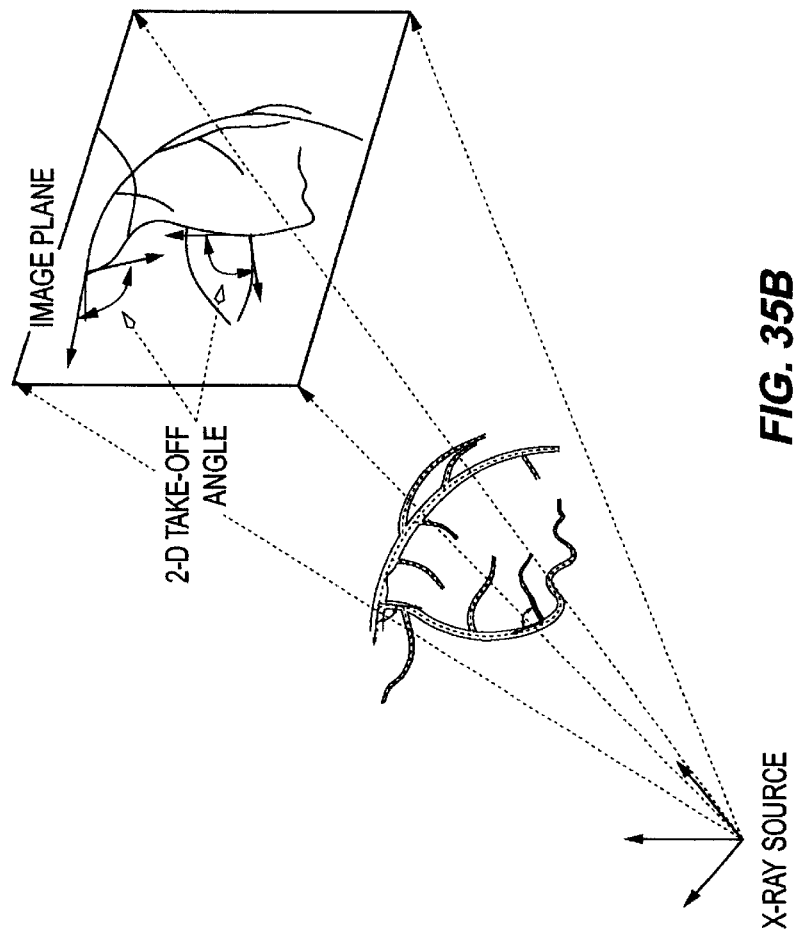
FIGS. 35a–b depict schematic diagrams of 3-D and 2-D take-off angles.
Figure 35A:
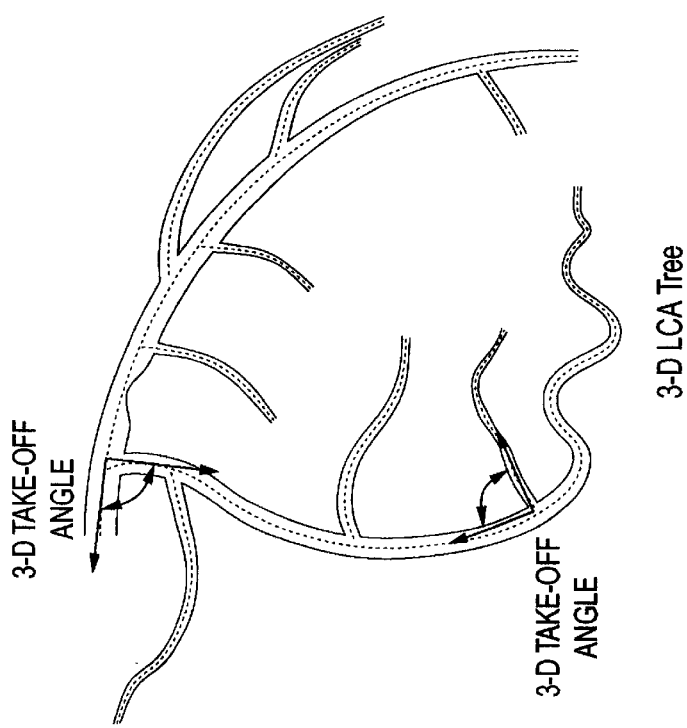
Figure 49:
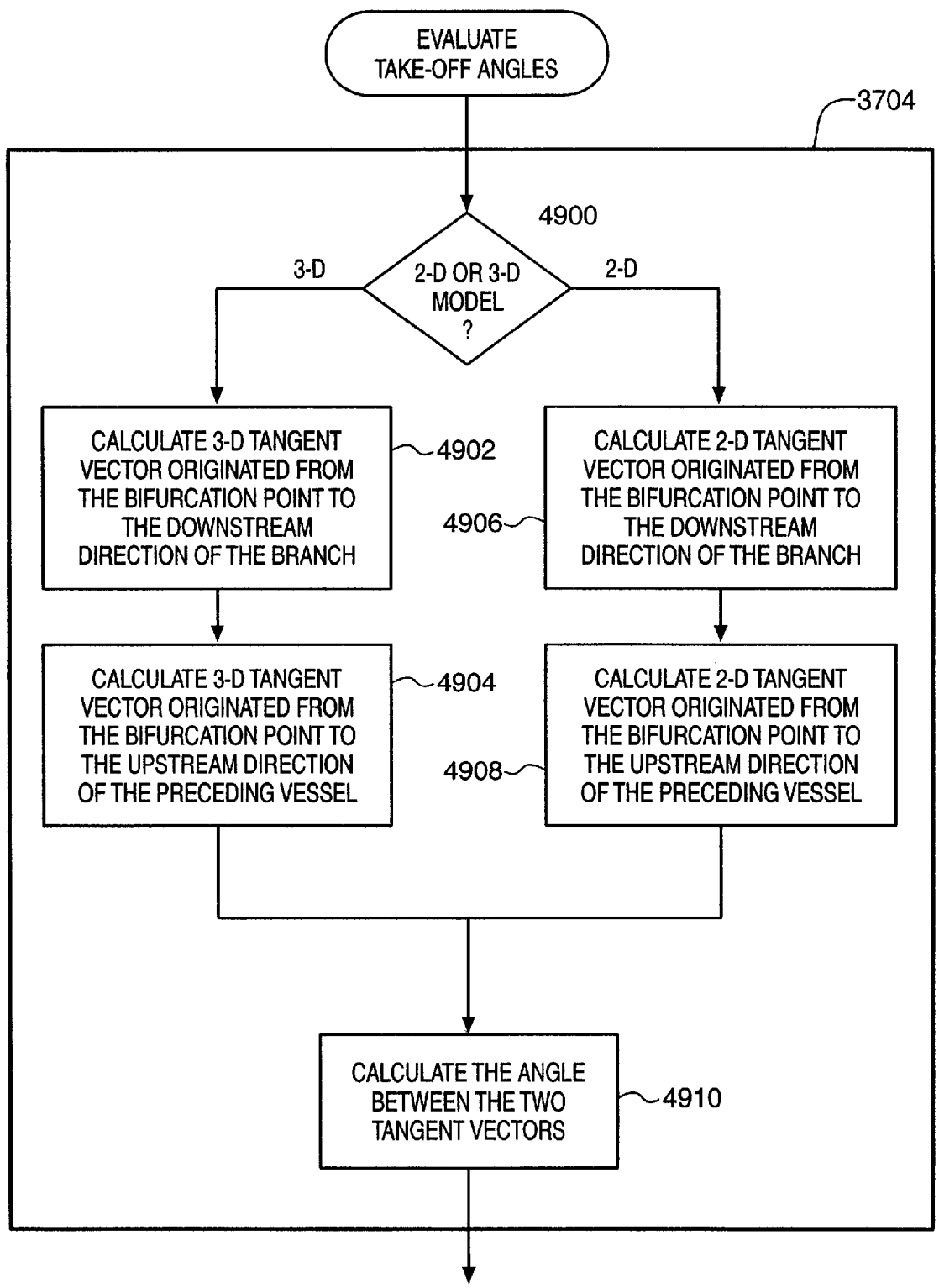
FIG. 49 is a flowchart providing additional detail of the processing to assess take-off angles of a selected arterial segment.

Element 3704 is operable to evaluate the take-off angles of a selected arterial segment pathway. FIG. 49 is a flowchart providing additional details of the processing to evaluate take-off angles of a selected arterial segment. The 3-D take-off angle of a branch vessel is estimated by calculating the angle between the two tangent vectors originating from the bifurcation; i.e., one toward the direction of precedent vessel and the other toward the direction of branching vessel as shown in FIG. 35a. The 2-D take-off angle of a branch vessel is obtained by first computing the branch vessel and preceding vessel centerlines projected onto the imaging plane based on the gantry orientation (α,β) followed by calculating the angle of the 2-D tangent vectors as shown in FIG. 35b. When an arbitrary computer-generated image is produced, the gantry information defining the current projection is calculated in the form of left anterior oblique/right anterior oblique (LAO/RAO) and caudal/cranial (CAUD/CRAN). Mathematically, these gantry angles are defined in a spatial coordinate system with the iso-center as the origin. The LAO/RAO angulation is defined on the y-z plane, while the CAUD/CRAN angulation is defined on the x-z plane. With the gantry viewing angle (α,β), the 2-D projection coordinates $(u_{(\alpha,\beta)}, v_{(\alpha,\beta)})$ of a vessel centerline point can be calculated by use of the following equations:

$$\begin{bmatrix} u_{(\alpha,\beta)} \\ v_{(\alpha,\beta)} \end{bmatrix} = \begin{bmatrix} x_{(\alpha,\beta)}/z(\alpha,\beta) \\ x_{(\alpha,\beta)}/z(\alpha,\beta) \end{bmatrix}$$

$$\begin{bmatrix} x_{(\alpha,\beta)} \\ y_{(\alpha,\beta)} \\ z_{(\alpha,\beta)} \end{bmatrix} = R_y(-\beta)R_x(\alpha) \cdot \begin{bmatrix} x \\ y \\ z \end{bmatrix} = \begin{bmatrix} \cos(-\beta) & \sin(\alpha)\sin(-\beta) & \cos(\alpha)\sin(-\beta) \\ 0 & \cos(\alpha) & -\sin(\alpha) \\ -\sin(-\beta) & \sin(\alpha)\cos(-\beta) & \cos(\alpha)\cos(-\beta) \end{bmatrix} \cdot \begin{bmatrix} x \\ y \\ z \end{bmatrix},$$

where $R_x$ and $R_y$ denotes the rigid rotations with respect to x-axis, $(x_{(\alpha,\beta)}, y_{(\alpha,\beta)}, z_{(\alpha,\beta)})$ denotes the 3-D coordinates of a vessel centerline point defined at the current gantry coordinate system, (x,y,z) denotes the 3-D coordinates of a vessel centerline point in the AP viewing angle (0 degree LAO and 0 degree CAUD) coordinate system, and α (−α) and β (−β) denote a gantry position at LAO (RAO) and CAUD (CRAN) angles, respectively. In FIGS. 40(a) and (b), the 3-D and 2-D take-off angles of individual coronary arteries are shown based on two different gantry viewing angles.

The above equation can be employed to model the majority of existing imaging systems having only two degrees of freedom. Another variable $R_z(\gamma)$, where $R_z$ denotes the rigid rotation with respect to z-axis by $\gamma$ degrees, can be readily added to emulate the imaging system if a rotational C-arm base is employed. With the new third degree of freedom in term of the new angle variable, the above equation can be re-written as follows.

$$\begin{bmatrix} u_{(\alpha,\beta,\gamma)} \\ v_{(\alpha,\beta,\gamma)} \end{bmatrix} = \begin{bmatrix} x_{(\alpha,\beta,\gamma)}/z(\alpha,\beta,\gamma) \\ x_{(\alpha,\beta,\gamma)}/z(\alpha,\beta,\gamma) \end{bmatrix}$$

$$\begin{bmatrix} x_{(\alpha,\beta,\gamma)} \\ y_{(\alpha,\beta,\gamma)} \\ z_{(\alpha,\beta,\gamma)} \end{bmatrix} = R_y(-\beta)R_x(\alpha)R_z(\gamma) \cdot \begin{bmatrix} x \\ y \\ z \end{bmatrix} = \begin{bmatrix} C(-\beta)C(\gamma)+S(\alpha)S(-\beta)S(\gamma) & -S(\gamma)C(-\beta)+S(\alpha)S(-\beta)C(\gamma) & C(\alpha)S(-\beta) \\ C(\alpha)S(\gamma) & C(\alpha)S(\gamma) & -S(\alpha) \\ -S(-\beta)C(\gamma)+S(\alpha)C(-\beta)S(\gamma) & S(-\beta)S(\gamma)+S(\alpha)C(-\beta)C(\gamma) & C(\alpha)C(-\beta) \end{bmatrix} \cdot \begin{bmatrix} x \\ y \\ z \end{bmatrix},$$

where $C(x)$ and $S(x)$ denote the cos and sin functions respectively.

FIG. 49 is a flowchart providing additional details of the processing of element 3704 of FIG. 37 comprising a method for computing take-off angles in accordance with a 2-D or 3-D model. Element 4900 is first operable to determine which model the user has requested. If a 3-D model is used, elements 4902 and 4904 compute the two required tangent vectors from the bifurcation point downstream and from the bifurcation point upstream, respectively. If a 2-D model is used, elements 4906 and 4908 calculate the required two tangent vectors as originated from the bifurcation point downstream in the direction of the branch and from the bifurcation point upstream in the direction of the preceding vessel, respectively. In both models, element 4910 then computes the take-off angel as the angle between the two tangent vectors as determined in accordance with the requested model.

G. 1.4. Evaluation of the Insertion Angle

Figure 36:
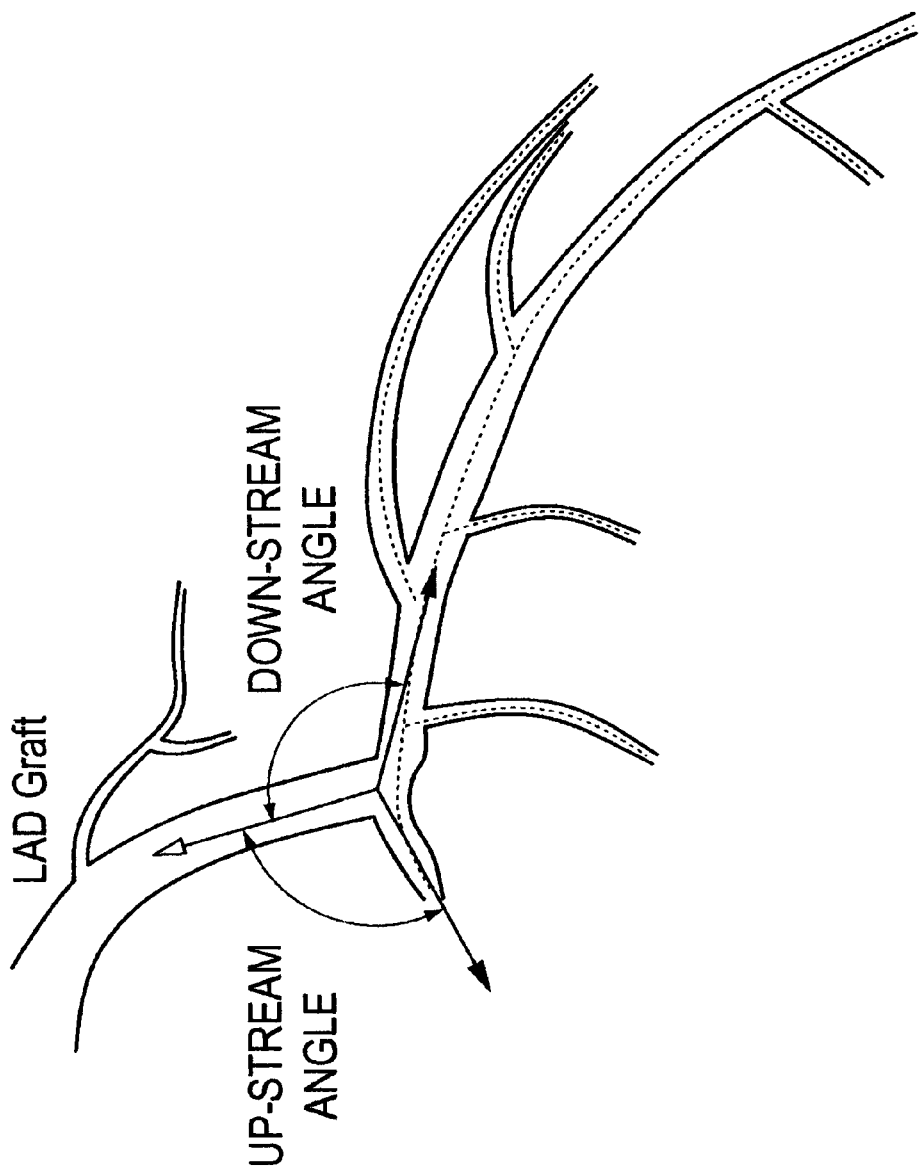
FIG. 36 depicts a schematic diagram of insertion angle of a bypass graft.
Figure 50:
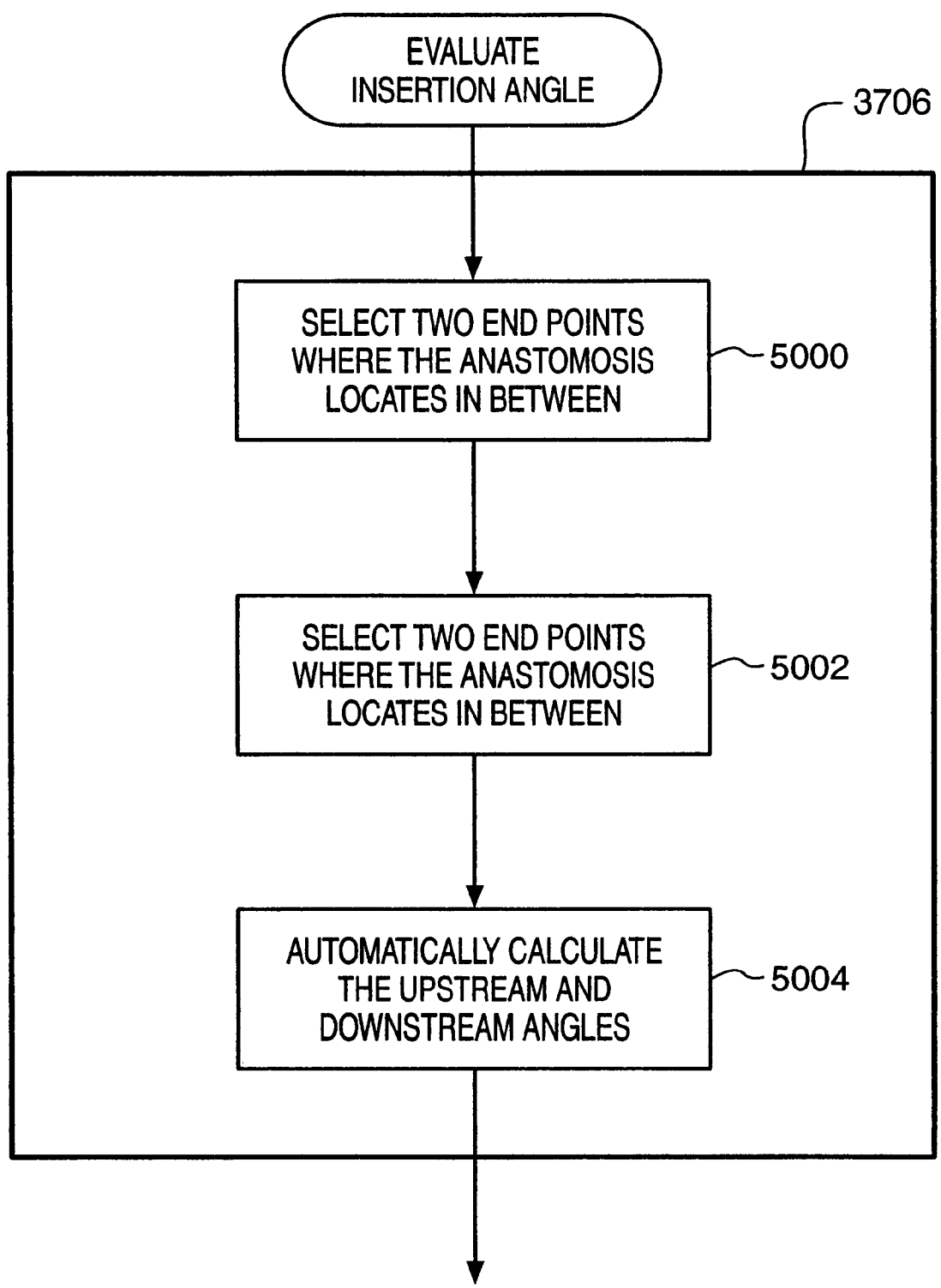
FIG. 50 is a flowchart providing additional detail of the processing to assess insertion angles of a selected arterial segment.

Element 3706 is operable to evaluate the insertion angle of a selected arterial segment pathway. FIG. 50 is a flowchart providing additional details of the processing to evaluate the insertion angle of a selected arterial segment. The insertion angles (upstream and downstream angles) of bypass graft at the end-to-side anastomosis are estimated by calculation of the angles between the 3-D tangent vectors at the native vessels and the tangent vector at the graft as shown in FIG. 36. Element 5000 of FIG. 50 is operable to receive operator input selecting two end points on the arterial tree having the anastomosis located between them. Element 5002 then receives operator input to select one point on the native artery connecting to the anastomosis. Element 5004 then calculates the insertion angle as the upstream and downstream angles defined by the three selected points.

G.2. Determination of Optimal View Strategy

When an arbitrary computer-generated image is produced, the gantry information defining the current projection is calculated in the form of left anterior oblique/right anterior oblique (LAO/RAO) and caudal/cranial (CAUD/CRAN). These gantry angles are defined in a spatial coordinate system with the iso-center as the origin. The LAO/RAO angulation is defined on the y-z plane, while the CAUD/CRAN angulation is defined on the x-z plane. With the spatial coordinates, the position of focal spot $(x_f, y_f, z_f)$ can be formulated by use of two rotations $R_x(\alpha)$ and $R_y(-\beta)$ as, $$\begin{bmatrix} x_f \\ y_f \\ z_f \end{bmatrix} = R_y(-\beta)R_x(\alpha) \cdot \begin{bmatrix} x_n \\ y_n \\ z_n \end{bmatrix} = \begin{bmatrix} \cos(-\beta) & \sin(\alpha)\sin(-\beta) & \cos(\alpha)\sin(-\beta) \\ 0 & \cos(\alpha) & -\sin(\alpha) \\ -\sin(-\beta) & \sin(\alpha)\cos(-\beta) & \cos(\alpha)\cos(-\beta) \end{bmatrix} \cdot \begin{bmatrix} x_n \\ y_n \\ z_n \end{bmatrix},$$

where $(x_n, y_n, z_n)=(0, 0, D_{fc})$ denotes the neutral position of focal spot or anterior-posterior (AP) view with 0° LAO and 0° CAUD, $D_{fc}$ is the distance between iso-center and focal spot which is provided by the manufacture), $R_x$ and $R_y$ denotes the rigid rotations with respect to x-axis andy-axis, and $\alpha$ $(-\alpha)$ and $\beta$ $(-\beta)$ denote the LAO (RAO) and CAUD (CRAN) angles, respectively.

The above equation can be employed to model the majority of existing imaging systems having only two degrees of freedom. Another variable $R_z(\gamma)$, where $R_z$ denotes the rigid rotation with respect to z-axis by $\gamma$ degrees, can be readily added to emulate the imaging system if a rotational C-arm base is employed. With the new third degree of freedom in term of the new angle variable, the above equation can be re-written as follows.

$$\begin{bmatrix} x_f \\ y_f \\ z_f \end{bmatrix} = R_y(-\beta)R_x(\alpha)R_z(\gamma) \cdot \begin{bmatrix} x_n \\ y_n \\ z_n \end{bmatrix} = \begin{bmatrix} C(-\beta)C(\gamma)+S(\alpha)S(-\beta)S(\gamma) & -S(\gamma)C(-\beta)+S(\alpha)S(-\beta)C(\gamma) & C(\alpha)S(-\beta) \\ C(\alpha)S(\gamma) & C(\alpha)S(\gamma) & -S(\alpha) \\ -S(-\beta)C(\gamma)+S(\alpha)C(-\beta)S(\gamma) & S(-\beta)S(\gamma)+S(\alpha)C(-\beta)C(\gamma) & C(\alpha)C(-\beta) \end{bmatrix} \cdot \begin{bmatrix} x_n \\ y_n \\ z_n \end{bmatrix},$$

where $C(x)$ and $S(x)$ denote the cos and sin functions respectively.

Figure 41A:
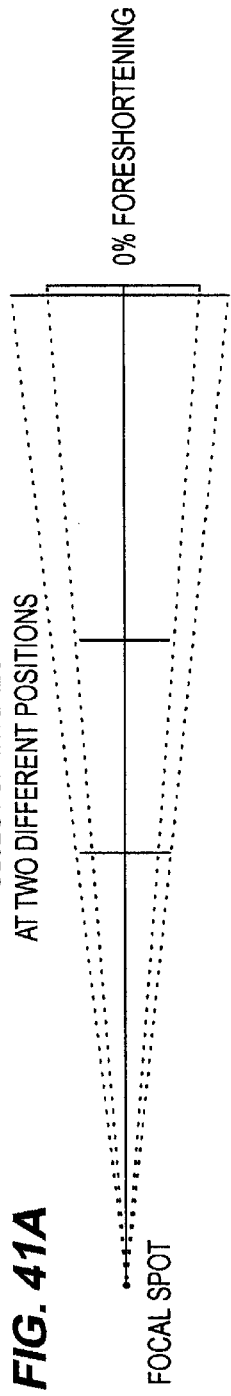
FIGS. 41a–c depict the percent foreshortening.
Figure 41B:
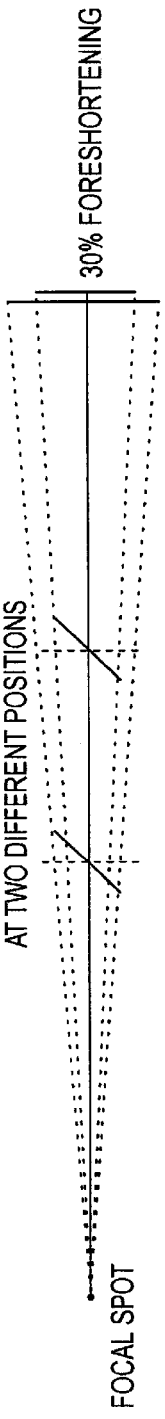
Figure 41C:
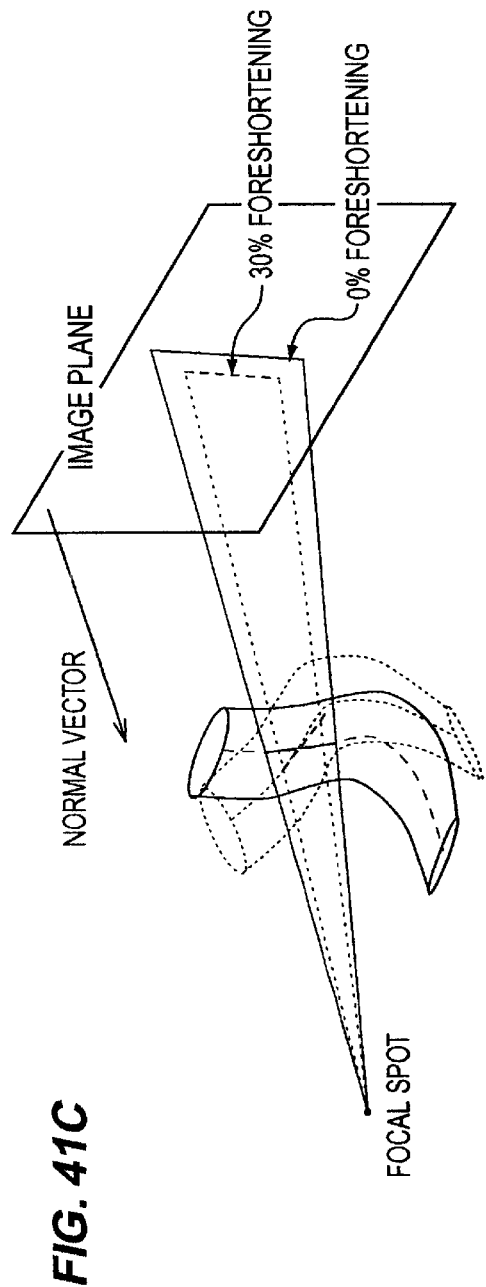

Given the 3-D character of the coronary artery tree, it is expected that any projection will foreshorten a variety of segments. The visual perception provided by such a projection shows a variety of arterial segments with a degree of foreshortening that may or may not be appreciated. In FIG. 41a, the graphical example shows that the projected object has 0% degree of foreshortening since the tangential direction of such a line segment is perpendicular to the normal vector of image plane. Note that the projections of the two line segments have various magnifications due to the different locations relative to the image intensifier. If the two line segments are rotated by an arbitrary angle, e.g., 45 degrees relative to their original orientation in FIG. 41a, there will be approximately 30% degree of foreshortening as shown in FIG. 41b. In FIG. 41c, a synthetic example of vessel foreshortening for a typical segment of a curvilinear arterial centerline is illustrated.

Figure 42A:
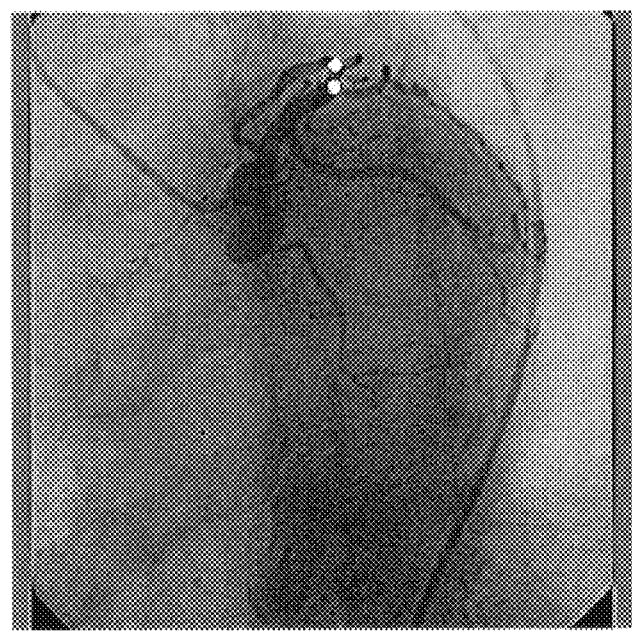
FIGS. 42a–b depict typical vessel foreshortening on LCA segments.
Figure 42B:
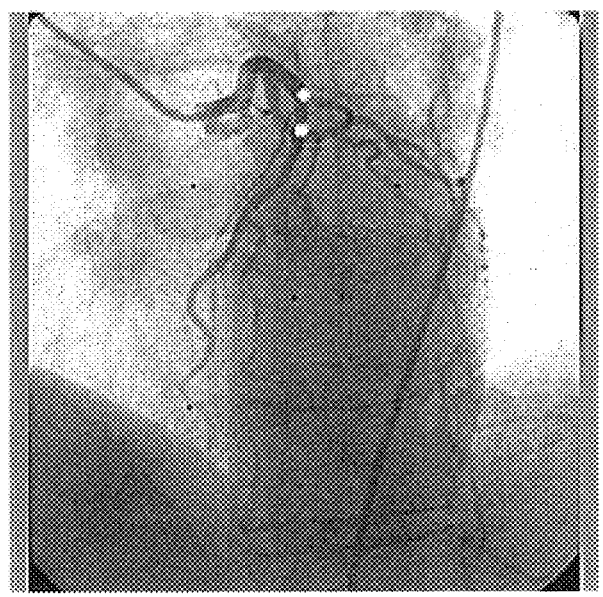

Due to the problem of vessel overlap and foreshortening, multiple projections are necessary to adequately evaluate the coronary arterial tree with arteriography. The elimination or at least minimization of foreshortening and overlap is a prerequisite for an accurate quantitative coronary analysis (QCA) such as determination of intra coronary lengths in a 2-D display. Hence, the patient might receive substantial radiation and contrast material during diagnostic and interventional procedures. This traditional trial-and-error method provides views in which overlapping and foreshortening are minimized, but only in terms of the subjective experience-based judgment of the angiographer. In FIG. 42a and 42b, the same vessel segment between two bifurcation points as marked by two dots at its two distal ends depicts 77% and 52% foreshortening in the respective angiograms.

The reconstructed 3-D coronary arterial tree can be rotated to any selected viewing angle yielding multiple computer-generated projections to determine for each patient which standard views are useful and which are of no clinical value due to excessive overlap. Therefore, the 3-D computer assistance provides means to improve the quality and utility of the images subsequently acquired.

G.2. 1. Calculation of Percent Foreshortening Map

Figure 52:
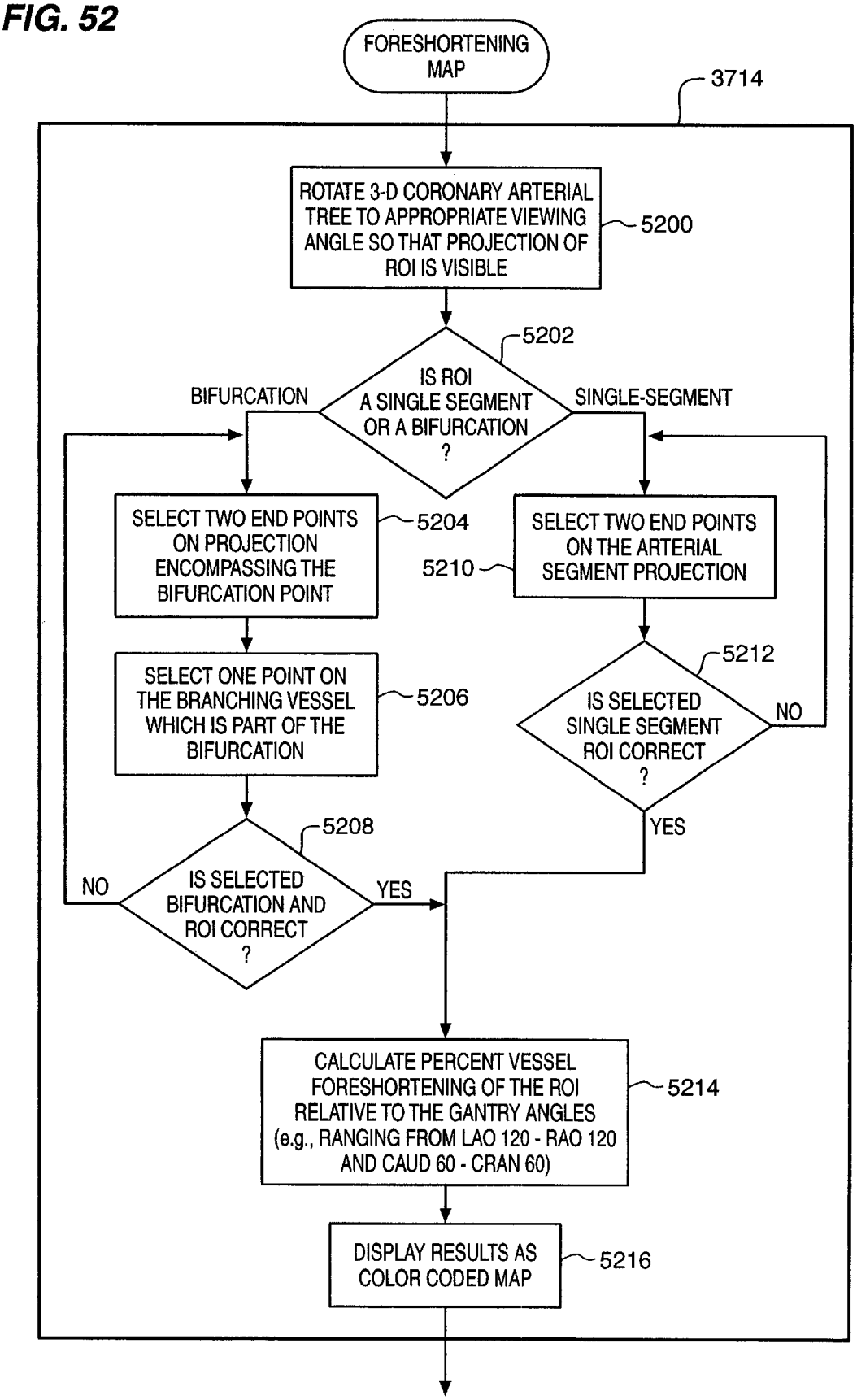
FIG. 52 is a flowchart providing additional detail of the processing to optimal view of a selected arterial segment to minimize foreshortening.

Element 3714 is operable to present foreshortening information for an arterial tree to permit a user to optimize the view for foreshortening. FIG. 52 is a flowchart providing additional details of the processing to optimize the view of an arterial tree 3-D projection for reducing foreshortening. Let $p_i$, $i=0, 1, \ldots, m$ denote the points on the 3-D vessel centerline curve $\check{L}$. Let $\vec{1}_j = [1_{j_x}, 1_{j_y}, 1_{j_z}]^t$, $j=1, 2, \ldots, m$ denote the vector formed by every two consecutive vessel centerline points $p_{j-1}$ and $p_j$. The percent foreshortening $\mathcal{F}_{fores}$ of a vessel segment $\check{L}$ based on any specific gantry orientation $\alpha$ and $\beta$ angles can be obtained as follows:

$$\mathcal{F}_{fores}(\alpha, \beta, \check{L}) = \frac{\sum_{j=1}^{m} |\vec{1}_j| \cos(\theta_j)}{\sum_{j=1}^{m} |\vec{1}_j|},$$

$$0° \leq \theta_j \leq 180°, -120° < \alpha < 120°, -60° < \beta < 60°.$$

where $\theta$ is the angle between the directional vector $\vec{1}_j$ and projection vector $\vec{z}_p = [-\cos(\alpha)\sin(\beta), -\sin(\alpha), \cos(\alpha)\cos(\beta)]^t$, and the constraints associated with the angle parameters $\alpha$ and $\beta$ pertinent to the achievable gantry angles of imaging system. If there are k multiple arterial segments to be evaluated (e.g., a bifurcation region), the aforementioned equation is extended as follows:

$$\mathcal{F}_{fores}(\alpha, \beta, \check{L}) = \frac{\sum_{i=1}^{k} \sum_{j=1}^{m_i} |\vec{1}_j^i| \cos(\theta_j^i)}{\sum_{i=1}^{k} \sum_{j=1}^{m_i} |\vec{1}_j^i|},$$

$$0° \leq \theta_j^i \leq 180°, -120° < \alpha < 120°, -60° < \beta < 60°.$$

where $\check{L} = \{L_1, L_2, \ldots, L_k\}$ denote the set of arterial segments and each arterial segment of interest $L_i = \{\vec{1}_1^i, \vec{1}_2^i, \ldots, \vec{1}_{m_i}^i\}$ consists of $(m_i+1)$ centerline points, $i=1, 2, \ldots, k$.

The above equations can be employed to model the majority of existing imaging systems having only two degrees of freedom. Another variable $\gamma$, denoting the rigid rotation with respect to z-axis by $\gamma$ degrees, can be readily added to emulate the imaging system if a rotational C-arm base is employed. With the new third degree of freedom in term of the new angle variable, the above equation can be re-written as follows.

$$\mathcal{F}_{fores}(\alpha, \beta, \gamma, \check{L}) = \frac{\sum_{j=1}^{m} |\vec{1}_j| \cos(\theta_j)}{\sum_{j=1}^{m} |\vec{1}_j|},$$

$$0° \leq \theta_j \leq 180°, -120° < \alpha < 120°, -60° < \beta < 60°, -90° < \gamma < 90°.$$

$$\mathcal{F}_{fores}(\alpha, \beta, \gamma, \check{L}) = \frac{\sum_{i=1}^{k} \sum_{j=1}^{m_1} |\vec{1}_j^i| \cos(\theta_j^i)}{\sum_{i=1}^{k} \sum_{j=1}^{m_1} |\vec{1}_j^i|},$$

$$0° \leq \theta_j^i \leq 180°, -120° < \alpha < 120°, -60° < \beta < 60°, -90° < \gamma < 90°.$$

Figure 44A:
FIGS. 44a–d depict a selected single segment of a region of interest and its maps.
Figure 44B:
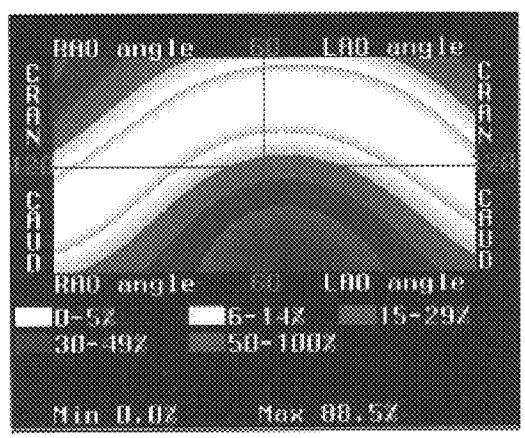
Figure 45A:
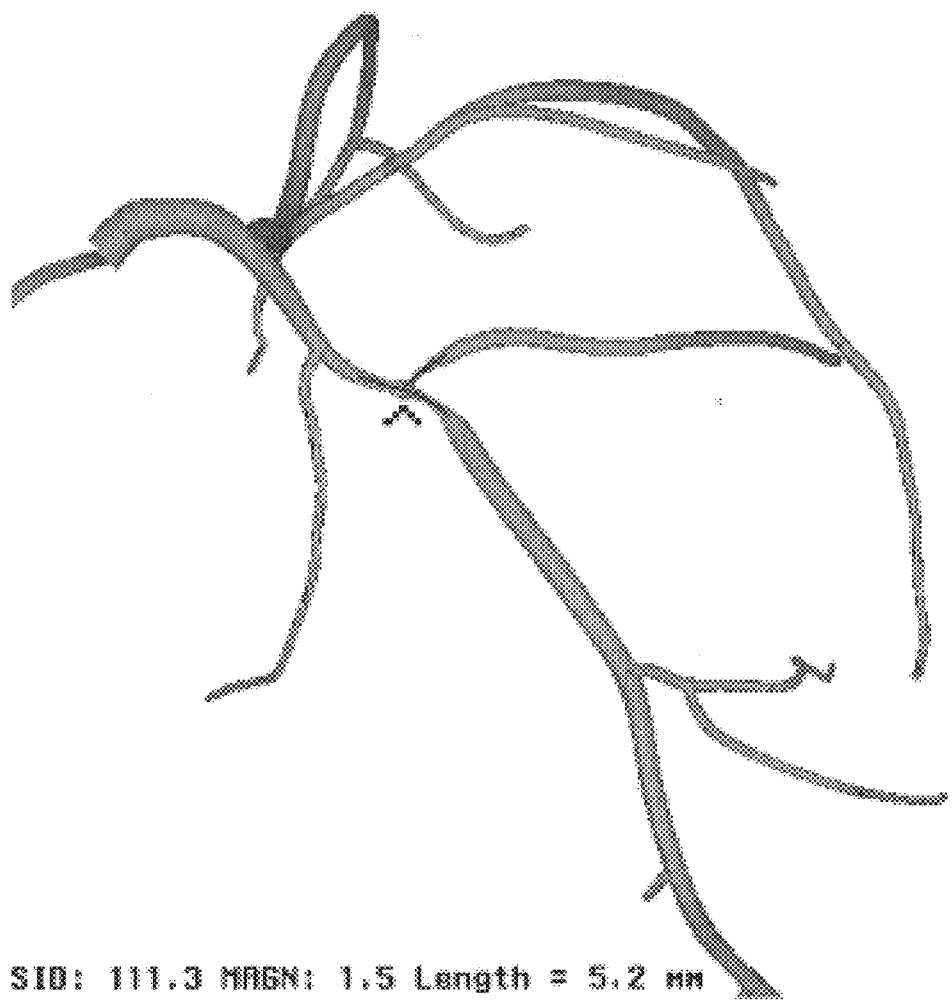
FIGS. 45a–d depict a selected bifurcation region of a region of interest and its maps.
Figure 45B:
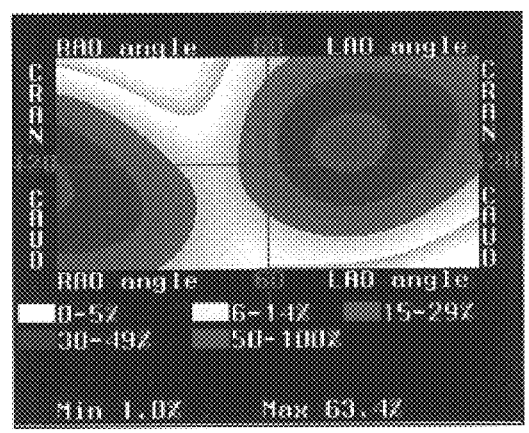
Figure 46A:
FIGS. 46a–d depict a selected bypass graft segment of a region of interest and its three regional maps.
Figure 46B:
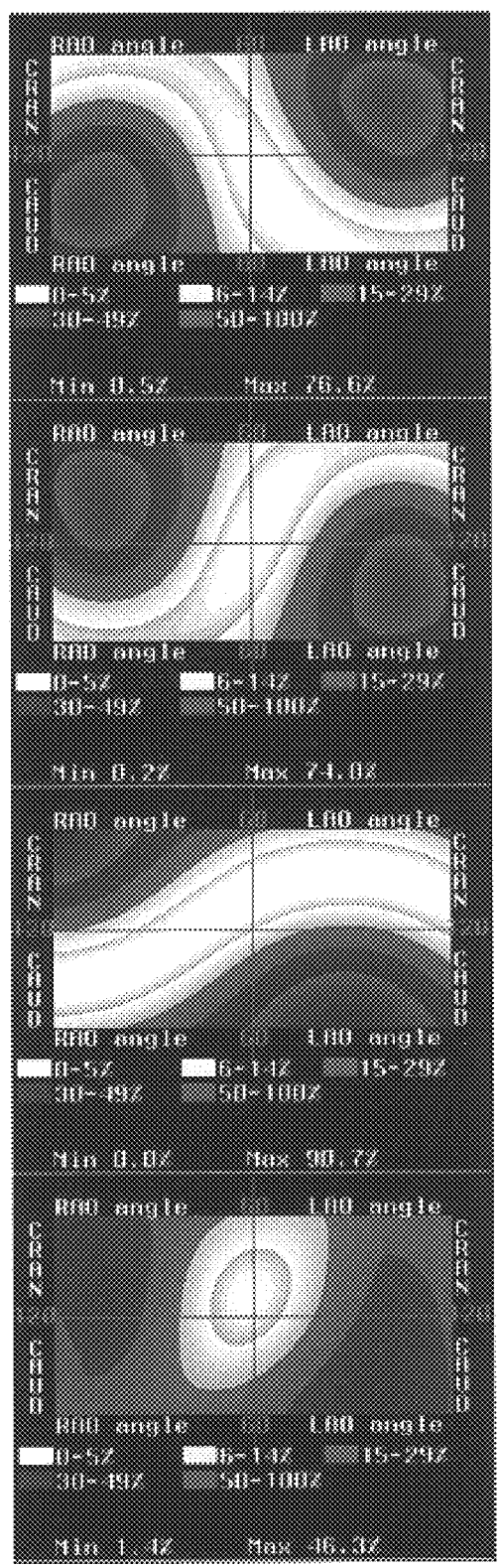

Based on the percent foreshortening equation $\mathcal{F}_{fores}(\alpha, \beta, \check{L})$, the percent foreshortening map relative to the arterial segments of interest $\check{L}$ can be generated. In the foreshortening map, the native and positive x-axes denote the RAO and LAO angles. Similarly, the native and positive y-axes denote the CAUD and CRAN angles, respectively. Each element of the map Map$_f(\alpha,\beta)$ contains the calculated percent foreshortening measurement. The contents of Map$_f(\alpha, \beta)$ is further coded by 5 colors with the spectrum from 0 to 255 for each color that is inverse proportional to the magnitude of percent foreshortening. Five colors are employed for representing various ranges of percent foreshortening measurement including: white color (0–5)%, yellow color (6–14)%, green color (15–29)%, blue color (30–49)%, and red color (50–100)%, respectively. FIG. 44b shows the foreshortening map of a selected arterial segment of interest corresponding to a stenotic lesion in FIG. 44a. In FIG. 45b, the map corresponding to a bifurcation lesion of FIG. 46a as region of interest is produced. FIG. 46b demonstrates the multiple foreshortening maps with respect to the three arterial segments of interest selected from a bypass graft.

Referring again to FIG. 52, element 5200 is operable to rotate the 3-D projection of the arterial tree so that a selected region of interest ("ROI") is visible on the user's display screen. Element 5202 then determines whether the selected ROI represents a single segment of the arterial tree or includes a bifurcation. If the ROI includes a bifurcation, element 5204 is operable to receive user input to select two end points on the displayed projection such that the bifurcation is encompassed within the segment defined by the two selected end points. Element 5206 is operable to receive user input to select an additional point on the branching vessel of the bifurcation. Element 5208 is then operable to verify that the selected three points are correct in that they are within the region of interest and correctly define the bifurcated branches. If the points entered are not correct, processing continues by looping back to element 5204 to await correct input from the user. If the entered points are correct, processing continues with element 5214 discussed below.

If element 5202 determines that the ROI comprises a single segment of the arterial tree, element 5210 is operable to select two end points defining the segment of the ROI to be optimized for foreshortening. Element 5212 then verifies that the selected segment is correct in that the two points define a continuous segment within the ROI. If the points are correct, processing continues with element 5214 below. If not, processing loops back to element 5210 to await entry by a user of correct points defining the segment to be displayed.

Element 5214 is then operable to calculate the accumulated percent vessel foreshortening over all points of the selected segment or bifurcation for all viewing angles. Element 5216 then displays the calculated values as a color coded map as discussed above. The color coding of the foreshortening map allows the user to rapidly assess the optimal view of the segment or bifurcation in the ROI. The user then points to the portion of the map for the desired view of the ROI and segment or bifurcation. The user may view all other (sub-optimal) views by simply pointing to other areas of the displayed map. The 3-D projection of the arterial tree (the ROI) is moved accordingly to present the corresponding view angles.

Figure 43A:
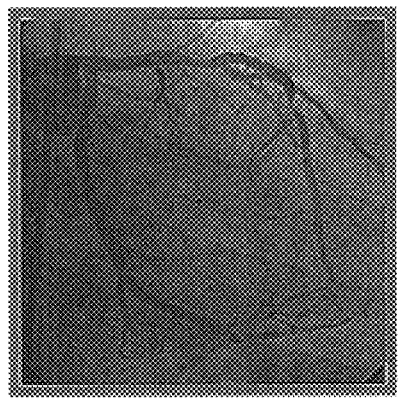
FIGS. 43a–d depict accumulated percent foreshortening on the entire LCA reconstructed from an image pair.
Figure 43B:
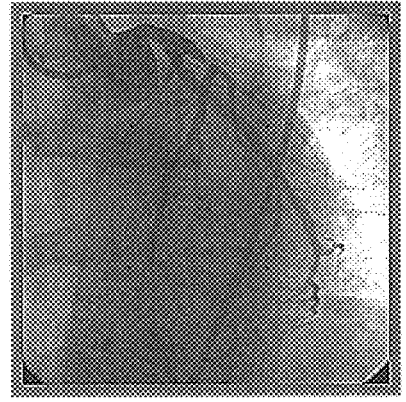
Figure 43C:
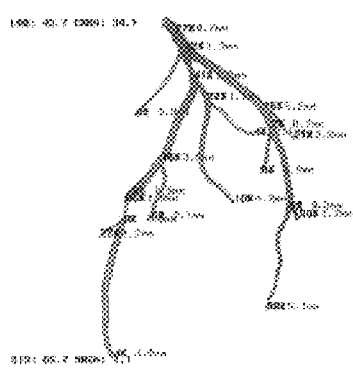
Figure 43D:
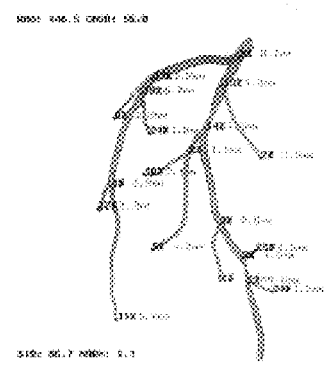
Figure 53:
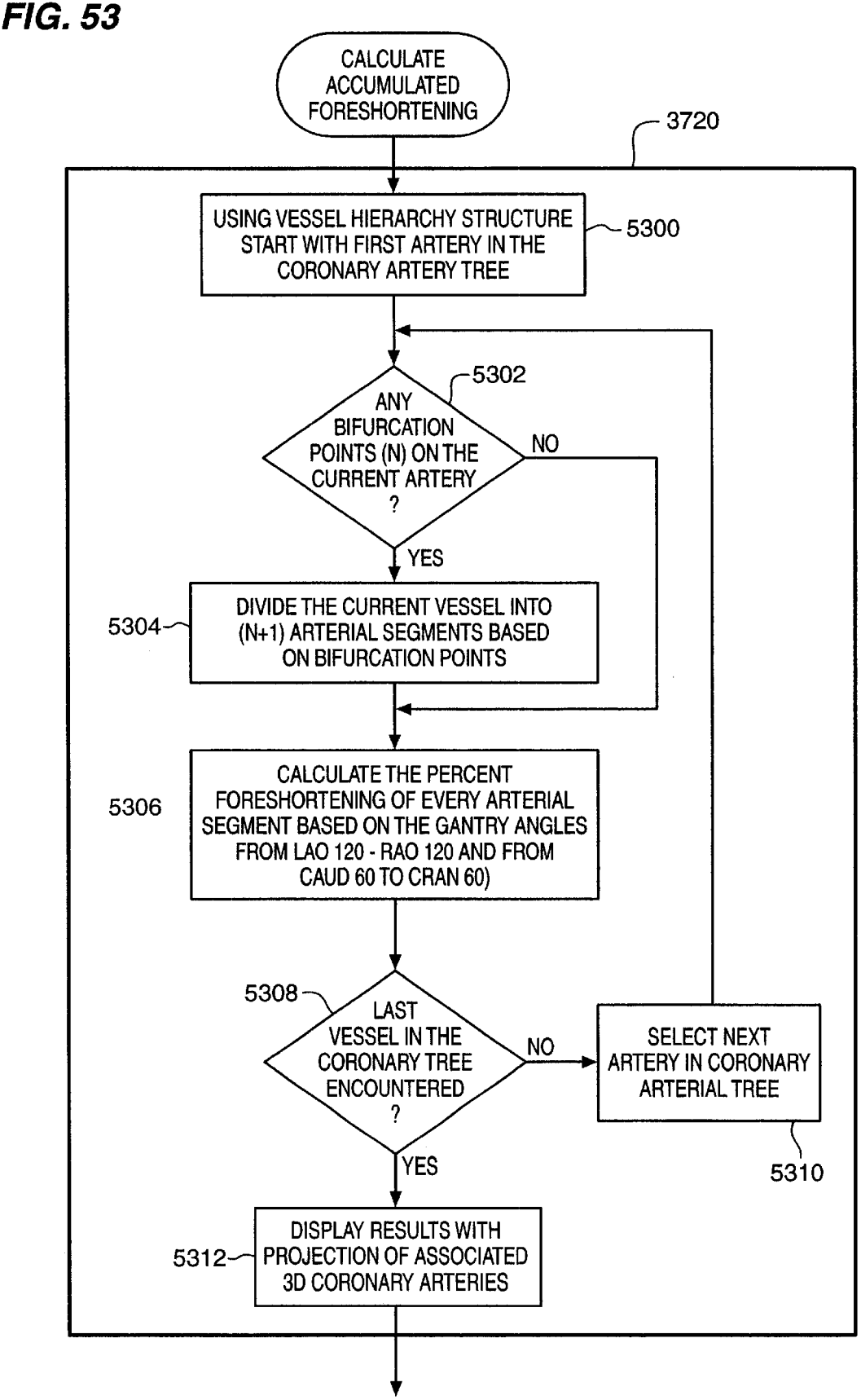
FIG. 53 is a flowchart providing additional detail of the processing to determine accumulated percent foreshortening of a selected arterial segment.

G.2.2. Calculation of Accumulated Percentage Foreshortening of Entire Coronary Tree Element 3720 is operable to calculate the accumulated foreshortening percentage for an entire segment or bifurcated segment. FIG. 53 is a flowchart providing additional details of the processing to perform such computations. The calculation of the percent foreshortening of the coronary tree is performed by calculating the accumulated foreshortening (a) on the multiple segments of an artery divided by bifurcation points or (b) on the entire artery if it has no branching vessel. If an artery has N branching vessels, there will be N+1 segments associated with the artery. The calculated results of accumulated foreshortening of each segment is displayed with the true 3-D length in millimeters near the locations of every distal-end and bifurcations of the projection according to the current gantry viewing angle. In FIGS. 43(c) and 43(d), the overall percent foreshortening of the entire coronary tree are illustrated. For example, the true length (4.8 mm) of the arterial segment from the distal-end to the bifurcation on the mid-LAD is foreshortened by 4% on the current gantry angle LAO 43.7, CRAN 34.1 in FIG. 43(c). Similarly, the arterial segment of true length 3.6 mm defined by the bifurcations of the first and second diagonal arteries has 16% and 3% foreshortening as shown in FIGS. 43(c) and 43(d), respectively.

Element 5300 is operable to start with the first artery in the arterial tree using the vessel hierarchy data structure. Starting at that first artery, element 5302 is then operable to determine whether there are any bifurcation points on the current artery. If note, processing skips to element 5306 below. If there are bifurcations on the current artery, element 5304 is next operable to divide the current vessel into N+1 arterial segments based on the N bifurcation points on the current artery. Element 5306 then calculates the percent foreshortening of each arterial segment for all gantry angles. Element 5308 then determines whether any additional arterial segments remain to be processed by further calculations of element 5306. If additional segments remain to be processed, element 5310 is then operable to select the next segment of the current artery and processing loops back to element 5302 to process the next segment. Elements 5302 through 5310 are therefore iteratively operable on all segments of the selected artery of the arterial tree. When all segments have been processed, element 5312 is operable to display the results as a color coded map as described above.

G.2.3. Calculation of Percent Overlap Map

Figure 54:
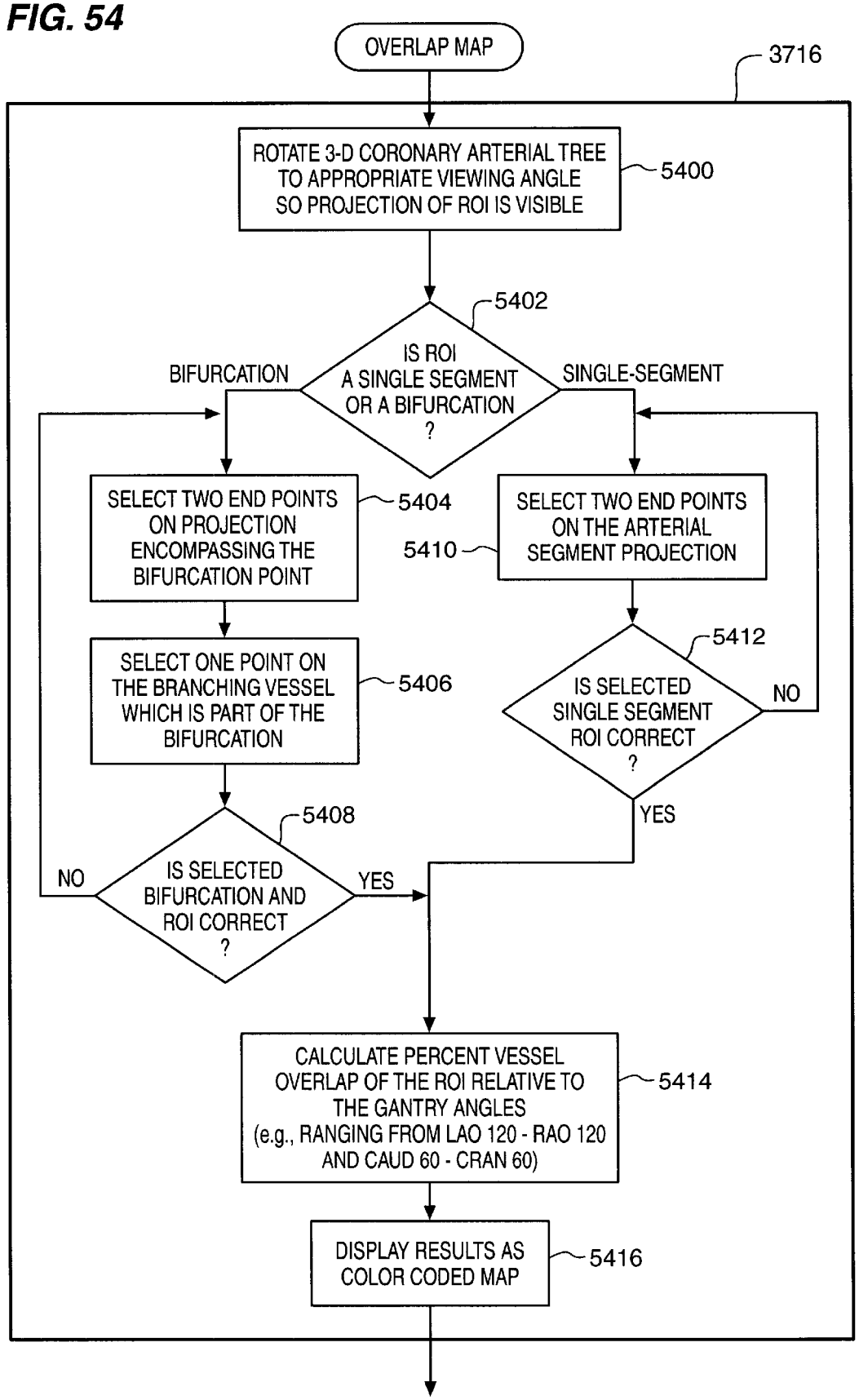
FIG. 54 is a flowchart providing additional detail of the processing to optimal view of a selected arterial segment to minimize overlap.

Element 3716 is operable to present overlap information for an arterial tree to permit a user to optimize the view for overlap. FIG. 54 is a flowchart providing additional details of the processing to optimize the view of an arterial tree 3-D projection for reducing foreshortening. Let $p_i$, i=0, 1, . . . , m denote the points on the 3-D vessel centerline curve $\check{L}$. Let $\vec{T}_j=[1_{j_x}, 1_{j_y}, 1_{j_z}]^t$, j=1, 2, . . . , m denote the vector of every two consecutive vessel centerline points $p_{j-1}$ and $p_j$. Based on any specific gantry orientation $\alpha$ and $\beta$ angles, the percent vessel overlap $\mathcal{F}_{ovlp}$ of a vessel segment $\check{L}$ relative to all the arteries $\zeta^i$, i=1, . . . , n, in the coronary tree T after projection can be obtained as follows:

$$F_{ovlp}(\alpha, \beta, \check{L}, \vec{T}) = \frac{\min\left(\sum_{i=1,i\neq k}^{n} \left\{\Pi_{\alpha,\beta}(\zeta^i) \cap \Pi_{\alpha,\beta}\left(\zeta_{\vec{1}}^k\right)\right\}, \Pi_{\alpha,\beta}\left(\zeta_{\vec{1}}^k\right)\right)}{\Pi_{\alpha,\beta}\left(\zeta_{\vec{1}}^k\right)} \cdot 100\%$$

subject to the constraints pertinent to the achievable gantry angles of imaging system $$-120° < \alpha < 120°, \; -60° < \beta < 60°,$$

where $\zeta^i$, and $\zeta^k_{\vec{1}}$, denote the 3-D arterial lumen surfaces of the ith artery and of the selected segment-of-interest at the kth artery (or $\check{L}$), respectively. $\Pi_{\alpha,\beta}(O)$ denotes an operator that counts number of pixels after perspectively projecting the object O onto the image plane based on the gantry angles ($\alpha,\beta$), and min($V_a, V_b$) denotes a binary operator that returns the smaller value between the two variables $V_a$ and $V_b$.

The above equations can be employed to model the majority of existing imaging systems having only two degrees of freedom. Another variable $\gamma$, denoting the rigid rotation with respect to z-axis by $\gamma$ degrees, can be readily added to emulate the imaging system if a rotational C-arm base is employed. With the new third degree of freedom in term of the new angle variable, the above equation can be re-written as follows.

$$F_{ovlp}(\alpha, \beta, \gamma, \check{L}, \vec{T}) =$$

$$\frac{\min\left(\sum_{i=1,i\neq k}^{n} \left\{\Pi_{\alpha,\beta,\gamma}(\zeta^i) \cap \Pi_{\alpha,\beta,\gamma}\left(\zeta_{\vec{1}}^k\right)\right\}, \Pi_{\alpha,\beta,\gamma}\left(\zeta_{\vec{1}}^k\right)\right)}{\Pi_{\alpha,\beta}\left(\zeta_{\vec{1}}^k\right)} \cdot 100\%$$

subject to the constraints pertinent to the achievable gantry angles of imaging system $$-120° < \alpha < 120°, \; -60° < \beta < 60°, \; -90° < \gamma < 90°,$$

Figure 44C:
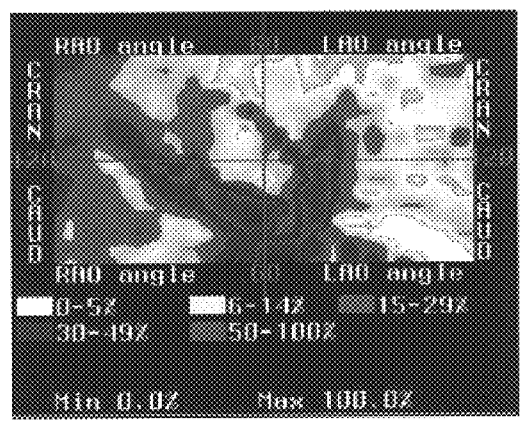
Figure 45C:
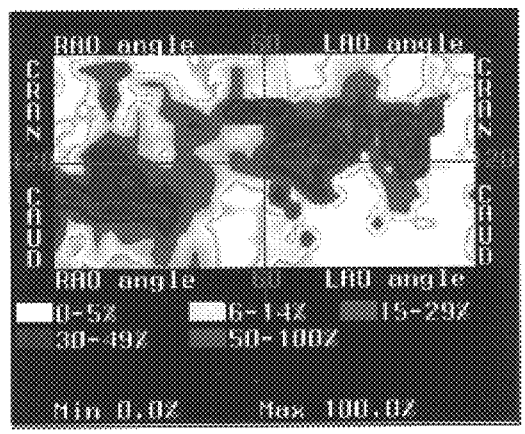
Figure 46C:
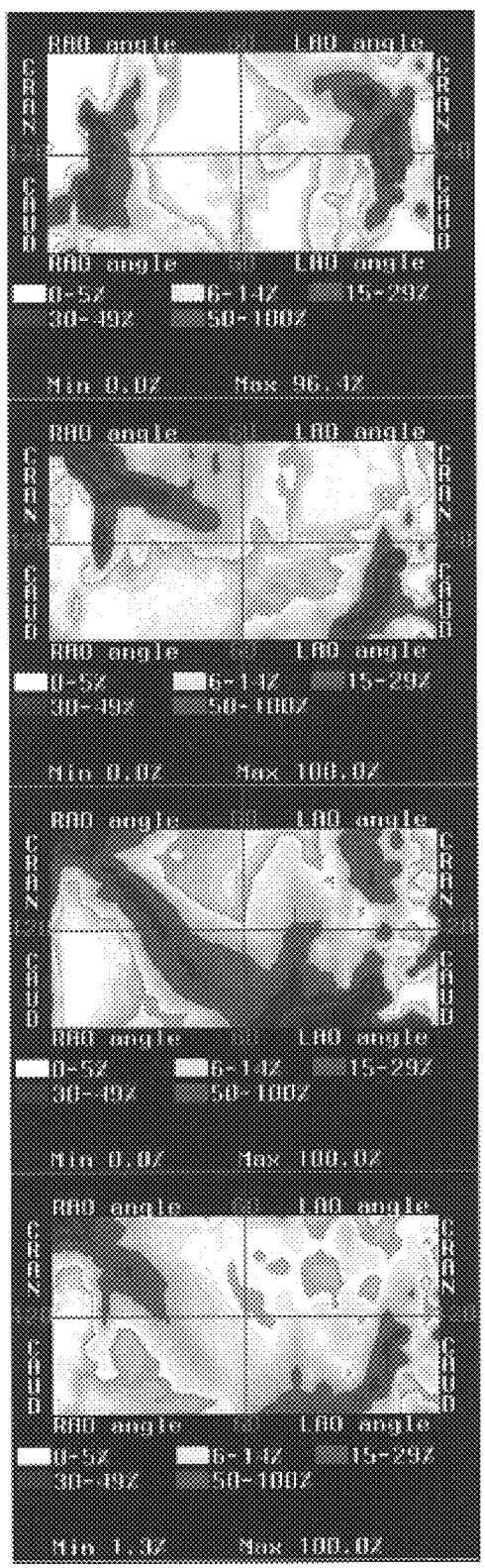

Based on the percent overlap equation $\mathcal{F}_{o,s}(\alpha,\beta,\check{L},T)$, the map relative to the selected arterial segments of interest $\check{L}$ can be generated. In the overlap map $Map_o(\alpha, \beta)$, the native and postive x-axes denote the RAO and LAO angles. Similarly, the native and postive y-axes denote the CAUD and CRAN angles, respectively. Each element of the map $Map_o(\alpha, \beta)$ contains the calculated percent vessel overlap measurement. Similarly, the contents of $Map_o(\alpha, \beta)$ is further coded by 5 colors with the spectrum from 0 to 255 for each color that is inversely proportional to the magnitude of percent overlap. Five colors are utilized for illustration of various ranges of percent overlap measurement including: white color (0–5)%, yellow color (6–14)%, green color (15–29)%, blue color (30–49)%, and red color (50–100)%, respectively. FIG. 44c shows the percent overlap map of a selected arterial segment of interest corresponding to a stenotic lesion. In FIG. 45c, the percent overlap map corresponding to a bifurcation lesion as region of interest is produced. FIG. 46c demonstrates multiple percent overlap maps with respect to the three arterial segments of interest selected from a bypass graft.

FIG. 54 is a flowchart describing the processing to calculate and display a color coded map for optimizing the view for overlap analysis. The flowchart of FIG. 54 is identical to that of FIG. 52 except the calculations are for overlap as described in the above overlap equations. Elements 5400 through 5416 perform analogous processing to that of elements 5200 through 5216, respectively.

G.2.4. Calculation of Composite Map

Figure 44D:
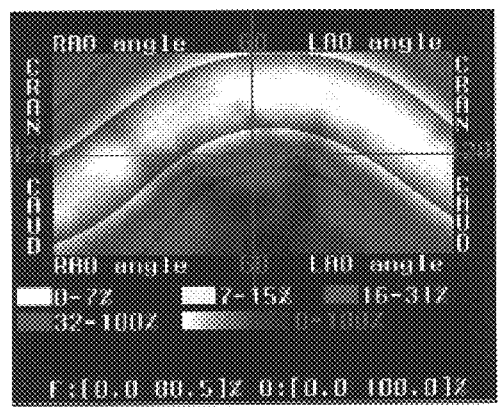
Figure 45D:
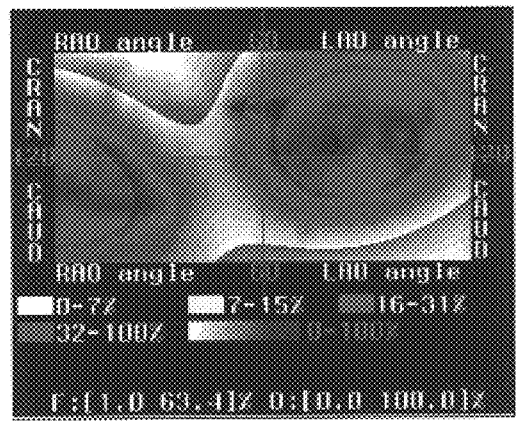
Figure 46D:
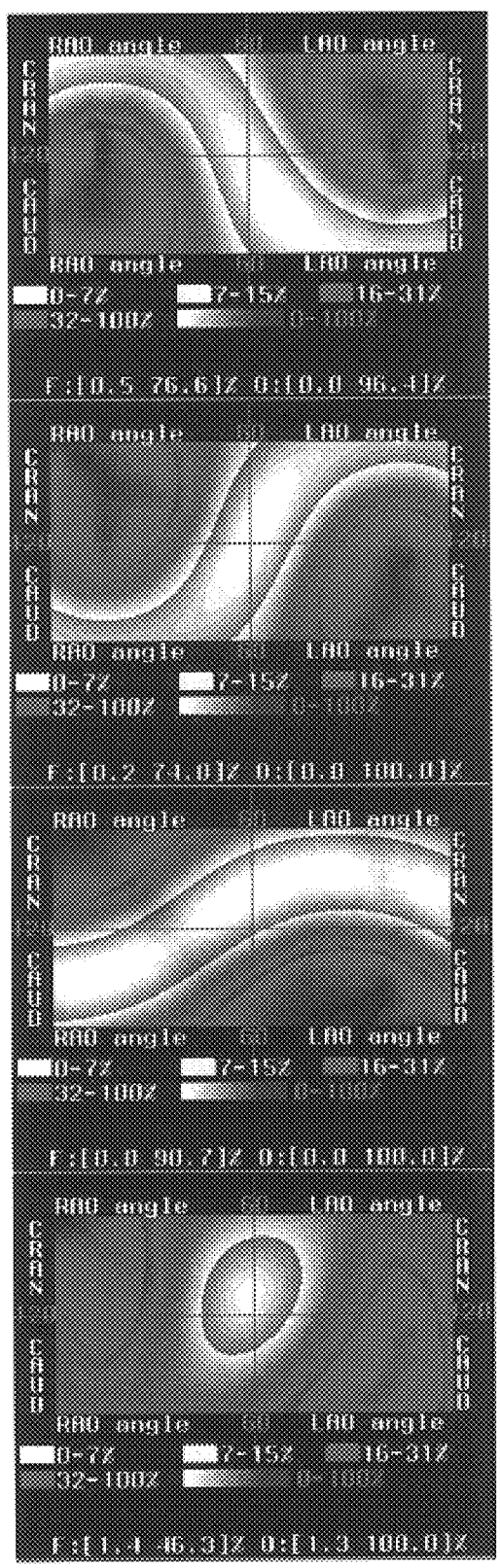

The ultimate goal of optimal view strategy is to minimize the vessel overlap as well as foreshortening on the view(s) acquired from the gantry orientation with respect to any arterial segment(s) of interest. To achieve such a goal, the composite map $Map_c(\alpha,\beta)$ is derived by integration of the respective percent foreshortening map $Map_f(\alpha,\beta)$, and overlap map $Map_o(\alpha,\beta)$. The resultant hybrid information is color coded by use of the percent foreshortening color scheme as background super-imposed by the percent overlap color. The percent foreshortening color scheme is characterized by four different colors with 0 to 255 magnitude including: white (0–7)%, yellow (8–15)%, green (16–31)%, red (32–100)%. The magnitude of percent foreshortening is inversely proportional to that of the color magnitude. The percent overlap color scheme is characterized by a translucent white color toward to opacified blue colors that is proportional to the magnitude of percent overlap (0–100)%. In other word, the background color (i.e., percent foreshortening color) at location $(\alpha,\beta)$ in the composite map is rendered if there occurs 0 percent overlap. The larger the magnitude of percent overlap at $Ma_c(\alpha,\beta)$, the stronger the opacified blue color is illustrated. FIG. 44d shows the percent overlap map of a selected arterial segment of interest corresponding to a stenotic lesion. In FIG. 45d, the composite map corresponding to a bifurcation lesion as region of interest is illustrated. FIG. 46d illustrates multiple composite maps with respect to the three arterial segments of interest selected from a bypass graft.

Figure 55:
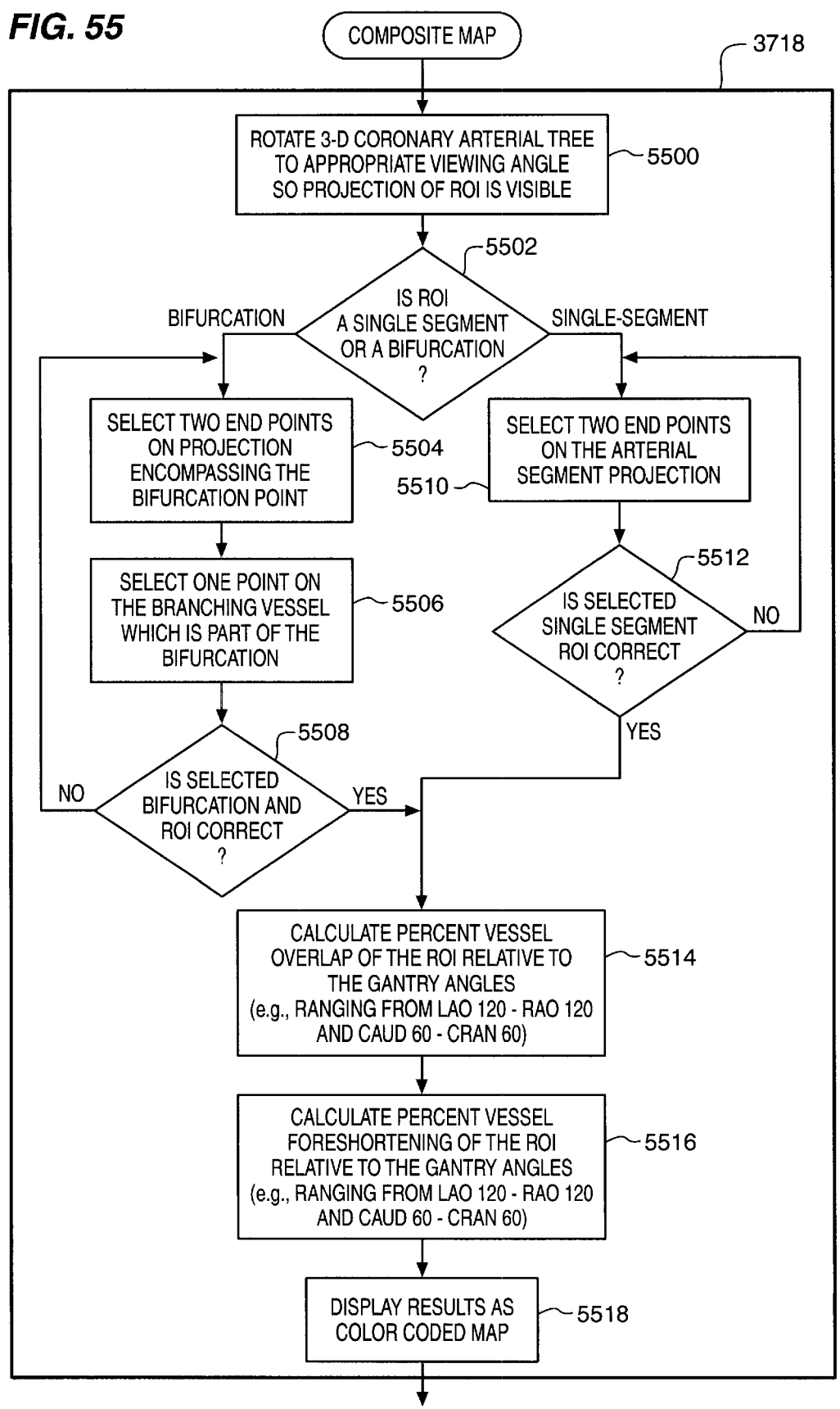
FIG. 55 is a flowchart providing additional detail of the processing to optimal view of a selected arterial segment to minimize both foreshortening and overlap.
Figure 56A:
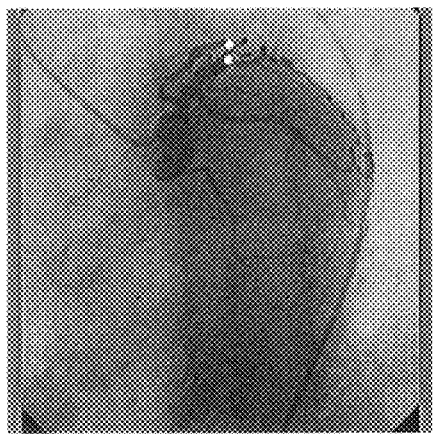
FIGS. 56a–d depict exemplary vessel foreshortening and existing 2-D QCA process.
Figure 56B:
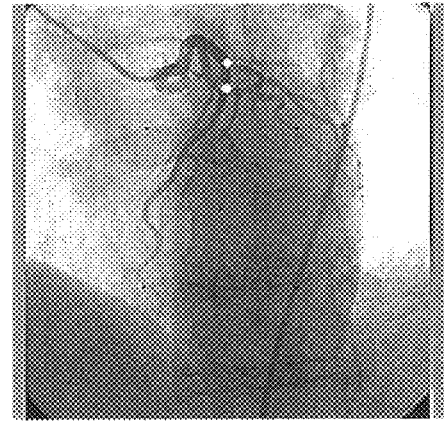
Figure 56C:
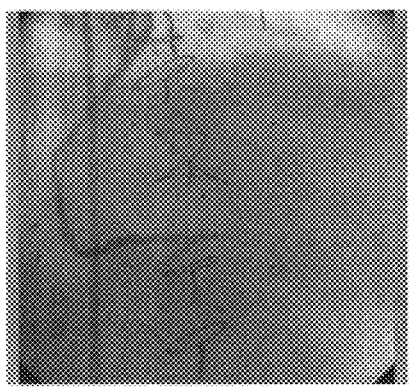
Figure 56D:
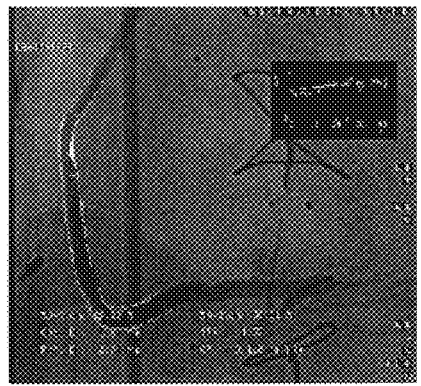

FIG. 55 is a flowchart describing the processing to calculate and display a color coded map for optimizing the view for both overlap and foreshortening analysis. The flowchart of FIG. 55 a combination of the processing of FIGS. 52 and 54 discussed above. Specifically, elements 5500 through 5512 perform analogous processing to elements 5200 through 5212 and 5400 through 5412, respectively. Element 5514 is identical to element 5214 and element 5516 is identical to element 5414. Element 5518 then displays a composite color coded map presenting information for optimal viewing of both foreshortening and overlap.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for three-dimensional reconstruction of a target object from two-dimensional images, said target object having a plurality of branch-like vessels, the method comprising the steps of:
   a) placing the target object in a position to be scanned by an imaging system, said imaging system having a plurality of imaging portions;
   b) acquiring a plurality of projection images of the target object, each imaging portion providing a projection image of the target object, each imaging portion disposed at an unknown orientation relative to the other imaging portions;
   c) identifying two-dimensional vessel centerlines for a predetermined number of the vessels in each of the projection images;
   d) creating a vessel hierarchy data structure for each projection image, said data structure including the identified two-dimensional vessel centerlines defined by a plurality of data points in the vessel hierarchy data structure;
   e) calculating a predetermined number of bifurcation points and directional vectors for each projection image by traversing the corresponding vessel hierarchy data structure, said bifurcation points defined by intersections of the two-dimensional vessel centerlines and said directional vectors defined by tangent vectors on said bifurcation points;
   f) determining a transformation in the form of a rotation matrix and a translation vector utilizing the bifurcation points and the directional vectors corresponding to each of the projections images, said rotation matrix and said translation vector representing imaging parameters corresponding to the orientation of each imaging portion relative to the other imaging portions of the imaging system;
   g) utilizing the data points and the transformation to establish a correspondence between the two-dimensional vessel centerlines corresponding to each of the projection images such that each data point corresponding to one projection image is linked to a data point corresponding to the other projection images, said linked data points representing an identical location in the vessel of the target object;
   h) calculating three-dimensional vessel centerlines utilizing the two-dimensional vessel centerlines and the correspondence between the data points of the two-dimensional vessel centerlines; and
   i) reconstructing a three-dimensional visual representation of the target object based on the three-dimensional vessel centerlines and diameters of each vessel estimated along the three-dimensional centerline of each vessel.

2. The method of claim 1 wherein the step of identifying vessel centerlines includes the step of:
   identifying two-dimensional vessel centerlines for a predetermined number of landmarks in each of the projection images.

3. The method of claim 1 wherein the step of utilizing the data points and the transformation to establish a correspondence comprises the step of:

utilizing the data points and the transformation to establish local and global correspondences between the two-dimensional vessel centerlines corresponding to each of the projection images such that each data point corresponding to one projection image is linked to a data point corresponding to the other projection images, said linked data points representing an identical location in the vessel of the target object.

4. The method of claim 1 further comprising the step of:

identifying a predetermined number of landmarks in each of the projection images wherein said landmarks are man-made objects identified in the projection images, wherein the step of determining said transformation comprises the step of:

f) determining a transformation in the form of a rotation matrix and a translation vector utilizing the landmarks and utilizing the bifurcation points and utilizing the directional vectors corresponding to each of the projections images, said rotation matrix and said translation vector representing imaging parameters corresponding to the orientation of each imaging portion relative to the other imaging portions of the imaging system.

5. The method of claim 1 further comprising the step of:

identifying a predetermined number of landmarks in each of the projection images wherein said landmarks are points and curves identified in the projection images, wherein the step of determining said transformation comprises the step of:

f) determining a transformation in the form of a rotation matrix and a translation vector utilizing the landmarks and utilizing the bifurcation points and utilizing the directional vectors corresponding to each of the projections images, said rotation matrix and said translation vector representing imaging parameters corresponding to the orientation of each imaging portion relative to the other imaging portions of the imaging system.

6. A method for quantitative analysis of a vascular tree comprising the steps of:

providing a 3-D vessel hierarchy data structure describing the vascular tree;

displaying a 2-D projection of said 3-D vessel hierarchy data structure on a user's display screen;

receiving input from the user to select a desired segment of said vascular tree wherein said selected segment includes any number of contiguous segments forming a sub-tree of said vascular tree;

receiving input from the user to select a desired quantitative measure of said selected segment wherein said desired quantitative measure is a value determinable from data derived from said 3-D vessel hierarchy data structure;

calculating said quantitative measure using said data derived from said 3-D vessel hierarchy; and displaying said quantitative measure on the users display screen.

7. The method of claim 6 further comprising the steps of:

receiving input from the user to select an alternate viewing angle of said vascular tree;

computing an updated 2-D projection of said 3-D vessel hierarchy data structure based on said alternate viewing angle; and displaying said updated 2-D projection on the user's display screen.

8. The method of claim 6 wherein the step of receiving input from the user to select said desired quantitative measure includes the step of receiving user input to evaluate a take-off angle of said selected segment, and wherein the step of calculating includes the step of calculating said take-off angle.

9. The method of claim 8 wherein the step of calculating said take-off angle comprises the step of:

calculating said take-off angle of said selected segment wherein said 3-D vessel hierarchy is reconstructed using data generated by an imaging system having two degrees of freedom.

10. The method of claim 8 wherein the step of calculating said take-off angle comprises the step of:

calculating said take-off angle of said selected segment wherein said 3-D vessel hierarchy is reconstructed using data generated by an imaging system having three degrees of freedom.

11. The method of claim 6 wherein the step of receiving input from the user to select said desired quantitative measure includes the step of receiving user input to evaluate an insertion angle of said selected segment, and wherein the step of calculating includes the step of calculating said insertion angle.

12. The method of claim 6 wherein the step of receiving input from the user to select said desired quantitative measure includes the step of receiving user input to evaluate a length of said selected segment, and wherein the step of calculating includes the step of calculating said length.

13. The method of claim 6 wherein the step of receiving input from the user to select said desired quantitative measure includes the step of receiving user input to evaluate tortuosity of said selected segment, and wherein the step of calculating includes the step of calculating said tortuosity.

14. The method of claim 13 wherein the step of calculating said tortuosity comprises the step of:

calculating said tortuosity in accordance with the F-S theory.

15. The method of claim 13 wherein the step of calculating said tortuosity comprises the step of:

calculating said tortuosity in accordance with the Point-to-Point method.

16. The method of claim 6 wherein the step of receiving input from the user to select said desired quantitative measure includes the step of receiving user input to determine an optimal viewing angle of said selected segment relative to said desired quantitative measure.

17. The method of claim 16 wherein the step of receiving input from the user to select said desired quantitative measure further includes the step of receiving user input to determine said optimal viewing angle relative to foreshortening of said selected segment, and wherein the step of calculating comprises the step of calculating foreshortening of said selected segments for all possible viewing angles, and wherein the method further comprises the steps of:
determining said optimal viewing angle from said all possible viewing angles so as to minimize said foreshortening;
computing an updated 2-D projection of said 3-D vessel hierarchy data structure based on said optimal viewing angle; and
displaying said updated 2-D projection on the user's display screen.

18. The method of claim 17 wherein the step of calculating said foreshortening comprises the step of:
calculating said foreshortening of said selected segment wherein said 3-D vessel hierarchy is reconstructed using data generated by an imaging system having two degrees of freedom.

19. The method of claim 17 wherein the step of calculating said foreshortening comprises the step of:
calculating said foreshortening of said selected segment wherein said 3-D vessel hierarchy is reconstructed using data generated by an imaging system having three degrees of freedom.

20. The method of claim 17 wherein the step of determining said optimal view comprises the step of:
displaying a color coded map having a plurality of points on the user's display screen wherein the color of each said point indicates the magnitude of said foreshortening at a corresponding viewing angle;
receiving input from the user to select a desired to select a point of said plurality of points; and
determining said optimal viewing angle as the viewing angle corresponding to the selected point.

21. The method of claim 16
wherein the step of receiving input from the user to select said desired quantitative measure further includes the step of receiving user input to determine said optimal viewing angle relative to overlap of said selected segment, and
wherein the step of calculating comprises the step of calculating overlap of said selected segments for all possible viewing angles, and
wherein the method further comprises the steps of:
determining said optimal viewing angle from said all possible viewing angles so as to minimize said overlap;
computing an updated 2-D projection of said 3-D vessel hierarchy data structure based on said optimal viewing angle; and
displaying said updated 2-D projection on the user's display screen.

22. The method of claim 21 wherein the step of calculating said overlap comprises the step of:
calculating said overlap of said selected segment wherein said 3-D vessel hierarchy is reconstructed using data generated by an imaging system having two degrees of freedom.

23. The method of claim 21 wherein the step of calculating said overlap comprises the step of:
calculating said overlap of said selected segment wherein said 3-D vessel hierarchy is reconstructed using data generated by an imaging system having three degrees of freedom.

24. The method of claim 21 wherein the step of determining said optimal view comprises the step of:
displaying a color coded map having a plurality of points on the user's display screen wherein the color of each said point indicates the magnitude of said overlap at a corresponding viewing angle;
receiving input from the user to select a desired to select a point of said plurality of points; and
determining said optimal viewing angle as the viewing angle corresponding to the selected point.

25. The method of claim 16
wherein the step of receiving input from the user to select said desired quantitative measure further includes the step of receiving user input to determine said optimal viewing angle relative to a combination of foreshortening and overlap of said selected segment, and
wherein the step of calculating comprises the steps of:
calculating overlap of said selected segments for all possible viewing angles; and
calculating foreshortening of said selected segments for all possible viewing angles, and
wherein the method further comprises the steps of:
determining said optimal viewing angle from said all possible viewing angles so as to minimize the combination of said overlap and said foreshortening;
computing an updated 2-D projection of said 3-D vessel hierarchy data structure based on said optimal viewing angle; and
displaying said updated 2-D projection on the user's display screen.

26. The method of claim 25
wherein the step of calculating said overlap comprises the step of:
calculating said overlap of said selected segment wherein said 3-D vessel hierarchy is reconstructed using data generated by an imaging system having two degrees of freedom, and
wherein the step of calculating said foreshortening comprises the step of:
calculating said foreshortening of said selected segment wherein said 3-D vessel hierarchy is reconstructed using data generated by an imaging system having two degrees of freedom.

27. The method of claim 25
wherein the step of calculating said overlap comprises the step of:
calculating said overlap of said selected segment wherein said 3-D vessel hierarchy is reconstructed using data generated by an imaging system having three degrees of freedom, and
wherein the step of calculating said foreshortening comprises the step of:
calculating said foreshortening of said selected segment wherein said 3-D vessel hierarchy is reconstructed using data generated by an imaging system having three degrees of freedom.

28. The method of claim 25 wherein the step of determining said optimal view comprises the step of:
displaying a color coded map having a plurality of points on the user's display screen wherein the color of each said point indicates the magnitude of said overlap and the magnitude of said foreshortening at a corresponding viewing angle;
receiving input from the user to select a desired to select a point of said plurality of points; and
determining said optimal viewing angle as the viewing angle corresponding to the selected point.

* * * * *